United States Patent
Brunet de Courssou et al.

(10) Patent No.: US 8,491,391 B2
(45) Date of Patent: Jul. 23, 2013

(54) REGULATED GAMING—AGILE MEDIA PLAYER FOR CONTROLLING GAMES

(75) Inventors: Thierry Brunet de Courssou, Henderson, NV (US); Cameron Anthony Filipour, Las Vegas, NV (US)

(73) Assignee: IGT, Reno, NV (US)

( * ) Notice: Subject to any disclaimer, the term of this patent is extended or adjusted under 35 U.S.C. 154(b) by 1357 days.

(21) Appl. No.: 11/737,140

(22) Filed: Apr. 19, 2007

(65) Prior Publication Data

US 2007/0191108 A1 Aug. 16, 2007

(51) Int. Cl.
*A63F 9/24* (2006.01)

(52) U.S. Cl.
USPC .................................. 463/40; 463/42; 463/43

(58) Field of Classification Search
USPC ................................................ 463/40, 42, 43
See application file for complete search history.

(56) References Cited

U.S. PATENT DOCUMENTS

| | | | |
|---|---|---|---|
| 5,265,874 A | 11/1993 | Dickinson et al. | |
| 5,290,033 A | 3/1994 | Bittner et al. | |
| 5,823,879 A | 10/1998 | Goldberg et al. | |
| 5,841,870 A | 11/1998 | Fieres et al. | |
| 5,920,861 A | 7/1999 | Hall et al. | |
| 5,961,602 A * | 10/1999 | Thompson et al. | 709/229 |
| 5,978,855 A | 11/1999 | Metz et al. | |
| 6,048,269 A | 4/2000 | Burns et al. | |
| 6,077,163 A | 6/2000 | Walker et al. | |
| 6,210,274 B1 | 4/2001 | Carlson | |

(Continued)

FOREIGN PATENT DOCUMENTS

| | | |
|---|---|---|
| WO | 0072119 A2 | 11/2000 |
| WO | 0225409 A2 | 3/2002 |
| WO | WO 2004/004855 | 1/2004 |

OTHER PUBLICATIONS

"PDA—Personal digital assistant—What' new?" available at http://web.archive.org/web/20021020021914/http://www.carletonsportsmed.com/PDA.htm, published at least as early as Oct. 20, 2002, last accessed Dec. 7, 2012.*

(Continued)

*Primary Examiner* — Dmitry Suhol
*Assistant Examiner* — Jay Trent Liddle
(74) *Attorney, Agent, or Firm* — Griffiths & Seaton PLLC

(57) ABSTRACT

A method for agile downloading and controlling regulated games in a distributed gaming system, the games being selected from a large library of certified games. A preferred embodiment of the method is a plug-in for the ubiquitous personal media player whereby the regulated games distributed on CD-ROM are catalogued in the media library through a "rip-like" operation and are downloaded to the gaming machines through a "sync-like" operation much like for downloading music, photos and movies to an iPod®. Preventing execution of non authorized games is enforced in the gaming machine through software restriction policy (SRP) much like digital right media (DRM) prevents listening or viewing illegal media files. Other media content such as promotional photos, videos and audio may be downloaded and controlled through the same casino media player. A free-text entry selection accelerator enables rapid selection of media titles, game titles and target gaming machines according to a wide range of indexed embedded information and metadata. Operators already acquainted with downloading media content to portable media player such as the Apple iPod®, Microsoft Zune® and other digital music players will feel immediately at ease with downloading regulated gaming content to gaming machines via the same paradigm, from a control workstation in the central computer room or directly at any location on the floor using a mobile PC.

49 Claims, 30 Drawing Sheets

U.S. PATENT DOCUMENTS

| | | | |
|---|---|---|---|
| 6,272,538 B1 * | 8/2001 | Holden et al. | 709/223 |
| 6,428,413 B1 | 8/2002 | Carlson | |
| 6,439,996 B2 * | 8/2002 | LeMay et al. | 463/29 |
| 6,471,068 B1 | 10/2002 | Kido et al. | |
| 6,557,004 B1 * | 4/2003 | Ben-Shachar et al. | 707/102 |
| 6,697,948 B1 | 2/2004 | Rabin et al. | |
| 6,749,510 B2 | 6/2004 | Giobbi | |
| 6,805,634 B1 * | 10/2004 | Wells et al. | 463/42 |
| 6,843,725 B2 * | 1/2005 | Nelson | 463/40 |
| 6,910,049 B2 * | 6/2005 | Fenton et al. | 707/104.1 |
| 7,152,158 B2 | 12/2006 | Watanabe et al. | |
| 7,509,421 B2 * | 3/2009 | Lambert | 709/226 |
| 2001/0029205 A1 | 10/2001 | Taho et al. | |
| 2001/0047348 A1 | 11/2001 | Davis | |
| 2002/0026581 A1 | 2/2002 | Matsuyama et al. | |
| 2002/0068631 A1 | 6/2002 | Raverdy et al. | |
| 2002/0099952 A1 | 7/2002 | Lambert | |
| 2002/0104097 A1 | 8/2002 | Jerding et al. | |
| 2002/0116615 A1 | 8/2002 | Nguyen et al. | |
| 2002/0137217 A1 | 9/2002 | Rowe | |
| 2002/0138594 A1 * | 9/2002 | Rowe | 709/219 |
| 2002/0147040 A1 | 10/2002 | Walker et al. | |
| 2003/0033255 A1 | 2/2003 | Burton et al. | |
| 2003/0211881 A1 | 11/2003 | Walker et al. | |
| 2004/0023709 A1 * | 2/2004 | Beaulieu et al. | 463/16 |
| 2004/0039911 A1 | 2/2004 | Oka et al. | |
| 2004/0048668 A1 * | 3/2004 | Brosnan | 463/42 |
| 2004/0198496 A1 | 10/2004 | Gatto et al. | |
| 2005/0172336 A1 | 8/2005 | Gatto | |
| 2005/0223219 A1 | 10/2005 | Gatto | |
| 2005/0282637 A1 | 12/2005 | Gatto | |
| 2006/0035713 A1 | 2/2006 | Cockerille | |
| 2006/0046819 A1 | 3/2006 | Nguyen | |
| 2006/0046824 A1 | 3/2006 | Silva | |
| 2006/0063575 A1 | 3/2006 | Gatto | |
| 2006/0122937 A1 | 6/2006 | Gatto | |
| 2006/0148570 A1 * | 7/2006 | Leopold | 463/43 |
| 2006/0160626 A1 | 7/2006 | Gatto | |
| 2006/0196686 A1 | 9/2006 | Brunet de Courssou et al. | |
| 2006/0287108 A1 * | 12/2006 | Canterbury | 463/43 |
| 2006/0287109 A1 * | 12/2006 | Mercado et al. | 463/43 |
| 2007/0048714 A1 | 3/2007 | Plastina et al. | |
| 2008/0034277 A1 * | 2/2008 | Hong | 715/202 |
| 2009/0017914 A1 * | 1/2009 | Velu | 463/40 |

OTHER PUBLICATIONS

Enterprise News and Reviews, "Microsoft: Why Lorighom Matters", http://www.eweek.com/article2/0,1759,1786193,00.asp, printed Apr. 15, 2005.

Mary Jo Foley, "Microsoft dusts off 'Palladium' security for Longhorn", Microsoft Watch, http://www.microsoft-watch.com/article2/0,1995,1786571,00.asp, printed Apr. 15, 2005.

Paula Rooney, "Ballmer Touts Interop with Sun, Trusted Computing Group", http://www.cm.com/sections/breakingnews/breakingnews.jhtml?articleId=160911712, printed Apr. 20, 2005.

Microsoft Corp., "Microsoft CEO Steve Ballmer Affirms Commitment to Dynamic Systems Initiative", Press Release, printed Apr. 20, 2005.

Sygate Technologies, "Sygate Supports Microsoft and Trusted Computing Group Alignment for Defining Endpoint Enforcement Standards", Press Reiease, printed Apr. 20, 2005.

Sygate web site, "Policy Enforcement", printed Apr. 20, 2005.

Barbara Darrow and Paula Rooney, "Allchin Talks Turkey About Longhorn", http://www.cm.com/sections/breakingnews/dailyarchives.jhtml:jsessionid=2P2WCO1SRT, printed Apr. 18, 2005.

Microsoft manual, "Windows Installer v3.0 RC1 (MSI3.0)", Published Sep. 2003, Revised Mar. 2004, 27 pgs.

Microsoft manual, Windows Installer v3.0 RC1 Patch Sequencing (Draft Whitepaper), Published Mar. 2004, 51 pgs.

International Search Report mailed Feb. 28, 2008, in related International Application No. PCT/US07/81574, filed Feb. 2, 2007.

Written Opinion of the International Searching Authority mailed Feb. 28, 2008, in related International Application No. PCT/US07/81574, filed Feb. 2, 2007.

Office Action mailed Oct. 19, 2007, in related U.S. Appl. No. 10/789,975, filed Feb. 27, 2004.

Notice of Allowance mailed Nov. 21, 2007, in related U.S. Appl. No. 11/138,736, filed May 25, 2005.

International Preliminary Report on Patentability of Oct. 29, 2009 in corresponding PCT application PCT/US08/60899.

Final Office Action mailed Oct. 11, 2006, in parent U.S. Appl. No. 10/789,975, filed Feb. 27, 2004.

Office Action mailed Jun. 13, 2006, in parent U.S. Appl. No. 11/138,736, filed May 25, 2005.

International Search Report dated Mar. 30, 2007, in related International Application No. PCT/US06/35560, filed Sep. 12, 2006.

Written Opinion dated Mar. 30, 2007, in related International Application No. PCT/US06/35560, filed Sep. 12, 2006.

International Search Report dated Apr. 20, 2007, in related International Application No. PCT/US06/10926, filed Mar. 24, 2006.

Written Opinion dated Apr. 20, 2007, in related International Application No. PCT/US06/10926, filed Mar. 24, 2006.

International Preliminary Report on Patentability dated Jun. 5, 2007, in related International Application No. PCT/US04/06045, filed Feb. 27, 2004.

Office Action mailed Jun. 27, 2007 in related U.S. Appl. No. 11/138,736, filed May 25, 2005.

Microsoft Corporation, "Active Directory Service Interfaces", http://msdn2.microsoft.com/en-us/library/aa772170(d=printer).aspx, printed Apr. 9, 2007.

Mircrosoft Windows 2000 Scripting Guide, "ADSI Overview", http://www.microsoft.com/technet.scriptcenter/guide/sas_ads_vldd.mspx, printed Apr. 9, 2007.

Final Office Action mailed May 13, 2008, in parent U.S. Appl. No. 10/789,975, filed Feb. 27, 2004.

Office Action mailed May 13, 2008, in related U.S. Appl. No. 11/277,026, filed Mar. 20, 2006.

International Search Report mailed Sep. 19, 2007, in related International Application No. PCT/US06/12043, filed Mar. 31, 2006.

Written Opinion of the International Searching Authority mailed Sep. 19, 2007, in related International Application No. PCT/US06/12043, filed Mar. 31, 2006.

Microsoft Corporation, "Using Software Restriction Policies to Protect Against Unauthorized Software" Microsoft Windows XP and Windows.NET Technical Article, pp. 1-50 (Jan. 2002).

M. Meyers et al., "Certificate Management Messages over CMS", ftp://ftp.isi.edu/in-notes/rfc2797.txt (Apr. 2000).

Microsoft, "Frequently Asked Questions About Windows Installer", Published Aug. 26, 2002, http://microsoft.com/windows2000/community/centers/management/msi_faq.mspx, printed May 5, 2005.

Microsoft, "How to add a Windows 2000 ADM template to a Group Policy snap-in in Office XP", http://support.microsoft.com/default.aspx?scid=kb;en-us;307732, printed Apr. 15, 2005.

Microsoft, "Using Administrative Template Files with Registry-E Group Policy", published Oct. 11, 2004, 41 pgs, http://www.microsoft.com/technet/prodtechnol/windowsserver2003/technologies/manage . . . , printed Apr. 15, 2005.

International Search Report mailed May 11, 2005, in relied International Application No. PCT/US2004/006045, filed Feb. 27, 2005 (3pgs).

Written Opinion mailed May 11, 2005, in related International Application No. PCT/US2004/006045, filed Feb. 27, 2005 (10pgs).

Office Action mailed Jun. 30, 2005, in parent U.S. Appl. No. 10/789,975, filed Feb. 27, 2004 (14pgs).

Gaming Labs Certified, "Standard Series, GLI-21: Server-Based Game Download Systems", Version: 1.3, Release Date: Apr. 29, 2004 (21pgs).

Microsoft, http://msdn.microsoft.com/library/en-us/msi/setup/patching.asp?frame=true, "Patching", printed Oct. 11, 2005 (2pgs).

Microsoft, http://msdn.microsoft.com/library/en-us/msi/setup/custom_actions.asp?frame=true, "Custom Actions", printed Oct. 11, 2005 (1pg).

Office Action mailed Mar. 29, 2005, in parent U.S. Appl. No. 10/789,975, filed Feb. 27, 2004.

Microsoft Windows 2000 Scripting Guide, "ADSI Scripting Fundamentals", http://microsoft.com/technet/scriptcenter/guide/sas_ads_scsw.mspx, printed Apr. 9, 2007.

Microsoft Windows 2000 Scripting Guide, "Advanced ADSI Scripting Operations", http://www.microsoft.com/technet/scriptcenter/guide/sas_ads_gkcy.mspx, printed Apr. 9, 2007.

Microsoft Windows 2000 Scripting Guide, "Active Directory Architecture", http://www.microsoft.com/technet/scriptcenter/guide/sas_ads_jcfo.mspx, printed Apr. 9, 2007.

Microsoft Windows 2000 Scripting Guide, "ADSI Architecture", http://www.microsoft.com/technet/scriptcenter/guide/sas_ads_ecfv.mspx, printed Apr. 9, 2007.

Microsoft Manual, "Using Administrative Template Files with Registry-Based Group Policy", Published Sep. 2004, 58 pgs.

Supplementary European Search Report in related EP Application EP04715742.5.

MSDN Library, "RefreshPolicy" (downloaded on Feb. 19, 2004).

MSDN Library, "RegisterGPNotification" (downloaded on Feb. 12, 2004).

MSDN Library, "RefreshPolicyEx" (downloaded on Feb. 12, 2004).

Microsoft TechNet, MSIEXE command at http://www.microsoft.com/technet/prodtechnol/winxppro/proddocs/msiexec.asp (downloaded on Feb. 16, 2004).

Microsoft Next-Generation Secure Computing Base ("NGSCB") (downloaded on Feb. 16, 2004).

Microsoft Corporation, "Designing a Public Key Infrastructure" Chapter 12.

International Search Report and Written Opinion of the International Searching Authority in related PCT application PCT/US08/60899, mailed Aug. 22, 2008.

R. Housley et al., "Internet X.509 Public Key Infrastructure Certificate and Certificate Revocation List (CRL) Profile", ftp://ftp.isi.edu/in-notes/rfc3280.txt (Apr. 2002).

M. Nystrom et al., "PKCS #10: Certification Request Syntax Specification Version 1.7", ftp://ftp.isi.edu/in-notes/rfc2986.txt (Nov. 2000).

Office Action of Mar. 30, 2010 in related U.S. Appl. No. 11/090,819.

* cited by examiner

FIG. 4

Certificate

| General | Details | Certification Path |

Show: Extensions Only ▼

| Field | Value |
|---|---|
| Basic Constraints | Subject Type=End Entity, Pat... |
| Certificate Policies | [1]Certificate Policy:Policy Ide... |
| Netscape Cert Type | SSL Client Authentication (80) |
| 2.16.840.1.113733.1.6.7 | 16 04 4e 6f 6e 65 |
| CRL Distribution Points | [1]CRL Distribution Point: Distr... |

1/21

Edit Properties...   Copy to File...

OK

400

| Component File Name | Part Number | Version | Subject Name for Code-Sign PKI Certificate |
|---|---|---|---|
| Infinity.dll | 0099-00001-00 | 1.0.101.0 | GDS.exe.0099-00001-00[1.0.1.0] Infinity.dll |
| Infinity.Hello.dll | 0099-00001-99 | 1.0.5.0 | GDS.exe.0099-00001-00[1.0.1.0] Infinity.dll |

FIG. 20

REGULATED GAMING—AGILE MEDIA PLAYER FOR CONTROLLING GAMES

CROSS-REFERENCE TO RELATED CASES

This application is related in subject matter to application Ser. No. 10/789,975, filed Feb. 27, 2004, which application is hereby incorporated herein by reference in its entirety.

BACKGROUND OF THE INVENTION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings referred to herein: Copyright 2007, Cyberview Technology, Inc., All Rights Reserved.

FIELD OF THE INVENTION

The present inventions relate generally to the field of network connected pay computer-controlled games, either games of skills or games of chance, and more particularly to the field of automated monitoring and control of a large number of clusters of pay gaming terminals. The gaming terminals may be slot machines, video lotteries, bingo systems or lottery terminals in all their forms; that is, desktop terminals, wall or pedestal mounted kiosks, or full size consoles, operating either in a local area network (LAN) or in a wide area network (WAN). The present inventions also relate to the monitoring and control systems linked to the gaming terminals.

DESCRIPTION OF THE PRIOR ART AND RELATED INFORMATION

Pay entertainment and gaming systems of the prior art, either of the cash-in or the cash-less type, are seriously limited due to the technical choices made in order to comply with gaming regulatory requirements. Regulators are mainly concerned with funds that may be illegally acquired by individuals as well as with funds that may not be acquired by legitimate winners as a result of flaws, cheating and/or stealing. Game regulators are reluctant to accept state-of-the-art operating systems, multimedia and Internet technologies because of security concerns and tend to favor antiquated technology based upon secrecy rather that "open" state-of-the-art technology. A "Request/Authorize" method for downloadable games has been proposed by another company (IGT's Secure Virtual Network in a Gaming Environment—Publication US2002/0116615 A1) but the method disclosed therein does not cover how to ensure that only certified authorized components may execute. Although downloadable games are undeniably going to flourish, they have yet to create confidence within the regulatory arena.

When downloadable games become established, the number of games available to any one gaming machine will become quite large, likely in the thousands. When the traditional paradigm of one game to one gaming machine is shattered, each gaming machine may potentially be configured to run any number of games. Selecting which games to download and activate on which machines to maximize both player enjoyment and profit will then become very important. As of yet, no convenient and immediately intuitive methods of selecting, scheduling and activating games on selected gaming machines or groups of gaming machines exists.

SUMMARY OF THE INVENTION

Embodiments of the present invention overcome the security limitations of the prior art and allow game operators the flexibility to dynamically configure their estate of gaming terminals. It is to be noted that although the gaming industry has coined the term "downloadable game" and that gaming standard GLI-21 entitled "Game Download System" has been published by Game Laboratory International (GLI), the term downloadable game is rather restrictive, as the downloading of software components to computer terminals and computer servers is by itself pervasive in any network distributed computer system. However, downloading certified game components in a secure manner is a problem that has yet to find a satisfactory solution.

Embodiments of the present invention may allocate an individual PKI certificate to each executable software component and each of its versions, binding the PKI certificate to the executable software by code-signing and associating a distinctive restriction policy for each PKI certificate. The PKI certificate's "Subject Name" (or "Issued to" field, or "Common Name" field) may be a concatenation of the software component identification, its version number and optionally other identification characters, for example.

According to other embodiments, the present invention offers a method to enable dynamic configuration of gaming terminals installed in one or a plurality of gaming premises whereby certified games, certified data files and certified support software components may be activated in accordance with a predetermined schedule or automatically in response to the observed gaming activity. This may be accomplished by configuring and then enforcing the software execution policies for selected PKI certificates in accordance with the desired authorized game configuration and schedule.

Further embodiments of the present invention offer a method to ensure the trust of non-executable files such as initialization or configuration files, video files, sound files, multimedia files, file containing list of hashes, CRCs, and/or signatures. This method relies on the certificate Software Restriction Policy as described herein.

Still further embodiments of the invention enable the certification authority to bind the certificates to the tested software components.

The present invention, according to still further embodiments thereof enables a dynamic generation of the list of games made available to the players without transferring a configuration file or files from the central server to the gaming machines. For example, a method according to an embodiment of the present invention relies on attempting to execute a game component on which a certificate Software Restriction Policy is enforced.

Embodiments of the present invention leverage the technology described in commonly assigned U.S. patent application filing 60/393,892 entitled—"Secure Game Download" in which code signing and Software Restriction Policy enable executing authorized game software. Code signing and Software Restriction Policy (SRP) technologies are available in Microsoft Windows XP, Windows 2000 and Windows 2003, Embedded Windows XP as well as Windows Vista to ensure that only executable software components from a trusted publisher, let's say "Microsoft", are allowed to run. Code signing and Software Restriction Policy technology are applied to executable components such as *.exe, *.dll, *.ocx, *.vbs, *.msi, *.cab, etc. In addition, Software Installation Policy (SIP) ensures that software components are installed in a controlled fashion. Embodiments of the present invention extend the use of code signing, Software Restriction Policy and Software Installation Policy to individual software components that are allowed to execute in a network connected gaming system by associating a distinctive code-signing certificate to each executable software component. Each executable software component version (usually comprising major version, minor version, revision and build) may have a unique certificate. A distinctive certificate may be created for each software component version and the two entities (the compiled code and the certificate) may be bound together by a code signing operation, herein called "signcode.exe."

Code signed software components may be packaged together with non-signed software components (if any) into a MSI Microsoft installation package (MSI=Microsoft Software Installation). An MSI package is an executable component that in turn receives a distinctive certificate bound to its content by a code signing operation. Only the software component version that has successfully passed the regulatory certification process may be allowed to run by enforcing an unrestricted policy to the associated certificate.

Moreover, embodiments of the present invention extend the use of code signing and Software Restriction Policy to ensure that only authorized non-executable components are used by the authorized executable components. This is of particular value for configuration files or media files that may affect the game outcome such as fixing the return to player at, for example, 95% between 5:00 PM and 11:00 PM, or at 98% during other time periods. For this, non-executable components may be placed in code signed MSI (Microsoft Software Installation) installation packages. Each individual MSI package is an executable component whose execution can be controlled by Software Restriction Policy (SRP). A distinctive certificate may be created for each package version (a part number is created for a preselected aggregate of non-executable components) and the two entities may be bound together by the code signing operation "signcode.exe." Within the network connected gaming system, trust for non-executable components may be established by executing the associated authorized code signed packages using SRP upon computer startup or alternatively on demand, resulting in the re-installation of the original non-corrupted non-executable components. The non-executable components may be: initialization or configuration files, video files, sound files, multimedia files, file containing list of hashes, CRCs, and/or signatures, for example.

For example, DRM (Digital Rights Management) technology offered by Microsoft Windows Media Player may be used to ensure that only authorized multimedia files may be played or viewed.

Also, RM (Rights Management) technology offered with Microsoft Office 2003, with the associated RM services and SDK (Software Development Kit) may be used to ensure that only authorized data files may be accessed, viewed, copied or modified.

Software Installation Policy (SIP) and Software Restriction Policy (SRP) configured with an individual PKI certificate associated to each authorized software component offer a "Policy/Enforce" model, or in other words a "Configure the Policy and then Enforce the Policy" model to enable network installation (or "game download") and activation at predetermined times (or "game scheduling") of selected authorized software components, in order to control the software of the network connected gaming system and offer selected games to players. This "Policy/Enforce" method may be constructed on a demonstrable trusted base; it offers transparent security and fine-grained auditing, contrasting with conventional "Request/Authorize" methods that do not demonstrate reliance on a trusted base to enforce the use of only trusted software components.

A network-connected gaming system comprises hundreds of authorized certified software components that may be selectively downloaded and scheduled. Considering on-going support for 50 customers and for 200 distinctive games over a period of 5 years, tens of thousands of software components will each need to receive individual certificates and be certified. Accordingly, embodiments of the present invention include an automated certification platform. Herein, such a certification platform is denoted "Integrated Certification Environment" or ICE. Embodiments of such a certification platform according to the present invention are designed to automate the stepping through the procedure that must be done by the regulatory certification authority to produce only authorized software components that may be dynamically installed in a gaming system, and to prevent generation of erroneous software components. In addition, the ICE offers support to selectively enable the download of approved system software components using Microsoft Software Update Services (SUS), for example.

Embodiments of the present methods rely on established security standards and a demonstrable trusted base (as opposed to relying on security by secrecy) in order to offer transparent security and allow fine-grained auditing. Embodiments of the present inventions are also applicable to any of the subsystems available in a network connected gaming system that require preventing non-authorized software components from executing or affecting the game outcome, such as the gaming terminals, the game management system (CMS or MCS) that monitor and control whole or part of the estate of gaming machines, the progressive jackpot systems, the bonusing systems as well as game payment verification systems such as IGT's EasyPay and Cyberview's PVU (Payment Verification Unit) and PVS (Payment Verification System). Gaming subsystems may be tested against gaming standards such as those produced by GLI; the game standards are mandated by game regulators in accordance with local regulation and laws. The network-connected subsystems may be located within the premises accommodating the estate of gaming machine (connection via a LAN) or outside of the premises (connection via a WAN).

According to further embodiments of the present invention, a game management application is described, affording gaming operators the ability to catalog, manage, search, filter, categorize, push, download, activate, schedule and/or remove selected games and other media content to be rendered or played on selected gaming machines by extending a customary interface available for personal consumer devices.

Accordingly, a method for controlling media content for network connected gaming machines may include managing, selecting and transferring (via a download or push paradigm, for example) regulated games and/or other media content in a distributed gaming system, the games being selected from a large library of certified games and media content. An embodiment of the present invention includes a plug-in for a personal media player, whereby the regulated games distributed on CD-ROM are catalogued in the media library through a "rip-like" operation and are downloaded to the gaming machines through a "sync-like" operation much like for downloading music, photos and movies to a personal music device. Preventing execution of non-authorized games and/or content may be enforced in the gaming machine through software restriction policy (SRP) much like digital rights management (DRM) prevents listening or viewing illegal media files. Other media content such as promotional photos, videos and audio may be transferred to selected gaming machines and controlled through the same casino media player. Operators already acquainted with downloading media content to portable media player such as the Apple iPod®, Microsoft Zune® and other media (e.g., MP3) players will feel immediately at ease with downloading regulated gaming content to selected gaming machines via a similar paradigm.

Popular PC media players such as Microsoft Media Player and WinAmp feature a SDK (software Developers' Kit) or plug-in API (Application Programming Interface) allowing software developers to extend the basic functionalities of the player to include new capabilities. Although these media players are primary aimed at cataloging and playing immediately media on the host PC, then optionally downloading selected media to a portable media player (e.g. iPod®, Zune®), their functionally may be advantageously extended to support games as well. Non-regulated consumer games such as Halo, Doom and Flight Simulator are very large in size and may span over several CD-ROMs or DVD-ROMs, which makes them unwieldy to manage via a customary media player interface. In contrast, regulated games such as video slot machine games and video poker games are contained within a well delimited and controlled envelop or package that comprises all necessary files may advantageously be managed via a casino media player according to embodiments of the present invention. Sieving through the game play parameters of a large library of regulated games using the same in-build search and classification tools (album, artist, genre, star rating, immediate search accelerators, etc. . . . ) adapted for use with media content for gaming machines, according to embodiments of the present invention, therefore, is believed to be very intuitive. Embodiments of the present invention may be used by casino operators to select and schedule regulated games and other media content for activation on selected gaming machines for selected periods of time. Alternatively, embodiments of the present invention may be deployed on gaming machines, to enable the players of the gaming machines to search and select a regulated game together with, for example, audio and/or video content that he or she may wish to listen to and/or view during game play. When used at the central site, a game operator may use the casino media player according to an embodiment of the present invention to search for and select games together with audio and/or video content that may be downloaded or pushed to selected gaming machines to be made available to the players.

The regulated games may (but need not) be received at the casino premises on a CD-ROM or a DVD supplied by the game supplier. A regulated game contained in a CD-ROM or DVD may advantageously be read and cataloged into the casino media player or into the media library that is accessible to the casino media player via a "rip-like" operation subsequent to which an icon symbolizing (for example) a CD with a CD tray photo representative of the game title may be added to the media library. The casino media player plug-in software, according to an embodiment of the present invention, may bind all the security data found on the CD-ROM to the "virtualized-CD" now entered in the media library. The security data may include the software restriction directive derived during the certification process. When selected for immediate play via the casino media player, the software restriction policies are enforced. When selected for download to selected gaming machines via the casino media player "sync-like" command, the code of the regulated game may be downloaded (or pushed) to the remote gaming machines via the network and the software restriction policies may be enforced in each of the selected gaming machines to which the regulated game(s) has been downloaded (or pushed).

As customary with consumer media players, when the user clicks the mouse on a CD icon with the right (or "menu") button, a list of possible actions may be displayed, to enable the user to choose from a number of selections of possible actions with respect to the file represented by the icon, such as play now, add to queue, add to playlist, add to connected device, etc. . . . Similarly, according to further embodiments of the present invention, right-clicking on a game CD icon, the plug-in software enables the casino operator to choose from a number of selections of possible actions with respect to the game and/or other media content represented by the icon such as, for example, download or push to a predetermined bank of gaming machines, schedule to activate at 10:00 pm, etc. . . . When selecting a function via the right-click button, the function may advantageously open a pop-up window interface such as a graphical GUI for a scheduler, a graphical floor map showing all or portion of the gaming machines that may support the selected games.

According to another embodiment thereof, the present invention may be implemented as complete proprietary developed software that intrinsically provides the functions of the plug-in described above for regulated games that are controlled via a CD-icon Graphical User Interface (GUI) and that in addition provides the customary functions of a consumer media player for standard media files.

Accordingly, an embodiment of the present invention is a method for controlling audio-video media content for network connected gaming machines. The method may include steps of providing a media player configured to manage audio-video media content stored in a media library and to transfer audio-video media content to personal audio-visual media player devices; providing a plug-in for the media player, the plug-in being configured to enable the provided media player to transfer audio-video media content from the media library to selected gaming machines; coupling the provided plug-in to the provided media player; adding audio-video media content to the media library; selecting audio-video media content from the media library using the media player and coupled plug-in, and transferring the selected audio-video media content from the media library to the selected gaming machines using the media player and coupled plug-in.

The plug-in may be further configured to enable the provided media player to control the audio-video media content when the transferred selected audio-video media content is loaded on the selected gaming machines. The media player may be a consumer media player and the second providing step may be carried out by a developer that may be different from the developer of the consumer media player. The first providing step may include a step of providing an Application Programming Interface (API) and/or a Developer's Kit (SDK) and the second providing step may include using the API and/or the SDK to provide the plug-in. A step may be carried out of a first supplier developing the provided media player and a step of a second supplier developing the provided plug-in and the first supplier may be different from the second supplier. The method may further include a step of a first supplier developing the provided media player and a step of the first supplier developing the provided plug-in. The second providing step may be carried out with the provided plug-in being configured to enable the provided media player to control an availability of the transferred audio-video media content on the selected gaming machines. The selected audio-video media content may include digital rights management functionality. The method may further include a step of authorizing installation of transferred audio-video media content on the selected gaming machines by software restriction policy (SRP). The method may further include a step of authorizing playback of the transferred audio-video media content on the selected gaming machines by software restriction policy (SRP). The availability controlling step may be carried out via a scheduler software module that may be accessible via the media player and coupled plug-in. The availability controlling step may be carried out via a menu designer software module accessible via the media player and coupled plug-in. The availability controlling step may be carried out via a floor plan editor software module accessible via the media player and coupled plug-in. The floor plan editor software module may provide a graphical representation of a plurality of gaming machines and their physical distribution within one or more gaming establishments or a portion thereof.

The audio-video media content may include metadata to define, for example, a producer studio, media name, media genre, media year, and media rating of the selected audio-video media content, to name only a few possibilities. The second providing step may be carried out with the plug-in enabling the media player to select, display and transfer the audio-video media content based upon the metadata of the media content. The media library may be stored on a deployment server coupled to the network and the media player may be executed on an authorized computer device coupled to the network. The adding step may be carried out with the audio-video media content being retrieved from a CD-ROM or a DVD-ROM (for example). The selecting the audio-video media content make use of a free-text entry selection acceleration to enable rapid selection of audio-video media content according to related indexed embedded information and metadata, the selection being narrowed as each character is typed-in.

The media player may be a software media player that may be configured to execute on a mobile device coupled to the network and at least the selecting and transferring steps may be carried out from the mobile device. The method may further include the mobile device carrying out a step of accepting an identification of a group of gaming machines from a user and the audio-video selecting step may be carried out from a selection set of audio-video content from the media library that has been narrowed according to capabilities of constituent gaming machines of the identified group of gaming machines. The method may further include a step of accepting an identification of a group of gaming machines from a user and, subsequent to accepting an identification of the group of gaming machines, the floor plan editor software module may carry out a step of narrowing those gaming machines that may be controlled via the floor plan editor to only the gaming machines in the identified group. The floor plan editor software module may be configured (a) to allow free-text selection acceleration entry and (b) to narrow the selection of gaming machines subsequent to receiving each character according to indexed identifiers of individual or groups of gaming machines, and (c) to control the selected gaming machines.

According to another embodiment thereof, the present invention is a method for controlling regulatory certified game content for network connected gaming machines. The method may include steps of providing a media player configured to manage audio-video media content stored in a media library and to transfer audio-video media content to personal audio-visual media player devices; providing a plug-in for the provided media player, the plug-in being configured to enable the provided media player to (a) add regulatory certified game content to the media library, (b) select the regulatory certified game content from the media library and (c) enable transfer of regulatory certified game content from the media library to selected gaming machines; coupling the plug-in to the media player; adding regulatory certified game content to the media library; selecting regulatory certified game content from the media library using the media player and coupled plug-in, and transferring the selected regulatory certified game content from the media library to the selected gaming machines using the media player and coupled plug-in.

The plug-in may be further configured to enable the provided media player to control the regulatory certified game content when the transferred selected regulatory certified game content is active on the selected gaming machines. The media player may be a consumer media player and the second providing step may be carried out by a developer that is different from the developer of the consumer media player. The first providing step may include a step of providing an Application Programming Interface (API) and/or a Developer's Kit (SDK) and the second providing step may include using the API and/or the SDK to provide the plug-in. The method may further include a step of a first supplier developing the provided media player and a step of a second supplier developing the provided plug-in and the first supplier may be different from the second supplier. The method may further include a step of a first supplier developing the provided media player and a step of the first supplier developing the provided plug-in. The second providing step may be carried out with the provided plug-in being configured to enable the provided media player to control an availability of the transferred regulatory certified game content on the selected gaming machines. The method may further include a step of authorizing installation of transferred regulatory certified game content on the selected gaming machines by software restriction policy (SRP). The method may further include a step of authorizing execution of the transferred regulatory certified game content on the selected gaming machines by software restriction policy (SRP). The availability controlling step may be carried out via a scheduler software module that may be accessible via the media player and coupled plug-in. The availability controlling step may be carried out via a menu designer software module accessible via the media player and coupled plug-in.

The availability controlling step may be carried out via a floor plan editor software module accessible via the media player and coupled plug-in. The floor plan editor software module may provide a graphical representation of a plurality of gaming machines and their physical distribution within at least one gaming establishment or a portion thereof. The regulatory certified game content may include metadata to define, for example, a game studio, game name, game genre, game year, game rating and return to player (RTP) of the selected media content, to name but a few possibilities. The second providing step may be carried out with the plug-in enabling the media player to select, display and enable transfer of the regulatory certified game content based upon the metadata of the game content. The media player may be a software media player that may be configured to execute on a mobile device coupled to the network. The media library may be stored on a deployment server coupled to the network and the media player may be executed on an authorized computer device coupled to the network. The adding step may be carried out with the audio-video media content being retrieved from a CD-ROM or a DVD-ROM. Similarly, the adding step may be carried out with the regulatory certified game content being retrieved from one of a CD-ROM and a DVD-ROM (among a number of possible data carriers, as the embodiments described herein at not limited to retrieving media content or regulatory certified games from CD-ROMs or DVD-ROMs). Selecting the audio-video media content may make use of a free-text entry selection acceleration to enable rapid selection of audio-video media content according to related indexed embedded information and metadata, the selection being narrowed as each character is typed-in. Similarly, selecting the regulatory certified game content may make use of a free-text entry selection acceleration to enable rapid selection of regulatory certified game content according to related indexed embedded information and metadata, the selection being narrowed as each character is being typed-in.

The media player may be a software media player that may be configured to execute on a mobile device coupled to the network. The mobile device may carry out a step of accepting an identification of a group of gaming machines from a user and the regulatory certified game content selecting step may be carried out from a selection set of regulatory certified game content from the media library that has been narrowed according to capabilities of constituent gaming machines of the identified group of gaming machines. The method may also include a step of accepting an identification of a group of gaming machines from a user and subsequent to accepting an identification of the group of gaming machines, the floor plan editor software module carries out a step of narrowing those gaming machines that may be controlled via the floor plan editor to only the gaming machines in the identified group. The floor plan editor software module may be configured (a) to allow free-text selection acceleration entry and (b) to narrow the selection of gaming machines subsequent to receiving each character according to indexed identifiers of individual or groups of gaming machines, and (c) to control the selected gaming machines.

BRIEF DESCRIPTION OF THE DRAWINGS

FIG. 4 illustrates the information that may be entered in the Extended Attributes of a PKI certificate, according to an embodiment of the present invention.

FIG. 20 illustrates the method to generate a code signed companion software component, according to an embodiment of the present invention.

DETAILED DESCRIPTION

Reference will now be made in detail to the construction and operation of preferred implementations of the present invention illustrated in the accompanying drawings. The following description of the preferred implementations of the present invention is only exemplary of the invention. The present invention is not limited to these implementations, but may be realized by other implementations.

Figure 1:
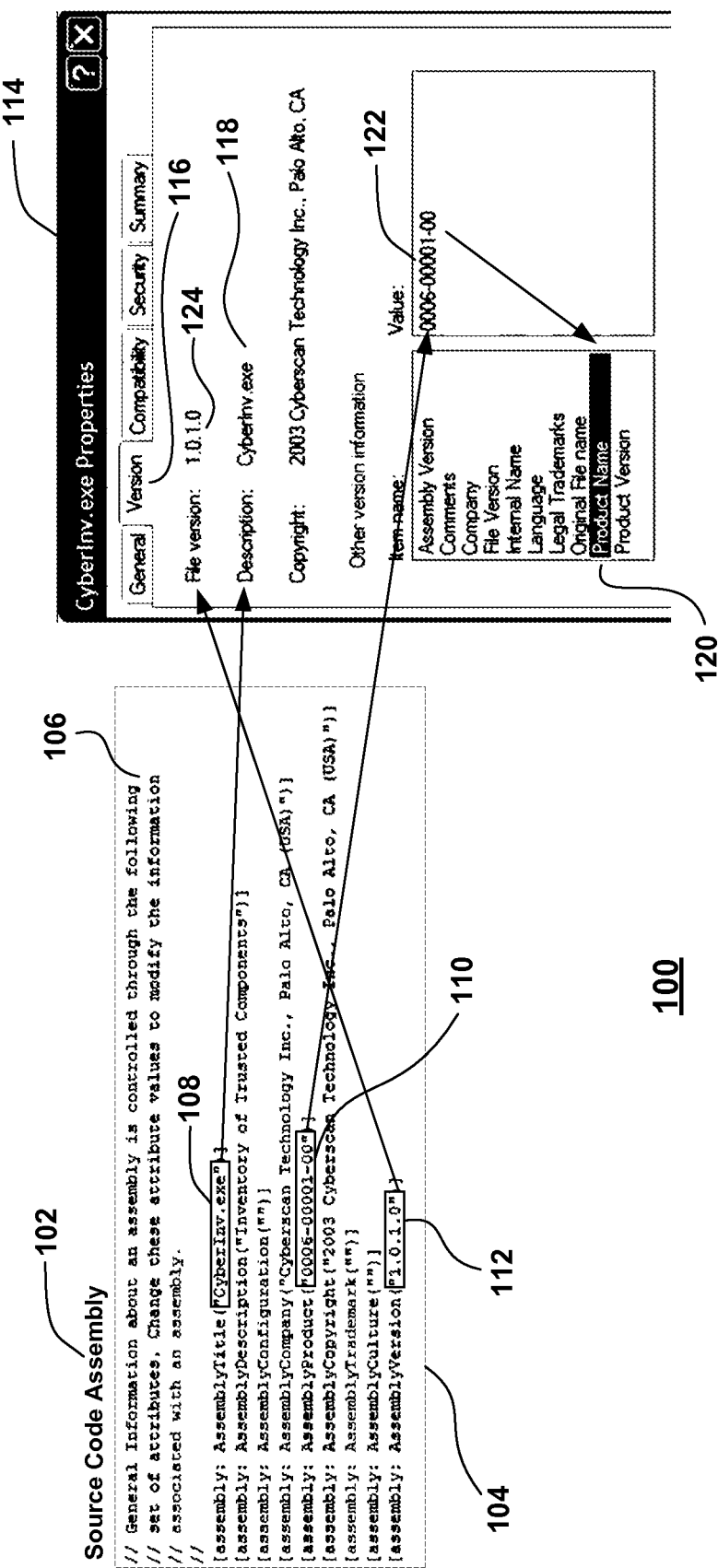
FIG. 1 illustrates the intrinsic information that uniquely identifies each executable software component, according to an embodiment of the present invention.

FIG. 1 illustrates Software Component Identification and Traceability via File Properties, according to an embodiment of the present invention. Shown at 100 in FIG. 1 is the intrinsic information that uniquely identifies each executable software component. The executable component source code comprises executable code lines (e.g. X=X+1; not shown here) and associated source code assembly information 102, 104 that comprises comment lines 106 and assembly information. Herein, AssemblyTitle 108, AssemblyProduct 110 and AssemblyVersion 112 are configured. The AssemblyTitle 108 is set to CyberInv.exe that is the friendly name of the executable software component; AssemblyProduct 110 is set to 0006-00001-00 that is the part number of the executable software component and AssemblyVersion 112 is set to 1.0.1.0, which is the version number of the executable software component. Once the source code is compiled and the executable is built (CyberInv.exe in this case), the configured assembly information is available via the File Property of Windows 114 when right clicking on the file CyberInv.exe and selecting "Properties" and "Version", as shown at 116. The friendly name is shown in the Description field 118, the part number is shown in the Product Name field 120, 122 and the version is shown in the File Version field 124.

It will be apparent to those of skill in the art of software development that intrinsic information that uniquely identifies each executable software component may be obtained in various combinations of assembly directives and file property fields. Additional information may be configured such as, for example, the software component part number, major version number, minor version number, build number, revision number, project name, type of software component, language variant, game regulation variant, friendly name, identification of the certification laboratory, identification of the client, and other predetermined identification identifiers. The identifiers associated with the executable software component using source code assembly directives may, therefore, be traceable via the File Property features of the Windows operating system.

An example of such a configuration is CST3000-0006-00001-00[1.0.1.0] {21}^11~9%S CyberInv.exe that comprises a concatenation of identifiers that may be used in a file name or a PKI certificate subject name. According to this example, CST3000 is the marketing system product identification or the project name; 0006-00001-00 is the software component part number; [1.0.1.0] details the software component major version number, minor version number, build number, revision number; {21} is the software component variant identifier; ^11 identifies the certification lab that certifies the software component; ~9 identifies the customer for which this software component is certified; %S is the software component language variant ("S" for Spanish in this example); CyberInv.exe is the software component friendly name for quick identification. Spaces may be used freely and the identifier fields may be written in any order so as to facilitate reading. Identifier fields may be omitted whenever the context already provides such information. The framing or delimiter characters such as [ ], { }, ~, ^, % which are allowable characters to be used in file names and certificate subject names facilitate human recognition as well as string searches for particular attributes (global search for all Spanish variants for example).

In the same manner, a selected set of identification information making up the certificate subject name may be used for making up the file name of PKI certificate related files such as *.CER, *.P7B and *.PVK such as to facilitate human identification, string searches and file searches.

Figure 2:
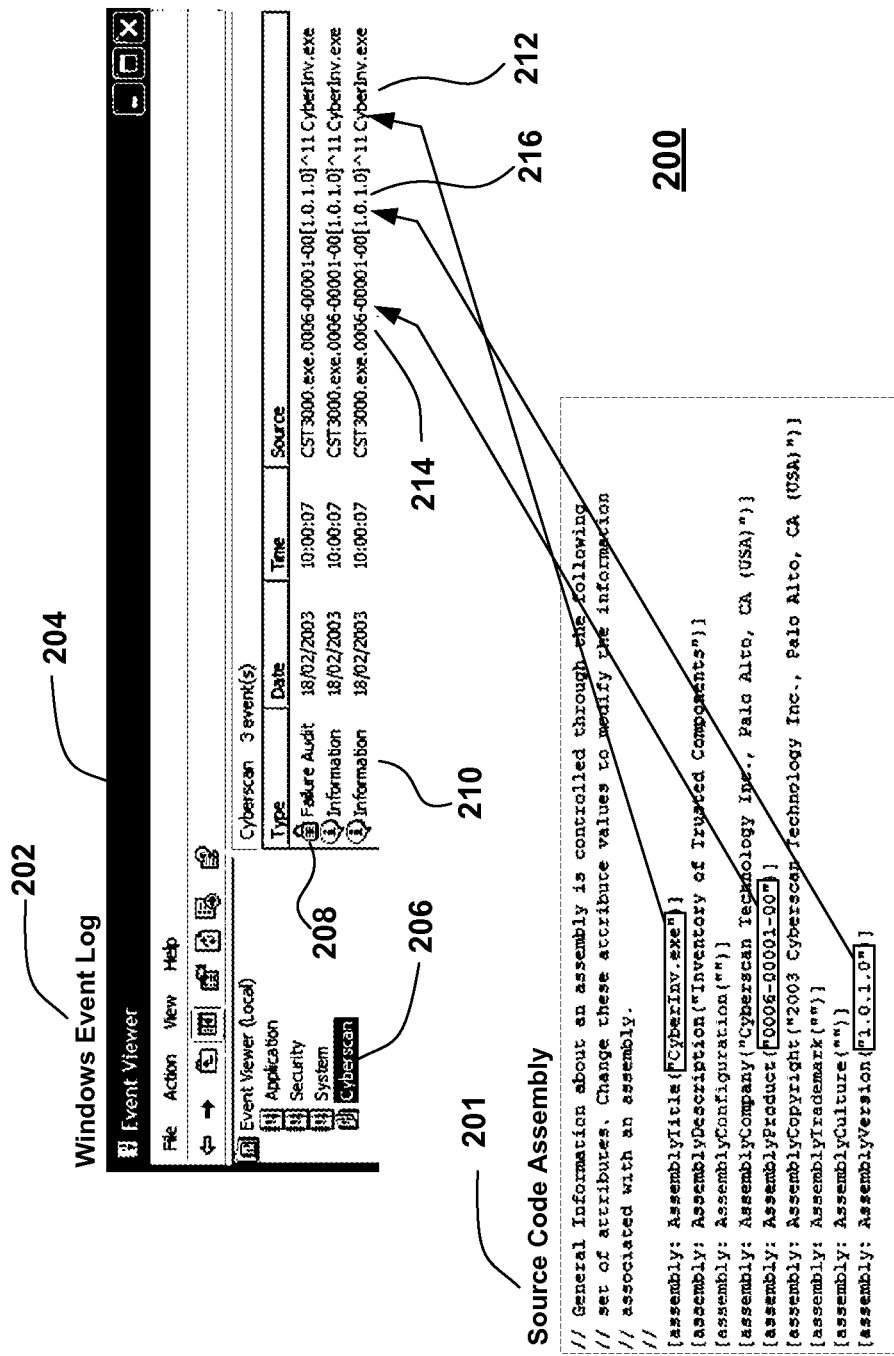
FIG. 2 illustrates the information uniquely identifying each executable software component being made available into the Windows Event Log upon execution of the software component, according to an embodiment of the present invention.

FIG. 2 illustrates traceability via the Windows Event Log. Reference numeral 200 in FIG. 2 illustrates the information uniquely identifying each executable software component being made available to the Windows Event Log upon execution of the software component. The Windows Event Log 202 is a repository for logging important events; it is viewed via the Event Viewer 204. Windows default event log bins (or containers) are Application, Security and System. In the illustrated example, an Event Log bin 206 denominated "Cyberscan" has been added. The Cyberscan bin 206 contains traceability information in its "Source" field that is being logged by each of the executable software components. The software executable software component makes use of the Event Log API to "splash" its identification information into the source field of a predetermined bin in the Windows Event Log each time it starts execution, or at any other time should the occurrence of an event be traced, in order to provide an audit trail to be examined by auditors. The part number 214, version 216 and friendly name 212 identifiers associated to the executable software component using source code assembly directives 201 are therefore traceable via the Event Log features of the Windows operating system. Other information associated with the executable software component may be splashed into the event log for additional traceability. The "Type" field 208 may flag an important audit condition such as here "Failure Audit" to alert the auditor.

Figure 3:
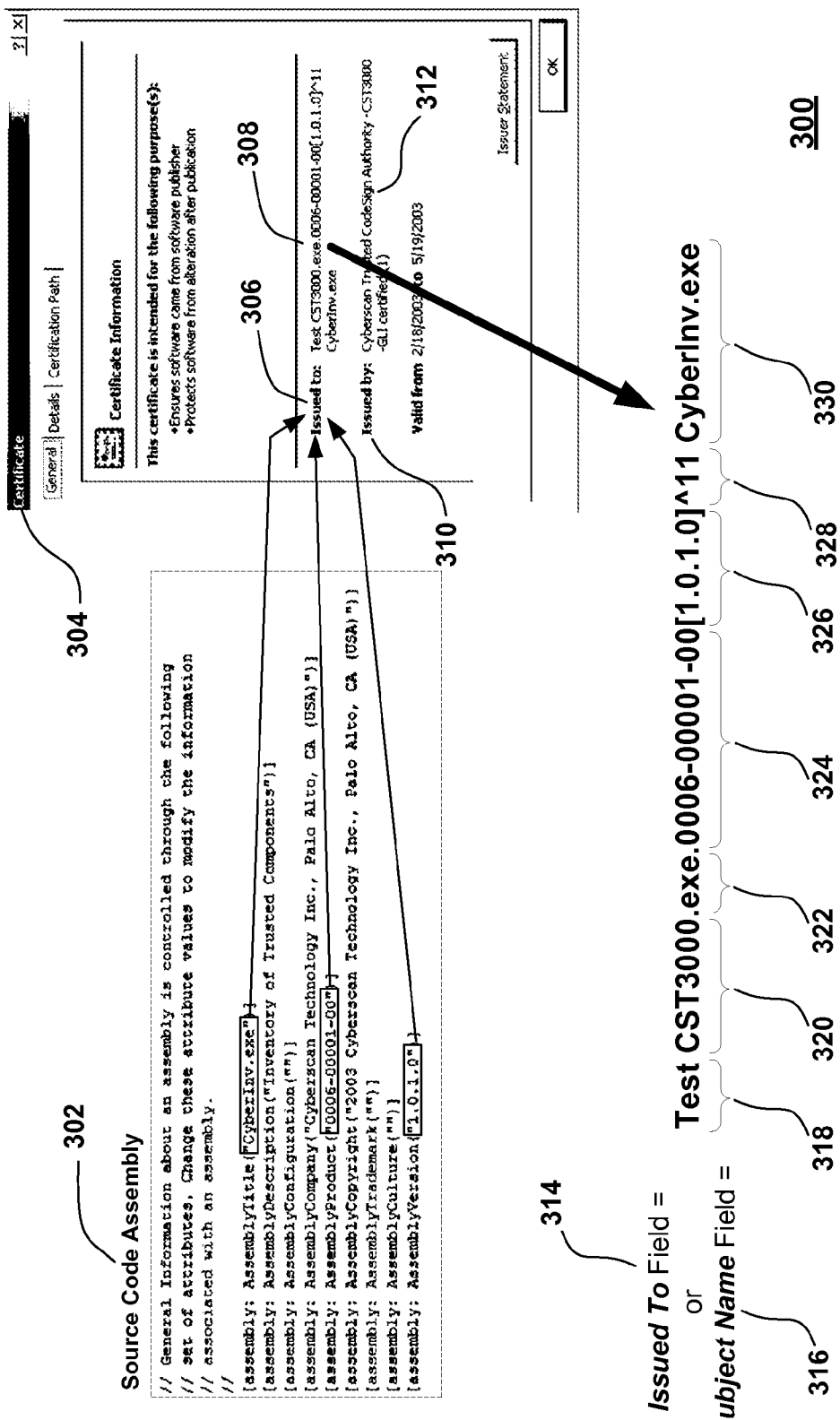
FIG. 3 illustrates the information (test certificate indicator, project/product code, type of executable code, part number, major/minor/build/version, certification lab identifier, friendly name) uniquely identifying each executable software component being used to generate the "Subject Name" (or "Issued to" field, or "CommonName" field) of the individual PKI certificate associated to each executable software component, according to an embodiment of the present invention.

FIG. 3 illustrates the Certificate "Issued to" Field. Reference numeral 300 illustrates the information 308 (test certificate indicator 318, project/product code 320, type of executable code 322, part number 324, major/minor/build/version 326, certification lab identifier 328, friendly name 330) uniquely identifying each executable software component being used to generate the "Subject Name" 316 (or "Issued to" field 306, 314, or also known as the "CommonName"

field) of the individual PKI certificate 304 associated with each executable software component, according to an embodiment of the present invention. The friendly name, part number and version of the executable software components may be substantially identical to those entered in the source code assembly 302. "Subject Name" 316 and "Issued to" field 306, 314 refer to the same information; Subject Name is preferably used hereafter. The certificate authority 312 responsible for generating the PKI certificate is shown in the "Issued by" field 310.

FIG. 4 at 400 illustrates the information that may be entered in the Extended Attributes 408 of a PKI certificate 402, according to an embodiment of the present invention. This information may be viewed by selecting, for example, the "Details" tab 404 of the certificate 402 and selecting "Extensions Only", as shown at 406. Intrinsic information that uniquely identifies each executable software component may be entered in the extended attributes of a PKI certificate in order to attain the same purpose as described for FIG. 3 as an alternative to entering the information in the certificate Subject Name. In the same manner, additional identification information to those entered in the Subject Name may be entered in the extended attributes.

Figure 5:
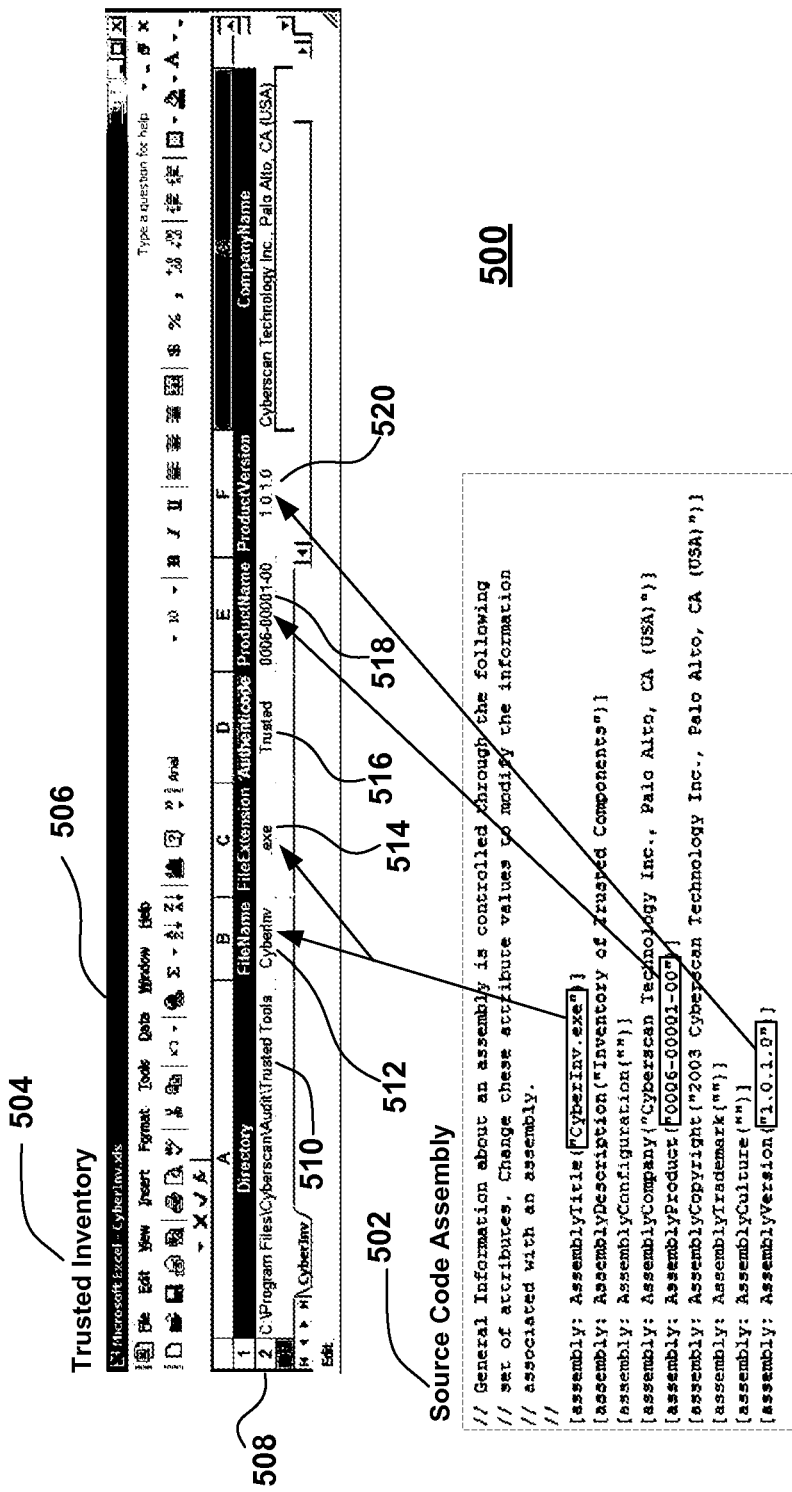
FIG. 5 illustrates the information that may be obtained using the Trusted Inventory tool, according to an embodiment of the present invention.

FIG. 5 illustrates traceability via the Trusted Inventory Tool 504, according to an embodiment of the present invention. Reference numeral 500 in FIG. 5 illustrates the information that may be obtained using the Trusted Inventory tool 504. The trusted inventory tool 504 is a simple application that searches for executable files through the branches of a given tree directory and determines whether the executable software component may be trusted by, for example, calling the Microsoft ChkTrust.exe tool. If the executable software component is signed by a valid PKI certificate and its executable binary data is uncorrupted (its recalculated hash matches the code signature), the ChkTrust.exe tool returns the authenticode "Trusted" attribute; an "Untrusted" attribute is returned otherwise. The Trusted attributes are automatically tabulated in a spreadsheet such as, for example, Microsoft Excel as depicted at 506. Each line 508 in the table provides details on the executable software component that is being examined, such as program path location 510, friendly name 512, executable type 514, authenticode trusted attribute 516, part number 518 and version 520. According to an embodiment of the present invention, therefore, the part number 518, version 520 and friendly name 512 514 identifiers associated with the executable software component using source code assembly directives 502 are traceable via the Trusted Inventory tool.

Figure 6:
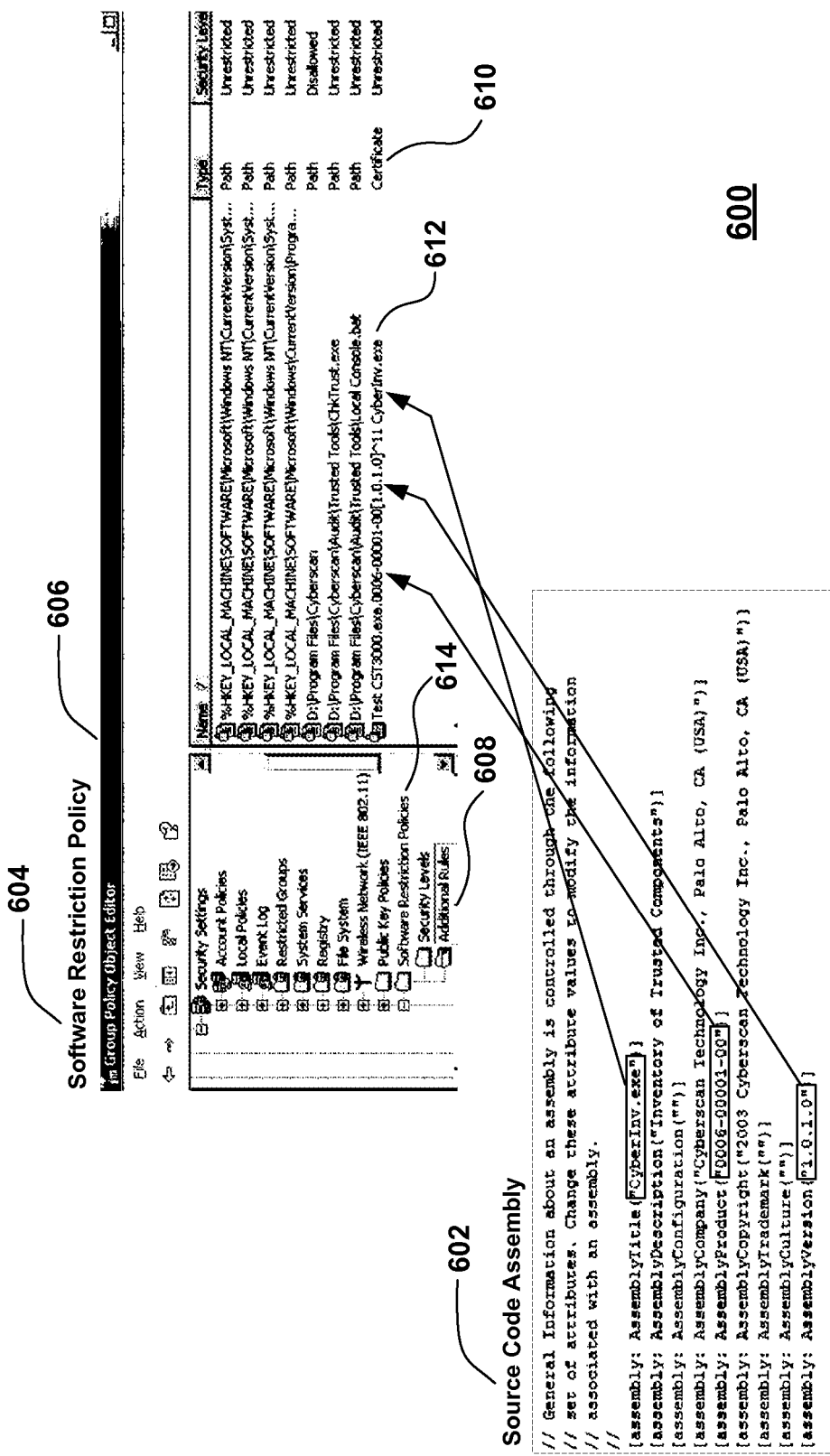
FIG. 6 illustrates the information that may be entered to configure a type-certificate Software Restriction Policy rule, according to an embodiment of the present invention. A Software Restriction Policy (SRP) is configured using the Group Policy Object Editor.

Reference numeral 600 in FIG. 6 illustrates the information that may be entered to configure a type-certificate Software Restriction Policy rule. A Software Restriction Policy (SRP) 604 may be configured using the Group Policy Object Editor 606. The type-certificate Software Restriction Policy rule 610 may be entered in the "Additional Rules" node 608 of the Software Restriction Policy object 614. In FIG. 6, the part number, version and friendly name configured in the source code assembly 602 are recognizable in the certificate subject name 612.

Figure 7:
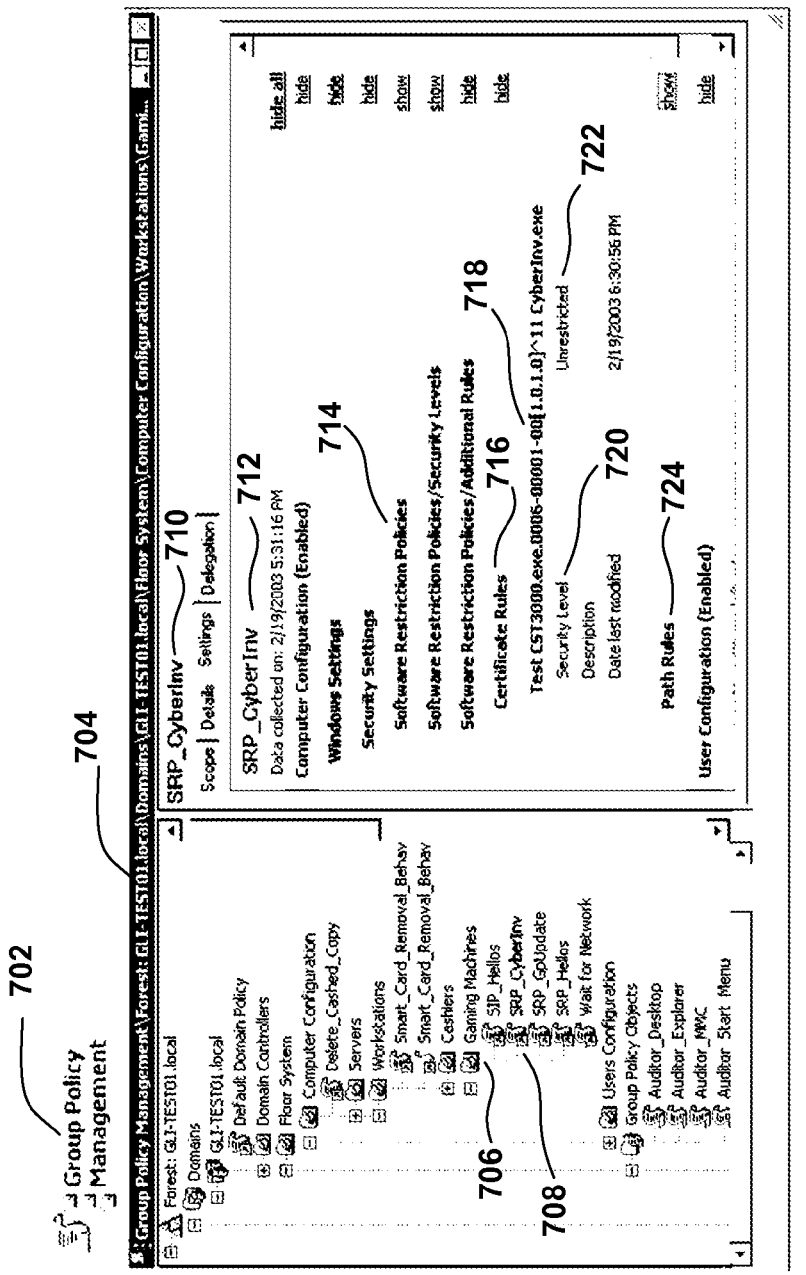
FIG. 7 illustrates the policies that are associated to the active directory container used to configure the gaming machines, according to an embodiment of the present invention.

FIG. 7 illustrates SRP Certificate Rules Policies via the Group Policy Management Console, according to an embodiment of the present invention. Reference numeral 700 in FIG. 7 illustrates the policies that are associated to the active directory container used to configure the gaming machines referenced at 706. Policies are managed using the Group Policy Management Console 702, 704. In this illustration, a policy named "SRP_CyberInv" 708, 710, 712 is selected, for the purpose of viewing a detailed report of the rules that are configured. The report shows details in a hierarchical order. This exemplary policy defines only one certificate rule 716 in the Software Restriction Policy node 714. The certificate subject name 718 is set with a security level 720 of "Unrestricted", as shown at 722, thus ensuring that only the executable software component identified in the certificate subject name is authorized to execute when the policy 714 is enforced. The SRP path rules 724 must be configured such as to prevent non-authorized software from executing. The policy 708 is enforced when it is linked to its container object 706 herein named "Gaming Machines."

Figure 8:
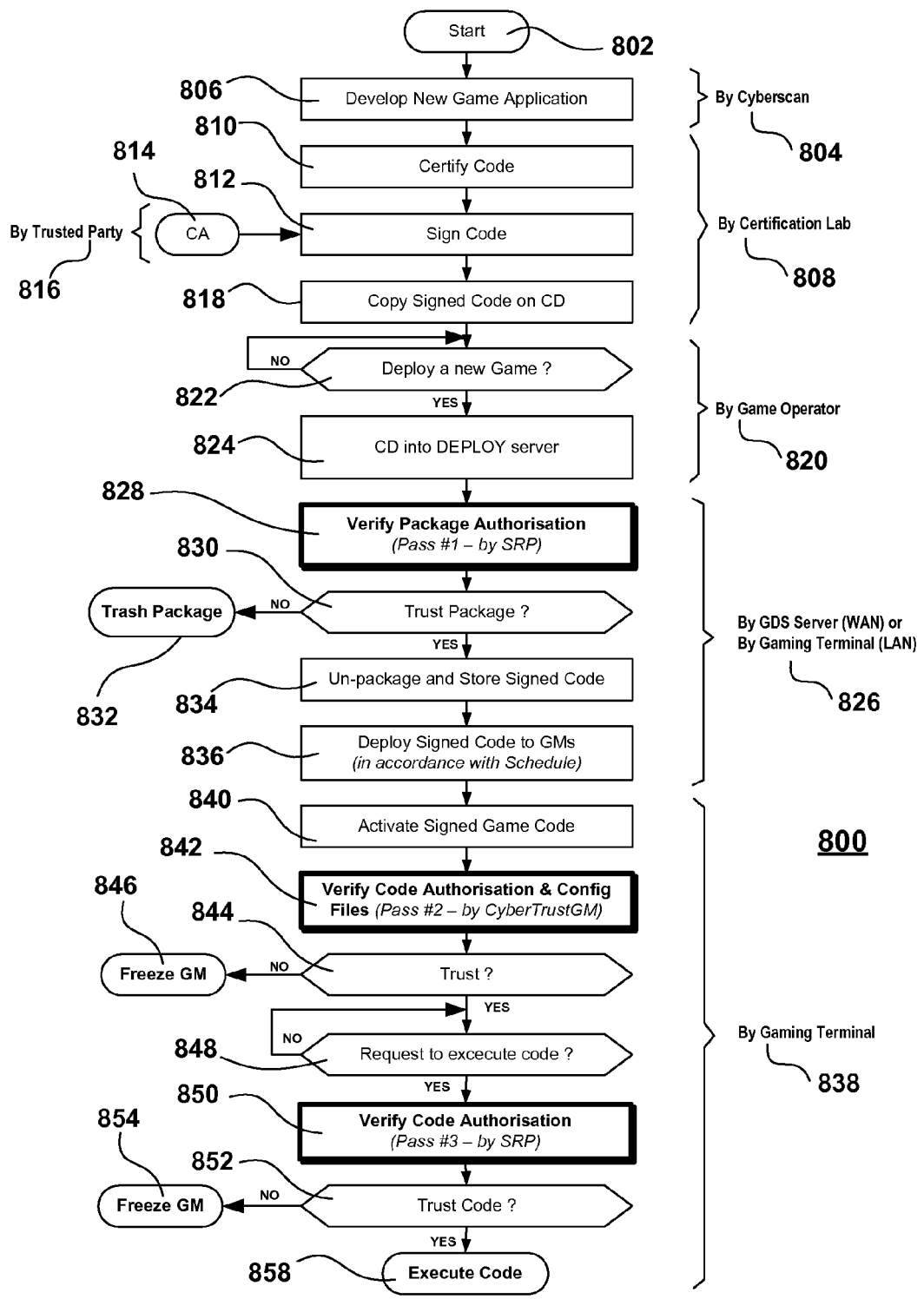
FIG. 8 illustrates an exemplary cycle from the moment a game is being created until it is first executed on a gaming terminal, according to an embodiment of the present invention.

Reference numeral 800 in FIG. 8 illustrates an exemplary cycle from the moment a game is being created until it is first executed on a gaming terminal, according to an embodiment of the present invention. The flowchart 800 starts at 802 when the decision to initiate a project to develop and release a new game is made. The game developer (Cyberscan here, for illustrative purposes only) 804 develops a new game application 806 whose code must be certified at 810 by a recognized certification lab 808. The certified code must then be signed as shown at 812 using PKI certificates produced by a certificate issuing authority (CA) 814 controlled by a trusted party 816. The trusted party 816 may be the certification lab 808. The signed executable software components may be packaged in code-signed MSI installation packages signed in a manner substantially identical to the executable software components, that is, with a unique PKI certificate whose subject name contains part number, version and friendly name identifiers for the MSI package. The MSI packages together with scripts may then be copied to a removable media, such as a CD-ROM 818 for example.

The game operator 820 receives the CD-ROM and when it decides to deploy the new game 822, it copies the packages and associated scripts from the removable media into a library repository on a server 824 (the DEPLOY server in this case). The scripts contain automation tasks such as copying to the repository and configuring the policies.

In the case of gaming terminals connected in a LAN, each gaming terminal 826 is controlled by the policies as soon as they are enforced. The Software Installation Policies (SIPs) controlling the installation of the new game automatically execute the MSI installation packages upon policy enforcement, provided the corresponding Software Restriction Policies have been configured to authorize the execution of the MSI installation packages. This process is performed at 828, 830. If no SRP authorizes the execution of the MSI installation packages, the installation is ignored, as shown at 832. When the MSI installation package is authorized to execute, the software components and other files contained in the package may be copied to the gaming terminals, as suggested at reference numeral 834 836. Other configuration tasks may also be carried out during the Microsoft installer installation process such as, for example, setting the Windows registry, setting shortcuts and installing software patches.

Download of the game software components from the game repository to the gaming terminals may occur as soon as the associated Software Installation Policies are enforced (and the SRPs for the MSI installation package is permitted accordingly). Therefore, scheduling of the download may be achieved by simply enforcing the associated software installation policies at a given time; this may be accomplished by having an operator manually enforcing the SIP at a predetermined time via the group policy management console, or having a process automatically enforcing the SIP at a predetermined time via the API to the group policy management console. Enforcing a policy may be achieved by linking the selected policy to the selected policy object in the domain controller active directory.

Game activation 840 that authorizes execution of the game may be achieved by enforcing the associated Software Restriction Policies. In the same manner, scheduled game activation and deactivation in order to offer selected authorized games to the players at predetermined authorized times may be achieved by simply enforcing the associated Software Restriction Policies at a given time; this may be accomplished by having an operator manually enforce the SRP at a predetermined time via the group policy management console, or having a process automatically enforce the SRP at a predetermined time via the API to the group policy management console. Enforcing a policy may be achieved by linking the selected policy to the selected policy object in the domain controller active directory. Alternatively, a selected executable software component may be prevented from executing by configuring its associated SRP security level to "disallowed."

Figure 9:
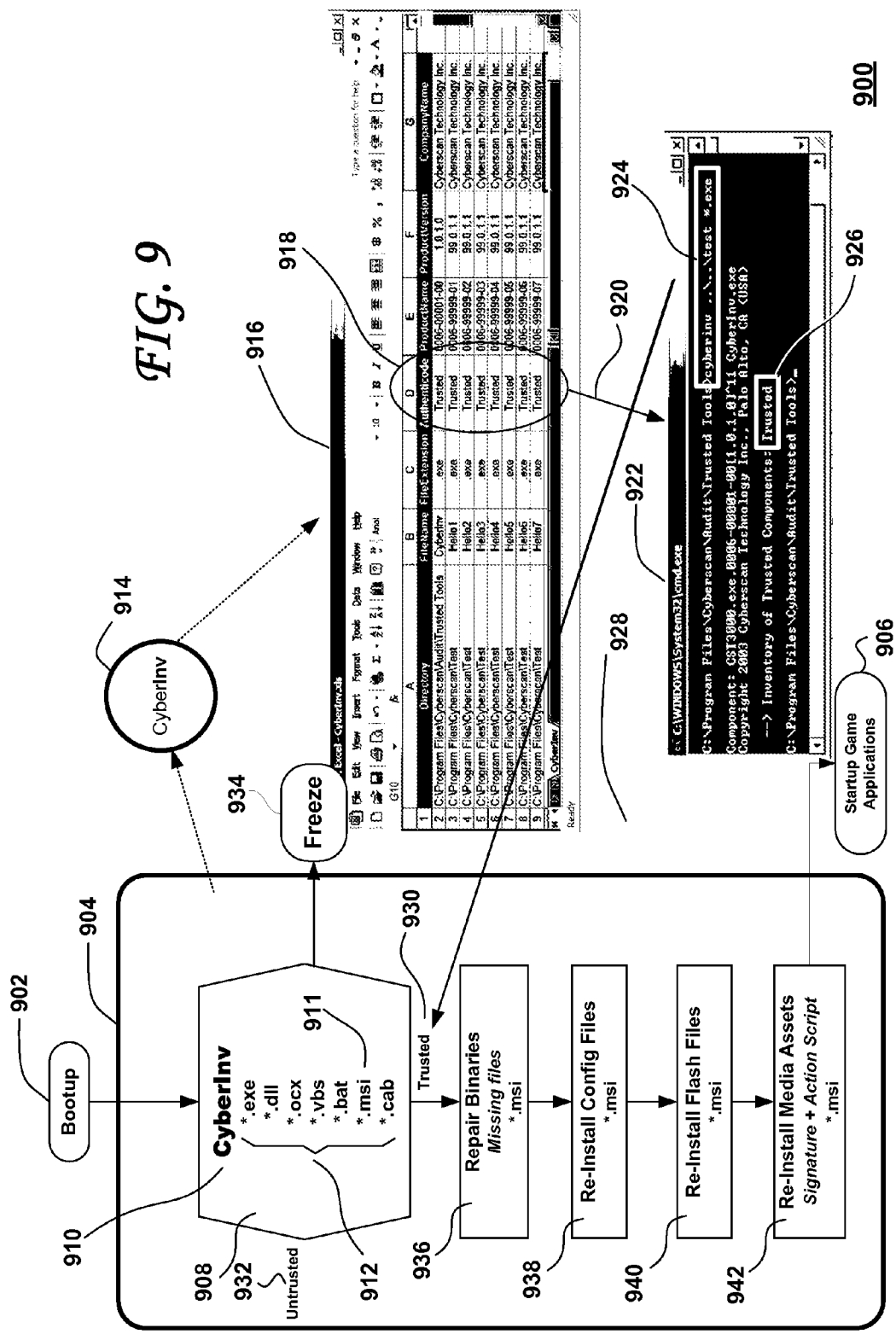
FIG. 9 illustrates the global verification process performed by the terminal in order to check that no unauthorized file may execute or may affect game outcome, according to an embodiment of the present invention.

At this stage, a global verification process 842, 844 as described relative to FIG. 9 may advantageously be executed to verify the trust of every software component installed on the gaming terminal. Should the global verification fail, the gaming terminal may be locked at 846 pending servicing by an attendant.

When a player selects a game from a gaming terminal 838 from a selection menu and requests execution thereof, as shown at 848, the authentic odes of the game's executable software components are verified by the associated enforced Software Restriction Policy as shown at 850 before beginning execution 858. Should the authenticode verification fail at 852, the gaming terminal may be locked at 854 pending servicing by an attendant. If the code is trusted, as verified by the associated enforced SRP, the game is allowed to execute, as shown at 858.

Policy changes are automatically distributed by the Windows server operating system throughout the network connected gaming system at periodic intervals; this automatic process may be disabled if required. Alternatively, the RegisterGPNotification function may be used by the game application software executing on each gaming terminal to check if an applicable group policy has changed. The gaming terminal may then decide on enforcing the policies locally immediately. The gpupdate.exe service, the Refresh Policy function or the RefreshPolicyEx function may be used by the game application software executing on each gaming terminal to enforce the configured policies. A reboot may optionally be performed in order to recheck the gaming terminal trusted base and ensure the policies have been completely enforced (long game installation for example).

The RegisterGPNotification function enables an application to receive notification when there is a change in policy. When a policy change occurs, the specified event object is set to the signaled state. Further information on the RegisterGPNotification function may be found at the Microsoft Development Network Library website. The RefreshPolicy function causes policy to be applied immediately on the client computer. Further information on the RefreshPolicy function may be found at: the Microsoft Development Network Library website. The RefreshPolicyEx function causes policy to be applied immediately on the computer. The extended function allows specifying the type of policy refresh to apply to be specified. Further information on the RefreshPolicyEx may be found at the Microsoft Development Network Library website.

The menu of authorized games offered to the player may be dynamically generated by each terminal without requiring the central system to dispatch the list of authorized games or having each terminal fetch the list of authorized games from the central system; this may be done by having each terminal check the policies enforced on the games. This may be accomplished by having a process in each terminal attempt to execute each of the entry point for each game (the parent module which is first called upon selecting a game to play). If the execution succeeds, then the game is authorized and may be added to the games menu offered to the player. If the execution is denied (SRP is unlinked or the security level is disallowed), then the game is not authorized and it is removed from the games menu offered to the player. Similarly, if a game entry software component file is not found, then the software is not installed or has been removed and is removed from the games menu offered to the player. The process of dynamically generating the game selection menu may be optimized in many ways in order to reduce the game time to start overhead to check if it is authorized.

In a casino, although new games may be scheduled to be downloaded to gaming terminals and activated at predetermined times, it is a requirement that games may not be changed while a player is playing. In practical terms, a player is considered to have terminated his or her game play when the player's credit balance remains at zero for a predetermined period of time. The predetermined period time is sufficient for allowing the player to enter a new bill or other form of credit instrument to continue playing. Therefore, the game application software on each game terminal may, according to embodiments of the present invention, continually test for this condition (credit=0 for a predetermined time) before checking for change in policy, enforcing the policy changes and then updating the menu of games to be made available to the next player.

FIG. 9 at 900 illustrates the global verification process performed by a terminal to check that no unauthorized files are allowed to execute or affect the game outcome. This process may be performed by any of the subsystems connected in the gaming systems.

The process may start with a computer cold or hot reboot 902 such that the operating system trusted base may be thoroughly verified before the game software components are verified. The trusted base is detailed in commonly assigned and copending US application serial number PCT/US2002/029927, entitled "Secure Game Download", the specification of which is incorporated herein by reference, and also in Microsoft Next Generation Secure Computing Base (NG-SCB), also incorporated herein by reference. Details of Microsoft's NGSCB are located at the Microsoft NGSCB web site. During the trusted base verification, the integrity of the Driver Signing framework, the Windows File Protection framework and Software Restriction Policies framework are verified. With NGSCB operating system such as forthcoming "Longhorn", a framework called Nexus deeply integrated directly within the hardware components (in each major chipsets) and the BIOS which constitutes a mechanism for authenticating the trustworthiness of the software and hardware configuration, is booted prior to checking the integrity of the Driver Signing framework, the Windows File Protection framework and Software Restriction Policies framework.

On completion of the operating system boot-up 902 or at another time, the global verification process 904 may be executed. The CyberInv process 910, 914 is also shown and described at FIG. 5. The CyberInv process 910, 914 verifies all the executable files in given folder trees such as 912 (*.exe,

*.dll, *.ocx, *.vbs, *.bat, *.msi, *.cab, for example) for trustworthiness. If any file is found to be untrusted as shown at 932, then the gaming terminal may be frozen as shown at 934 pending examination by security personnel. A spreadsheet file 916 may be produced that list the verification status of each executable file. If the authenticode of all the files is trusted as shown at 918 then the CyberInv process 908, 910, 914, 924 returns at 920 a trusted status, as shown at 926 930. Consequently, all of the executable software components may be considered to be trusted, as shown at 930.

However, it is to be noted that the fact that an executable software component is trusted does not imply that the software component is authorized to execute; it merely indicates that the software executable software component has a valid authorized authenticode certificate and that the software component binary data is not corrupted. Checking whether an executable software component having a valid authorized authenticode certificate is authorized to execute requires that the applicable Software Restriction Policy be checked. This may be performed automatically when the software component is loaded by the operating system to start its execution, either when dynamically building the menu of authorized games, or each time upon starting execution of the game when the player has selected a game to play—or using an appropriate service that may be called by an application.

Although RM (Rights Management) and DRM (Digital Rights Management) technology from Microsoft is readily available for authenticating the trustworthiness of non-executable files such as media files, Word files and emails, for example, it adds management complexity on top of the Software Restriction Policy framework when used in a network-connected gaming system. Addressing this, embodiments of the present invention offer a method for a network connected gaming system to trust non-executable files such as initialization or configuration files, video files, sound files, multimedia files, file containing list of hashes, CRCs, and/or signatures. The present method relies on packaging the non-executable files in a MSI installation package, the MSI package being subsequently code-signed with a unique certificate and the appropriate Software Restriction Policy is configured to enable installation (execution in fact) of this MSI package. Executable files and non-executable files may be packaged together for convenience. The selected aggregate of executable files and non-executable receives at least a part number (and preferably a version number as well) that is used in the subject name of the associated certificate. Consequently, according to embodiments of the present invention, when the MSI package is installed, the installed non-executable files are obtained from a trusted and authorized source.

As the CyberInv process 908 has authenticated the trustworthiness of all the *.msi files 911, therefore whenever there is a need to ensure that the non-executable files are trusted, the associated MSI package is re-installed. It is to be noted that the service that performs the installation of the MSI packages (msiexec.exe in the current versions of Windows) may be executed with a variety of execution modifiers, such as those shown at the Mircrosoft TechNet website. Of particular interest is the c option that reinstalls a file if it is missing or if the stored checksum of the installed file does not match the new file's value (the log file will contain the anomalies detected for subsequent forensic analysis), as shown at 936. In the global verification process 904, the c option of the msiexec.exe command may be used for re-installing every package containing configuration files 938 (such as initialization or configuration files, files containing list of hashes, CRCs, and/or signatures), Flash files 940 (Macromedia Flash and Director), and other media assets files 942 in order to ensure the trustworthiness of these files.

Subsequent to completion of process 908, all the MSI packages for the executable software components may be re-installed with for example, the msiexec.exe command using the p option in order to re-install missing authorized executable software components (the log file will contain the anomalies detected for subsequent forensic analysis).

Subsequent to the successful completion of the global verification process 904, the trustworthiness of the game application framework is established and may be started, as shown at 906.

It is to be noted that when a player wins an amount equal to or greater than $25,000 in a casino, there is a requirement to check the integrity of the gaming application. With legacy gaming terminals, the gaming terminal is powered-down and the ROMs are extracted in order to be verified in a trusted verifier named a "Kobetron." The Kobetron produces a signature for each of the ROMs that is compared with the corresponding signature produced by the certification lab. In this manner, the integrity of the all the software components of the legacy gaming terminal, including the operating system, the game application and the configuration data may be verified. According to embodiments of the invention, when executing the global verification process 904 subsequent to the gaming terminal bootup at 902, a verification equivalent to a "Kobetron verification" may be performed. This metaphor helps greatly in the acceptability of downloadable game technology by game regulators who are reluctant to accept state-of-the-art operating systems, multimedia and network technologies.

Figure 10:
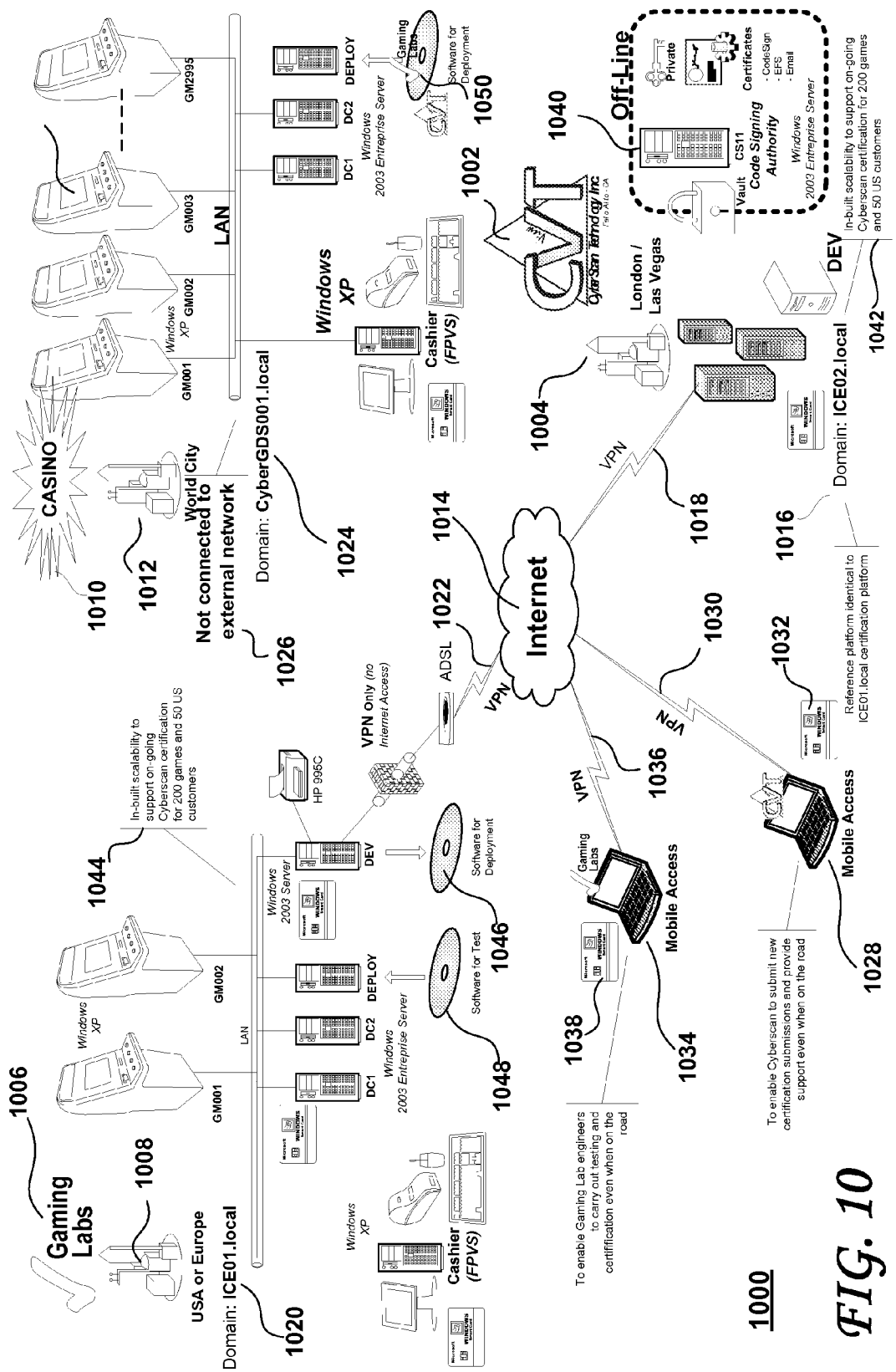
FIG. 10 illustrates the configuration of the three parties involved in a new game cycle detailed at FIG. 8, according to an embodiment of the present invention.

FIG. 10 at 1000 illustrates the configuration of the three parties involved in a new game cycle detailed at FIG. 8, according to an embodiment of the present invention. The three parties involved in a game cycle, according to embodiments of the present invention, are the game developer 1002 whose facilities are located in a given city 1004, the certification laboratory 1006 whose facilities are located in a given city 1008 and the gaming operator 1010 located in a given city 1012. The game developer 1002 and the certification lab 1006 may have a network 1020 of connected gaming system(s) representative of the network connected gaming system in place at the location (e.g., the casino) of the gaming operator 1010. In addition, the game developer 1010 and the certification lab 1006 each may have an integrated software development environment for compiling the game applications source code, each capable of managing at least 200 games for 50 distinct game operators as shown at 1044, (resulting in thousands of source code variants due to local regulation variances). The development environments may be kept synchronized via the secure network link 1016, 1018, 1014, 1022, 1020. A certification authority (CA) 1040 may be located at the game developer's site or may be controlled by an authorized trusted party such as VeriSign. The game developer site and the certification lab site may be accessible from the outside by authorized mobile users 1034, 1028 via secure links 1022, 1018, 1030, 1036. Logon authentication may be carried out using, for example, smartcards as shown at 1038, 1032 or by other secure means.

The game developer 1002 supplies the certification lab 1006 with a CD-ROM (or other media) containing the software components to be tested, as shown at 1048. The certification lab then certifies the software components supplied on the CD-ROM and provides the game developer 1002 with a CD-ROM containing the certified software components for deployment, as shown at 1046. The CD-ROM 1046 containing the authorized software components that were tested and certified by the certification lab 1006 may then be provided to the game operator (e.g., the casino) for installation and deployment on one or more of the gaming machines GM001, GM002, GM2995 coupled to the network 1024. The certified authorized software components are code-signed using a certificate produced in accordance with an embodiment of the present invention, as described hereinabove. The network 1024 is preferably not coupled to any external network, as suggested at 1026.

Figure 11:
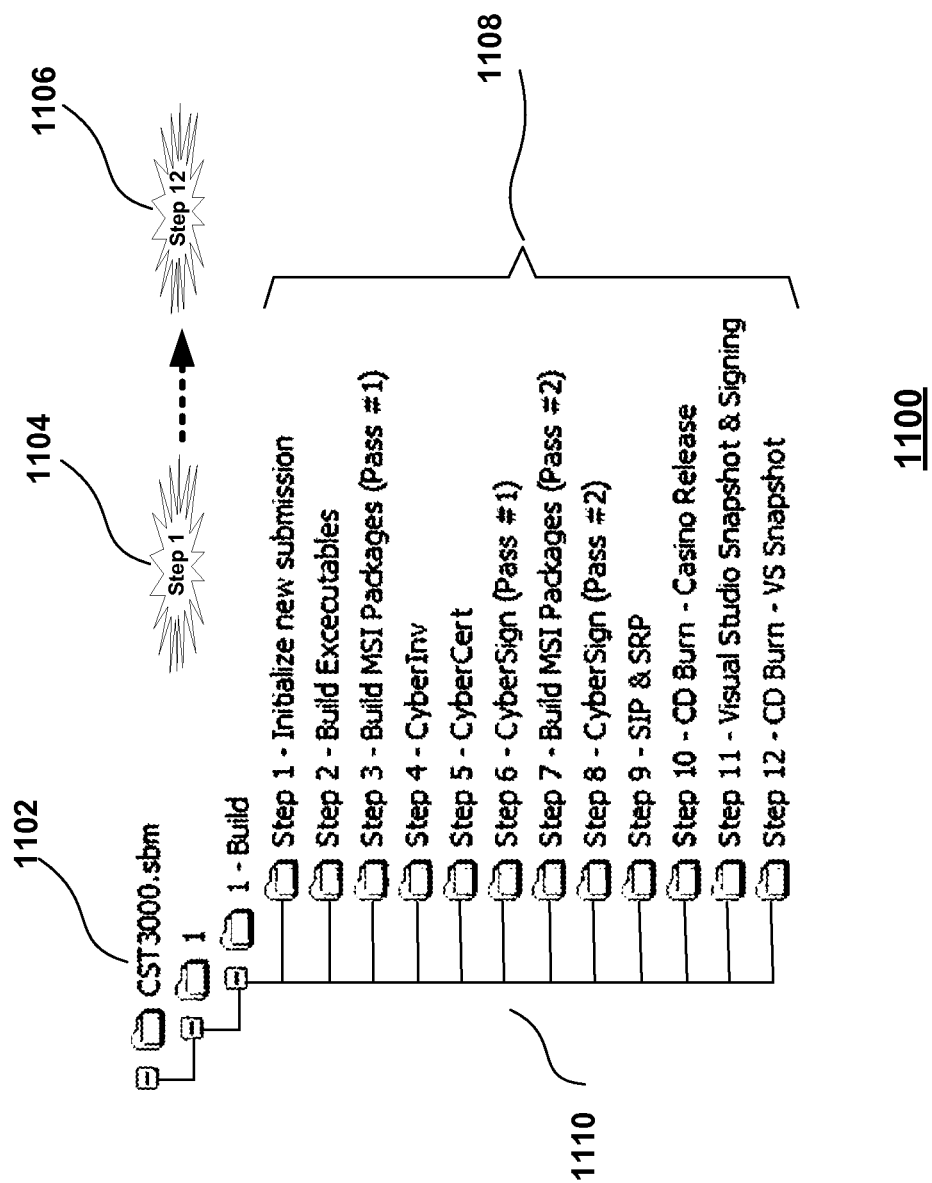
FIG. 11 illustrates the 12 folders created on the disk repository of the development environment, according to an embodiment of the present invention.

FIG. 11 shows a 12-Step Integrated Certification Environment Process, according to an embodiment of the present invention. Shown at 1100 are the 12 folders 1110 created on the disk repository 1102 of the development environment. The 12 folders 1110 are mapped to the 12-step procedure 1104 to 1106 involved in producing the CD-ROM 1050 containing the certified authorized software components. Each folder contains the computer resources and instructions to carry out each step. The folders are clearly named with the step number and the title description of the procedure step at 1108.

Figure 12:
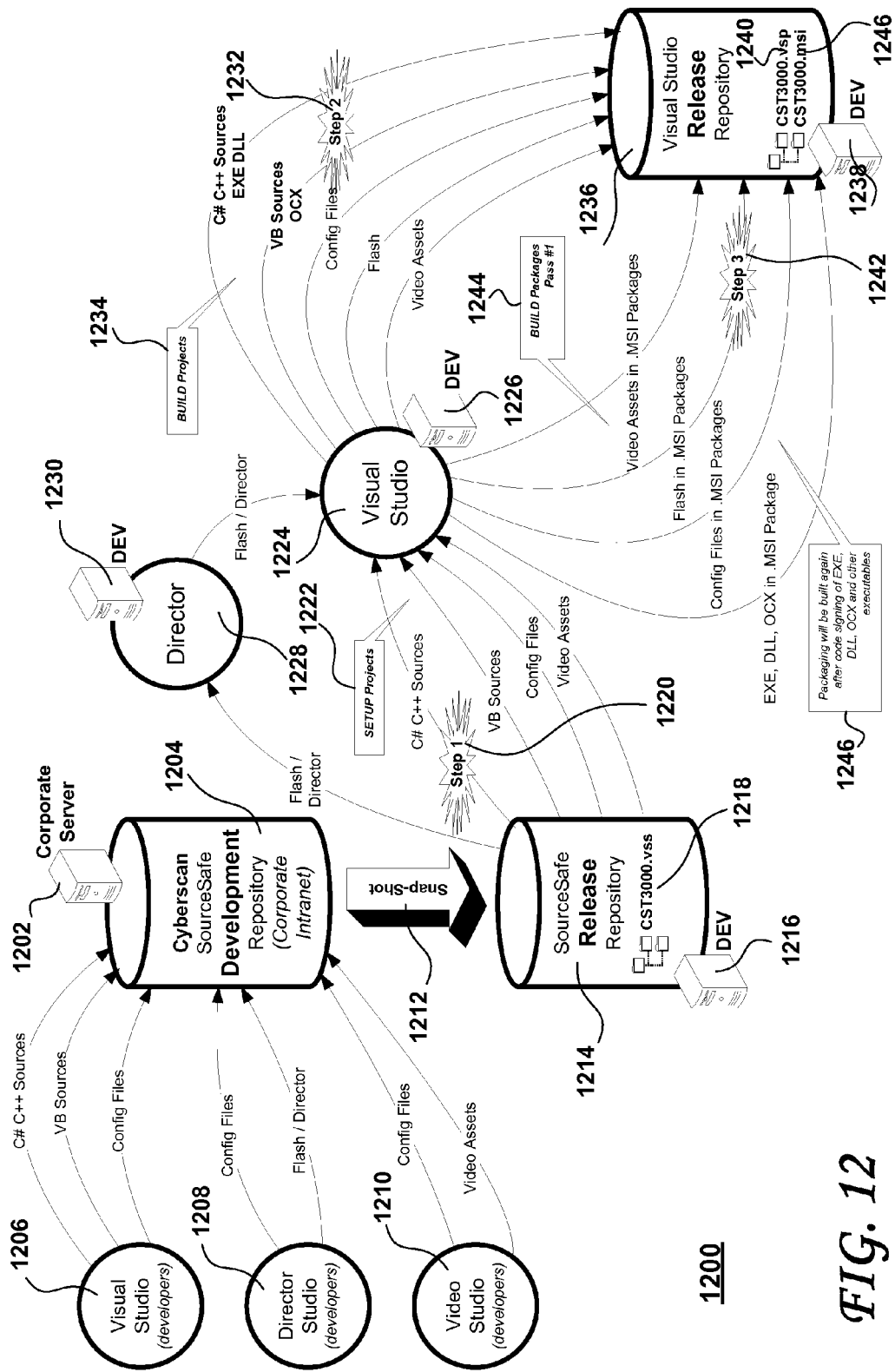
FIG. 12 illustrates the dataflow for step 1 to step 3 for producing the certified authorized software components, according to an embodiment of the present invention.

FIG. 12 shows a dataflow diagram of Step #1 to Step #3 of the Integrated Certification Environment Processor for producing certified authorized software components, according to an embodiment of the present invention. Step 1 at 1220 may include obtaining a snapshot 1212 of the repository 1204 containing the game developer's source code 1206, data files 1208 and media assets 1210 in order to configure the building environment of the reference platform with all the source code, data files, media asset files and resources files required to initiate the certification process. The snapshoot files 1212 may be stored in a repository 1218 controlled by a version configuration and control system (SCCS) such as Microsoft Visual Source Safe 1214 (VSS) on the DEV development computer 1216. The files may be grouped in project directories as "Projects" such that the source files, control files and resource files are stored in convenient systematic fashion in the Visual Studio repository 1240 on the development computer 1238. An inventory of the files submitted for certification may be produced. Step 1 may be qualified as "SETUP Projects" 1222.

Step 2 at 1232 may include compiling the source code and producing binary executable code. Microsoft Visual Studio 1224 is constructed so as to manage source code as projects (a project can be a given game) regrouping all of the dependent source code, and data files. Step 2 is also referenced as building the projects or "BUILD Projects", as shown at 1234. Media assets may require a different compiling environment on the DEV computer 1230 such as the Macromedia Director 1228.

Step 3, shown at 1242 may include producing the projects MSI packages 1244 for the source code compiled in Step 2. Relevant non-executable file such as configuration files and media assets may be packaged in MSI packages with the compiled source code. It is to be noted 1246 that packages will be built again (step 8 hereafter) after code signing of EXE, DLL, OCX and other executables (step 6 hereafter). Step 3 may be referenced as "BUILD Packages Pass #1" 1244.

Figure 13:
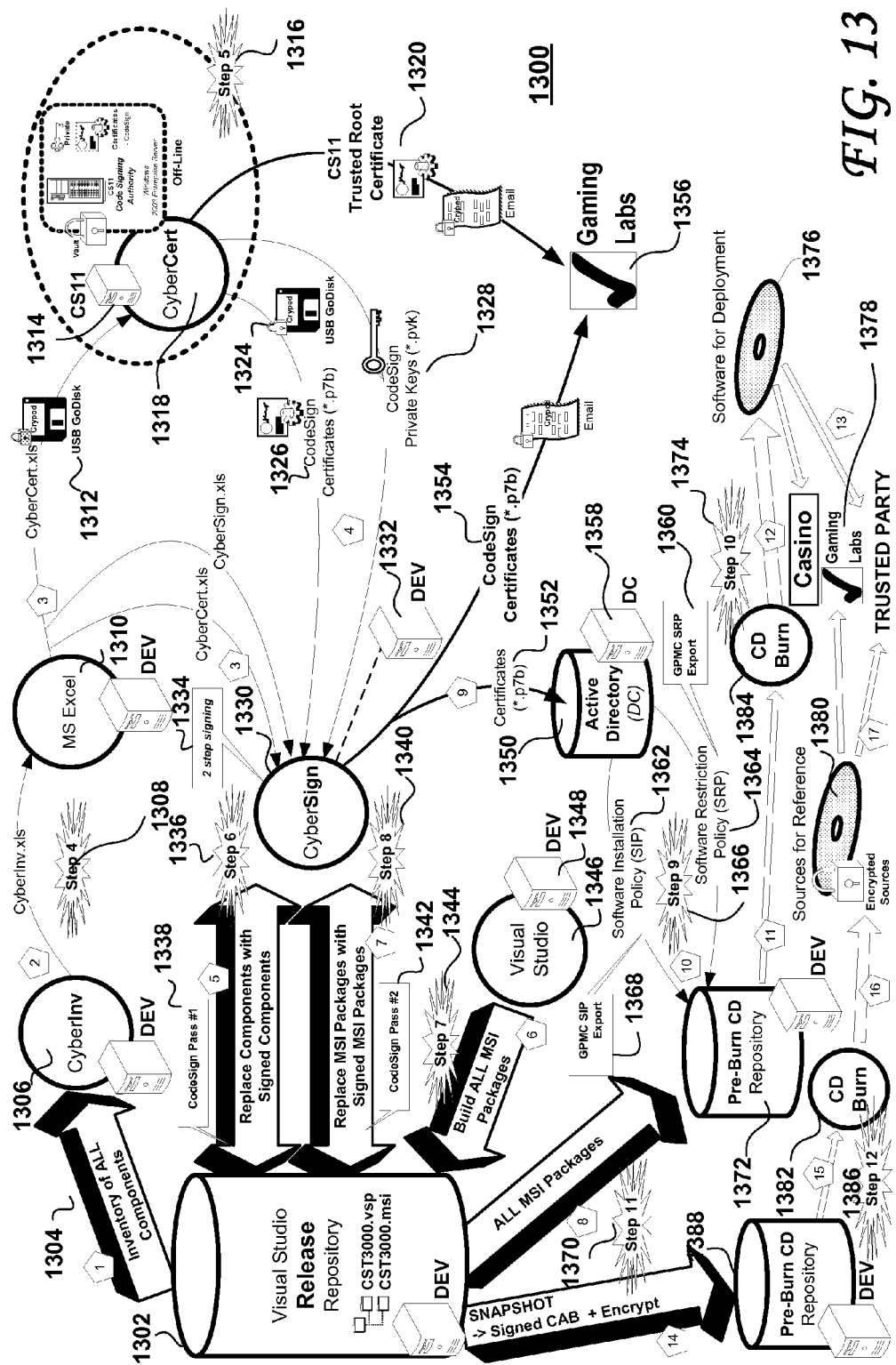
FIG. 13 illustrates the dataflow for step 4 to step 12 for producing the certified authorized software components, according to an embodiment of the present invention.

FIG. 13 shows, at 1300, the dataflow for step 4 to step 12 for producing the certified authorized software components, according to an embodiment of the present invention. Step 4 at 1308 calls for the CyberInv.exe process 1306, for a selected project (a Visual Studio project may typically regroup all the software components for an entire game), perform an inventory 1304 of the compiled software components produced by Visual Studio 1302 on completion of the Build Project process 1234 (FIG. 12) as well as the MSI install packages produced by the Build MSI Packages Pass #1 1244 process (FIG. 12). The CyberInv.exe 1306 process may also include any other executable software components not directly managed under Visual Studio such as, for example, ocx, *.vbs, *.bat, *.cab, *js. (in fact, any executable component that is supported by the Software Restriction Policy technology).

The CyberInv.exe process 1306 produces the CyberInv.xls 1307 Excel spreadsheet file 916 shown at FIG. 9, which is examined by an authorized user in the MS Excel program 1310. The CyberInv.xls 1307 file is copied to the folder "Step 4—CyberInv" folder in 1110 in FIG. 11. The binary files having just been compiled are not code-signed; consequently the authenticode field shows an "Untrusted" status for each of the binary components. The friendly name, file type, part number and version (including build number) are extracted directly from the assembly information contained in the source code, therefore truly reflecting the identity of the source code component.

Because the build number is incremented each time the code is recompiled in a Build operation, it is to be noted that the version number will change accordingly. The authorized user eliminates the rows that are irrelevant to the game to be certified and saves the file under the CyberCert.xls 1311 file name which contains the necessary friendly name 512, executable type 514, part number 518 and version 520 information to compose the PKI certificate subject name in accordance with method detailed at FIG. 3 for subsequent code signing. The program path location 510 of the unsigned software components is also available for later retrieval of the unsigned binary file. The CyberCert.xls 1311 file is copied to the folder "Step 5—CyberCert" folder in 1110 in FIG. 11.

The CyberCert.xls 1311 file may be securely copied in encrypted form to a removable media such as a floppy disk, a CD-ROM or a USB disk 1312, or alternatively transferred to another location by secure communication means.

The CyberCert.xls 1311 file is split into 2 files CyberSign1.xls 1317 and CyberSign2.xls 1319. CyberSign2.xls contains only the rows associated to the MSI packages and CyberSign1.xls contains the rows corresponding to the other executable file. CyberSign1.xls is copied to the "Step 6—CyberSign (Pass #1)" folder in 1110 in FIG. 11, and CyberSign2.xls is copied to the "Step 8—CyberSign (Pass #2)" folder.

Step 5 at 1316 includes having a certification authority (CA) 1315 located at the game developers' site or controlled by an authorized trusted party such as VeriSign generating certificates in accordance with the details provided in the CyberCert.xls 1311 file, that is, with a subject name created in accordance with the method detailed relative to FIG. 3. An automated process CyberCert.exe 1318 executing on the off-line CA computer Windows server named CS11 1314 may automate the generation of the PKI public certificates 1326 and the associated private keys 1328 using the CyberCert.xls 1311 file.

The trusted root certificate for the authorized CA 1320 is supplied to the certification lab, the game regulators or other parties for reference and for importing as a trusted root into the ICE computer system and the gaming system certificates store.

The public certificates 1326 and their associated private keys 1328 are forwarded to the DEV computer 1332 of the ICE system in encrypted form on a removable media such as a floppy disk, a CD-ROM or a USB disk 1324, or alternatively transferred by secure communication means. Public certificates 1326 and their associated private keys 1328 that are associated with the MSI packages are copied into the "Step 6—CyberSign (Pass #1)" folder in 1110, and the other public certificates 1326 and their associated private keys 1328 that are associated with other software components are copied to the "Step 8—CyberSign (Pass #2)" folder.

Step 6 1336 includes steps of code signing the non-MSI executable components listed in the CyberSign1.xls 1317 file using the corresponding public certificates 1326 and their private keys 1328. The code signing may be performed using the SignCode.exe utility provided by Microsoft, or equivalent. A password may be required for the private key depending on the security option selected when generating the certificate at the CA. The CyberSign.exe process 1330 may automate the code-signing of all the non-MSI executable components listed in the CyberSign1.xls 1317 file using the friendly name, file type, part number and version (including build number) given in each row. The CyberSign.exe process may call the SignCode.exe utility or the equivalent API. During the code signing process, the compiled executable software components may be replaced at 1339 by their code-signed form. Step 6 is designated as "CodeSign Pass#1" 1338.

Step 7 at 1344 includes re-building all the MSI install packages 1345 performed during step 3 at 1242. This time, the MSI packages contain the non-MSI code-signed executable components.

Step 8 at 1340 includes code signing the MSI executable components listed in the CyberSign2.xls 1319 file using the corresponding public certificates 1326 and their private keys 1328. The code signing may be performed using the SignCode.exe utility provided by Microsoft, or equivalent. A password may be required for the private key depending on the security option selected when generating the certificate at the CA. The CyberSign.exe process 1330 may automate the code-signing of all the MSI executable components listed in the CyberSign2.xls 1319 file using the friendly name, file type, part number and version (including build number) given in each row. The CyberSign.exe process may call the SignCode.exe utility or the equivalent API. During the code signing process, the executable MSI software components may be replaced 1341 by their code-signed form. Step 8 is designated as "CodeSign Pass#2" at 1342. The executable MSI software components are copied as shown at 1371 to the CD Pre-Burn repository 1372.

Because of the necessity of performing step 7, the CyberSign 1330 code-signing process to be used for the ICE (Integrated Certification Environment) is designated a "2-Pass code-sign", as indicated at 1334.

Step 9 1366 includes (a) configuring the software restriction policy (SRP) 1360 for the ICE system test gaming terminals (via the active directory 1350 in the domain controller DC) with the certificate rules corresponding to the certificate produced at step 5 (the *.p7b certificate at reference numeral 1326 may be converted to *.cert certificates for compatibility reasons when configuring the SRP); (b) configuring the Software Installation Policy (SIP) 1368 for the ICE system test gaming terminals with the MSI packages produced at step 7, then (c) using the GPMC (Group Policy Management Console) or equivalent service, exporting the SIP via SIP export scripts 1362 and the SRP via SRP export scripts 1364 (the policy export facility is available in the Group Policy Management Console GPMC 702, 704). These SIP and SRP export scripts may be copied into the folder "Step 9—SIP & SRP" folder in 1110. These SIP and SRP export scripts may be later imported in the gaming operator's 1010 gaming system for enforcing the policies on the game components. SIP export scripts 1362 and SRP export scripts 1364 are stored in the CD Pre-Burn repository 1372 (or into the folder "Step 10—CD Burn-Casino Release" folder in 1110).

Step 10 at 1374 includes steps of burning at 1384 to a CD-ROM 1376 or other removable media the content of the CD Pre-burn repository 1372 comprising (a) the executable MSI software components 1371; (b) the SIP export scripts 5 1362 and SRP export scripts 1364 and (c) other automation scripts in order to automate the installation of (a) and (b). A copy of CD-ROM 1376 may be forwarded (a) to the gaming operator's 1010 gaming system for game deployment (such as a casino 1379), (b) to the certification lab 1378, and (c) a trusted party 1377 such as a lawyer or in escrow for impartial reference in case of later dispute. The CD-ROM 1376 may later be inserted at 1050 in the gaming operator's 1010 gaming system for game deployment.

Step 11 at 1370 includes steps of (a) taking a snap-shot 1387 of the entire development environment for a selected certified game (Visual Studio repository 1302 and Visual Source Safe repository 1214 1218 that contains all the source file, the compiled code-signed executable files and dependant executable files, the non-executable files, project solution, automation scripts, the source and compiled signed code from other development platforms, the media assets from media development platforms such as MacroMedia Director 1228); in (b) taking a snap-shot 1387 of the code-signed MSI installation packages; in (c) optionally encrypting them; and then in (d) copying them into a CD pre-burn repository 1388 (or into the folder "Step 12—CD Burn-VS Snapshot" folder in 1110).

Step 12 at 1386 includes steps of burning at 1382 to a CD-ROM 1380 or other removable media the content of the CD Pre-burn repository 1388 comprising the software components of step 11. A copy of CD-ROM 1380 may be forwarded to the certification lab 1378 and to a trusted party 1377 such as a lawyer or in escrow for impartial reference in case of later dispute.

Steps 4 to step 12 should be carried out each time a source code is being recompiled subsequent to a modification because a unique certificate must be associated to each build. Deviating from this order may jeopardize certificate integrity because of the risk of a human error that may result in the wrong certificate being used during the code signing process.

Figure 14:
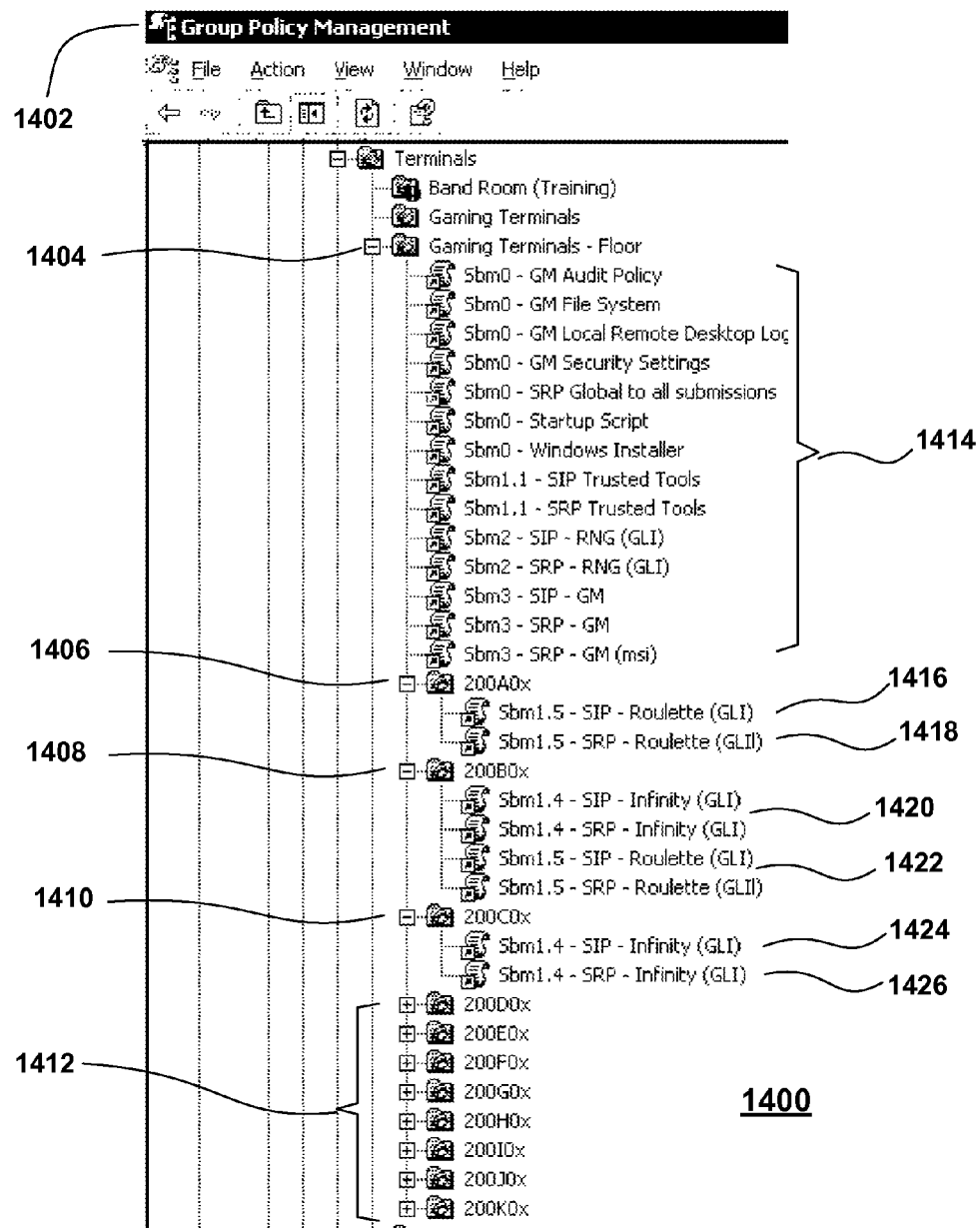
FIG. 14 illustrates the grouping of gaming terminals and the associated enforced policies, according to an embodiment of the present invention.

FIG. 14 illustrates assignment of policies by banks of gaming machines. Reference numeral 1400 in FIG. 14 shows the grouping of gaming terminal and the associated enforced policies. In this illustration, the Group Policy Management console 1402 may be configured such that the active directory Organization Unit (OU) named "Gaming Terminals-Floor" at 1404 is architectured to regroup the gaming terminals in "banks" or sub-Organization Units (sub-OUs) identified by 200A0x 1406, 200B0x 1408, 200C0x 1410, and 200D0x to 200K0x at reference numeral 1412. Each bank contains a predetermined number of gaming terminals, in multiples of 8 units, for example.

Noting the hierarchical tree composed of the OUs and sub-OUs illustrated at 1400, all the policies 1414 apply to the OU "Gaming Terminals-Floor" 1414 which contains all the sub-OUs 1406 1408 1410 and 1412. Using this technique, all the policies 1414 may apply to all the 3000 gaming terminals of a large casino. In the same manner, the policies 1416, 1418 apply to the bank 1406; the policies 1420, 1422 apply to the bank 1408; and the policies 1424, 1426 apply to the bank 1410.

In the illustration, the exemplary game named "Roulette" is assigned a policy named "Sbm1.5-SIP-Roulette (GLI)" 1416 which configures the Software Installation Policy (SIP) and a policy named "Sbm1.5-SRP-Roulette (GLI)" 1418 which configures the Software Restriction Policy (SRP) for that game.

In the same manner, the exemplary game named "Infinity" is assigned a policy named "Sbm1.4-SRP-Infinity (GLI)" 1424 which configures the Software Installation Policy (SIP) and a policy named "Sbm1.4-SRP-Infinity (GLI)" 1426 which configures the Software Restriction Policy (SRP) for that game.

The keyword "Sbm1.4", in this example, denotes the certification submission number 1.4, and the keyword "GLI" denotes the certification lab GLI (Game Laboratories International) approving the Infinity game software.

In the illustration, all of the game terminals regrouped in the bank 200A0$x$ shown at 1406 are, therefore, configured to execute the Roulette game, all the game terminals in the bank 200B0$x$ shown at 1408 are configured to execute the Roulette game and the Infinity game, and all the game terminals in the bank 200C0$x$ shown at 1410 are configured to execute the Infinity game.

Figure 15:
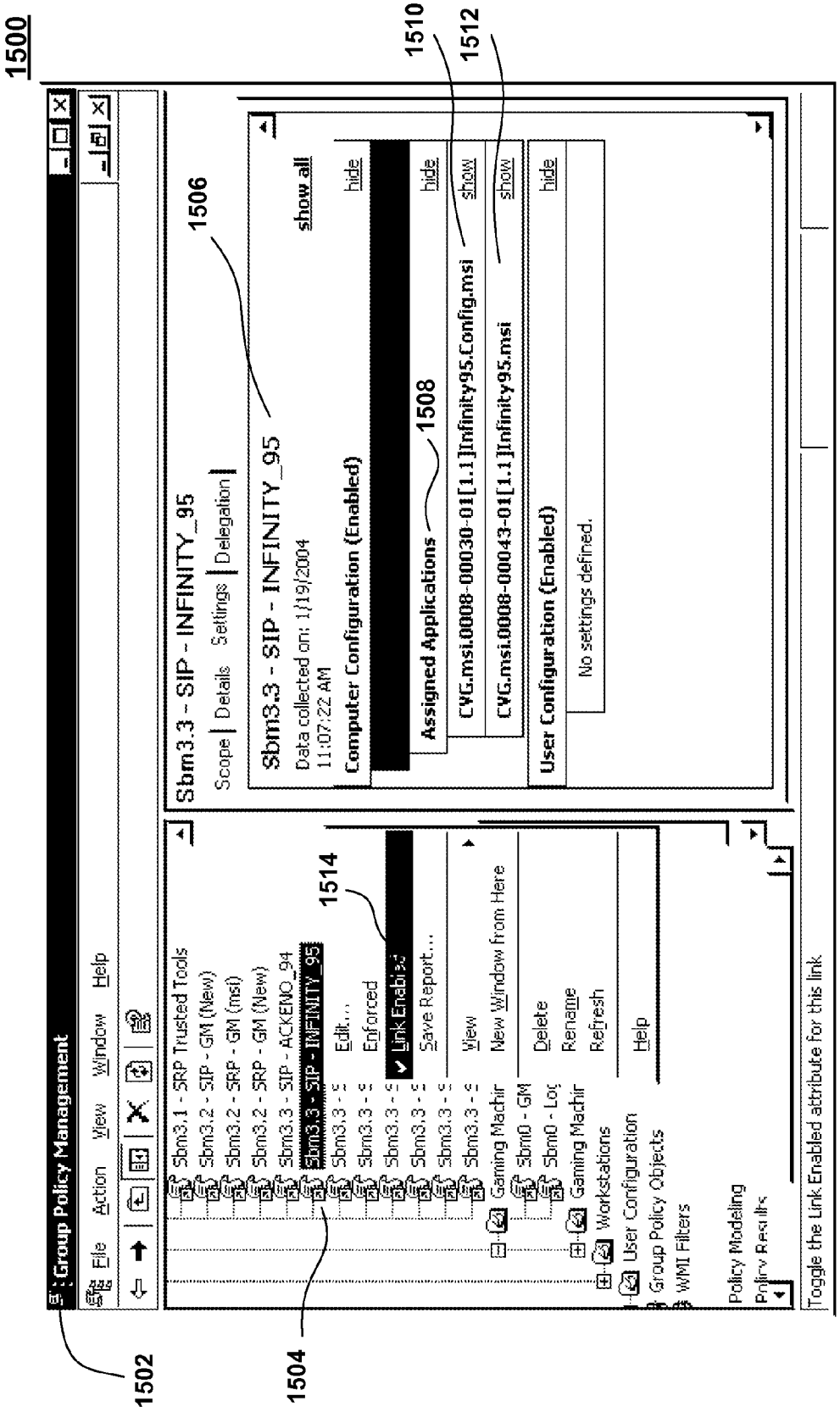
FIG. 15 illustrates a method for enforcing a Software Installation Policy by "linking" the policy, according to an embodiment of the present invention.

FIG. 15 shows the enforcement of a Software Installation Policy (SIP). In FIG. 14, banks of gaming terminals are configured to execute authorized games using SIPs and SRPs policies. However, in order for the gaming terminals to be able to install a game, the associated Software Installation Policy must be enforced. At 1500, FIG. 15 illustrates a method for enforcing a Software Installation Policy by "linking" the policy, according to an embodiment of the present invention. This is accomplished in the Group Policy Management console 1502 by, e.g., right-clicking the selected policy 1504, 1506 "Sbm3.3-SIP-INFINITY_95" associated to the Infinity game with a Return To Players (RTP) percentage of 95% and selecting the "link Enabled" attribute 1514. The software components for the Infinity_95 game contained in the two MSI installation packages 1510 and 1512 will subsequently be installed, provided the associated SRPs are configured to authorize execution of these two MSI packages (refer to description for FIG. 16). Alternatively, the same procedure may be automated via an API called from an appropriate application. It is to be noted that the linking of the policy will in fact enable the enforcement of the policy, but the policy will only be enforced on the gaming terminal when a gpupdate command or equivalent command is performed at the terminal; a terminal reboot may also be required for the policy to be enforced. Also to be noted is that policy changes are automatically distributed by the Windows server operating system throughout the network connected gaming system at periodic intervals; this automatic process may preferably be disabled such as to obtain more predictable policy enforcement changes by issuing explicit commands instead.

Package 1512 (friendly name: Infinity95.msi) contains the executable software components for the Infinity game and package 1510 (friendly name: Infinity95.Config.msi) contains the configuration files (the non-executable files) for the Infinity game. Package Infinity95.Config.msi 1510 is re-installed in the process 938.

Figure 16:
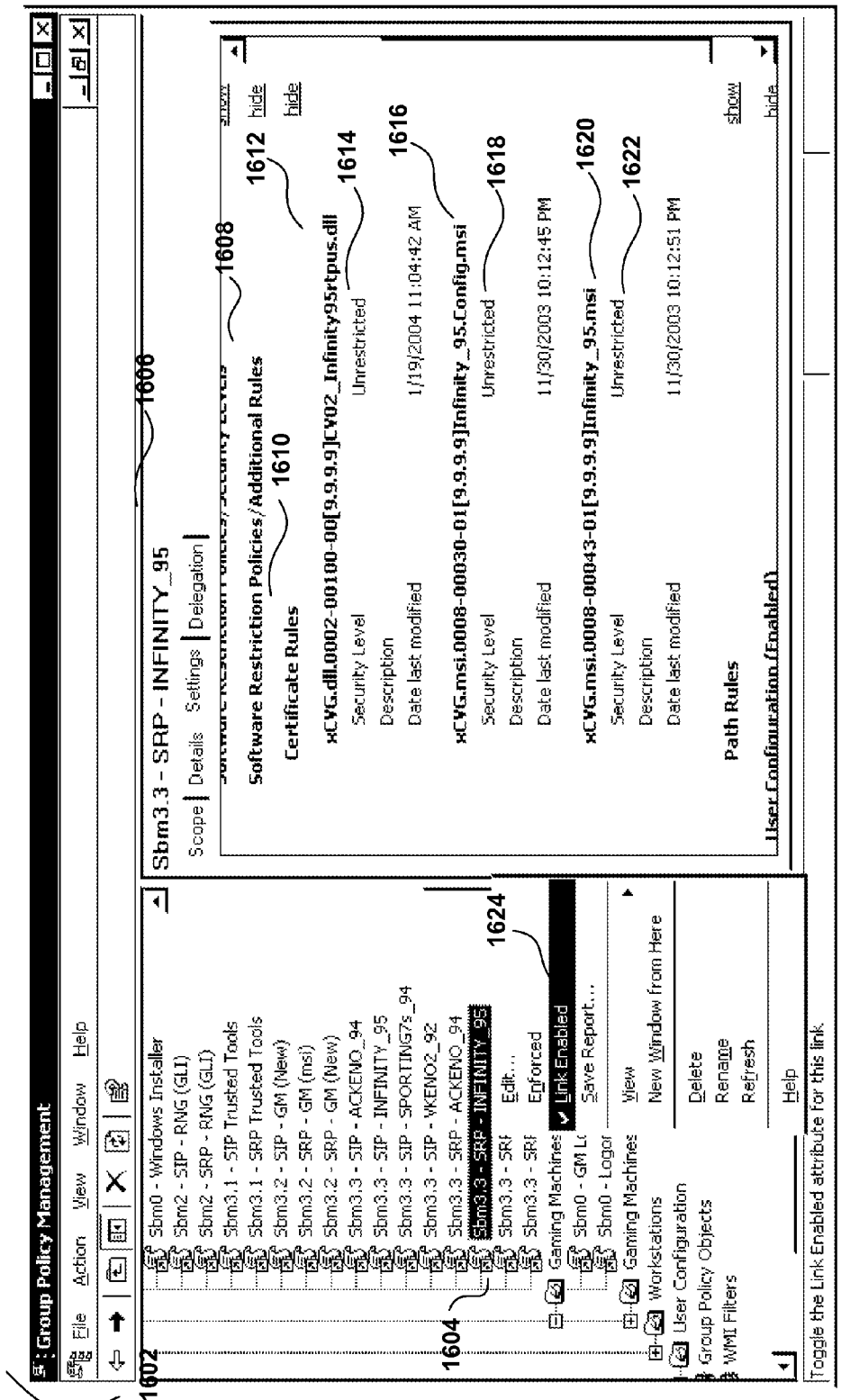
FIG. 16 illustrates a method for enforcing a Software Restriction Policy by "linking" the policy, according to an embodiment of the present invention.

FIG. 16 illustrates the enforcement of a Software Restriction Policy (SRP). In FIG. 14, banks of gaming terminals are configured to execute authorized games using SIPs and SRPs policies. However, in order for the gaming terminals to be able to execute the games, the policies must be enforced. FIG. 16 at 1600 illustrates a method for enforcing a Software Restriction Policy 1608 by "linking" the policy. This is accomplished in the Group Policy Management console 1602 by, e.g., right-clicking the selected policy 1604, 1606 "Sbm3.3-SRP-INFINITY_95" associated to the Infinity game with a Return To Players percentage (RTP) of 95% and selecting the "link Enabled" attribute 1624.

The certificate rules 1610, 1616 and 1620 that are configured with the "Unrestricted" attribute 1618, 1622 authorize the installation of the software components for the Infinity_95 game contained in the two MSI installation packages 1510 and 1512 by authorizing the unique PKI certificate associated to those MSI produced in accordance with the present method. The ."dll" executable software component 1612 is authorized, has its security level attribute set to "Unrestricted" and is, therefore, authorized to execute once it is installed.

The two MSI installation packages 1510 and 1512 for installing the software components for the Infinity_95 game have their associated unique PKI certificate 1616 and 1620 (produced in accordance with the method described herein) configured with the "Unrestricted" security level attribute 1618, 1622 via the certificate rules 1610, thus enabling (or authorizing) execution and installation of the software components for the Infinity_95 game.

The ."dll" executable software component contained in the 1512 package has its security level attribute set to "Unrestricted" thus it is authorized to execute once it is installed.

Alternatively, the same procedure may be automated via an API called from an appropriate application. It is to be noted that the linking of the policy will in fact enable the enforcement of the policy, but the policy will only be enforced on the gaming terminal when a gpupdate command or equivalent command is performed at the terminal; a terminal reboot may also be required for the policy to be enforced. Also to be noted is that policy changes are automatically distributed by the Windows server operating system throughout the network connected gaming system at periodic intervals; this automatic process may preferably be disabled such as to obtain more predictable policy enforcement changes by issuing explicit commands instead.

Figure 17:
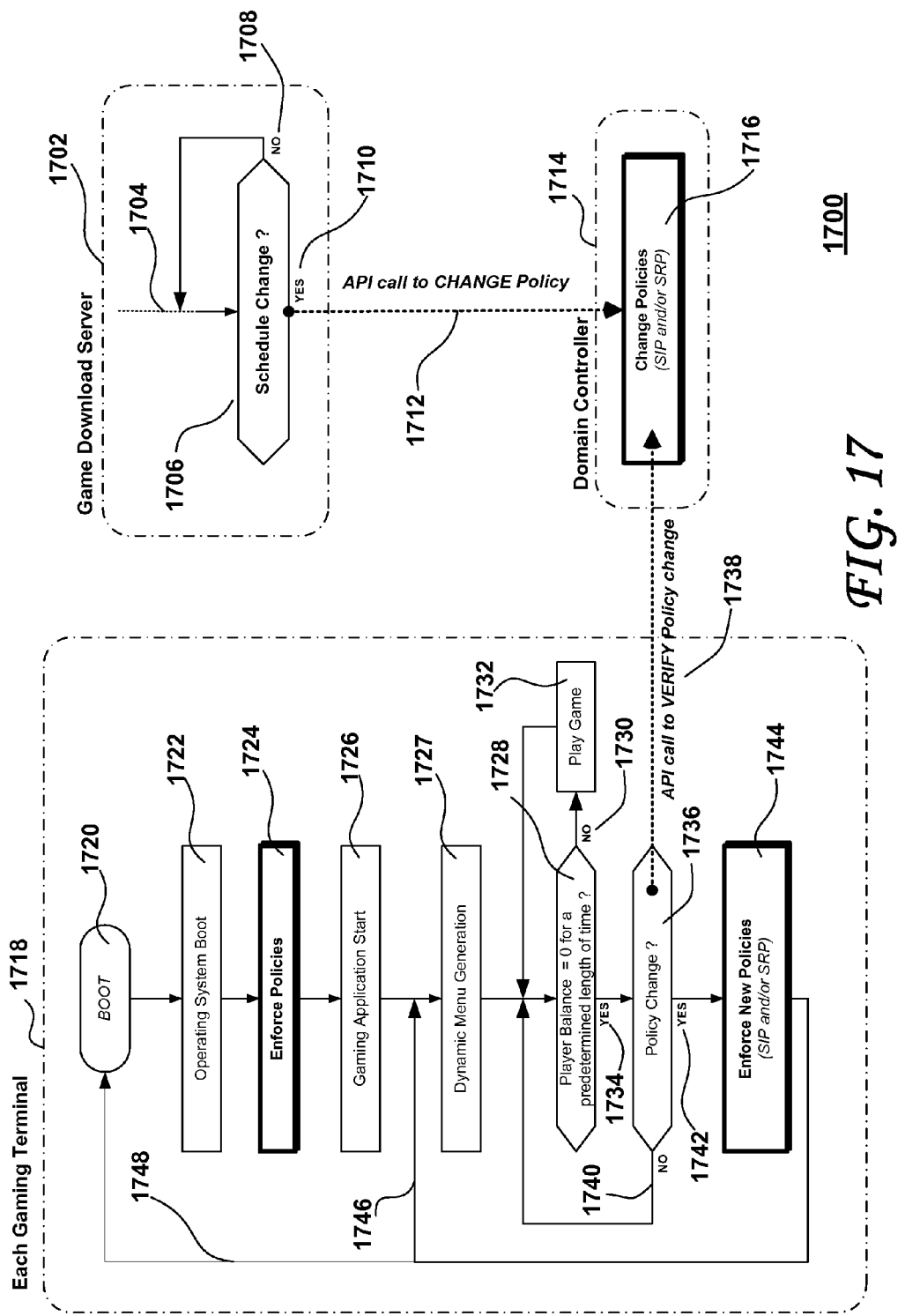
FIG. 17 illustrates the method to enforce a policy at a predetermined time, according to an embodiment of the present invention.

FIG. 17 illustrates a method at 1700 to enforce a policy at a predetermined time, according to an embodiment of the present invention.

Enabling enforcement of policies as described relative to FIG. 15 and FIG. 16 may be carried out interactively by an authorized user at predetermined authorized times, or alternatively may be controlled by a process at predetermined authorized times via the appropriate API. At the central system 1702 (the game download server in this illustration) at a given time 1704, a user or a process may verify a change 1706 in the list of games to be made available to players on a selected set of gaming terminal banks. In case of a schedule change as shown at 1710 (or other reasons such as introducing a new game or revoking an existing game), policies on the domain controller 1714 are being changed accordingly either interactively by a user in the Group Policy Management console as described for FIG. 15 and FIG. 16, or by a process via the equivalent APIs 1712. The changed policies are being enabled for enforcement at 1716 in the domain controller.

In a casino, although new games may be scheduled to be downloaded to gaming terminals and activated at predetermined times, it is a requirement that games are not to be changed while a player is playing. In practical terms, it is considered that a player terminates playing when his or her credit balance remains at zero for a predetermined period of time. The predetermined period time should be sufficient to allow the player to enter a new bill or other form of credit or payment instrument to continue playing. Therefore, the game application software on each game terminal continually tests for this condition (credit=0 for a predetermined period of time) before checking for change in policy, enforcing the policy changes and then updating the menu of games to be made available to the next player.

Upon power-up, each gaming terminal 1718 executes a boot 1720, loads its operating system 1722 and enforces the policies 1724 that are configured at the time of the start-up process. When the game application starts at 1726, it displays a menu of authorized activated games as shown at 1727 to the player using for example the dynamic method described relative to FIG. 19. Whenever the player balance is non-zero 1728, 1730, the player may play as shown at 1732 the games listed on the menu in accordance with the enforced policies. When the player's balance reaches zero at 1734 and remains zero for a predetermined period of time, it is considered that the player is no longer playing. The gaming application of the gaming terminal may then verify at 1736 if a policy has changed 1738. This may be done via the RegisterGPNotification. The RegisterGPNotification function enables an application to receive notification when there is a change in policy. When a policy change occurs, the specified event object is set to the signaled state. Additional details regarding the RegisterGPNotification function may be found at the Microsoft Development Network Library website.

At 1740, if there is no change in policy, the games listed on the menu will be unchanged for the next player. If there is a change in policy at 1742, the gaming terminal may enter into a process whereby the policies are enforced as shown at 1744, using for example the gpupdate.com service, the Refresh-Policy function or the RefreshPolicyEx function, or equivalent services or API. It is to be noted that the verification of change in policy and the enforcement of the changed policies may be carried out by each terminal independently.

The RefreshPolicy function causes policy to be applied immediately on the client computer. Additional details regarding the RefreshPolicy function may be found at the Microsoft Development Network Library website.

The RefreshPolicyEx function causes policy to be applied immediately on the computer. The extended function allows specifying the type of policy refresh to apply. Additional details regarding the RefreshPolicyEx function may be found at the Microsoft Development Network Library website.

Figure 19:
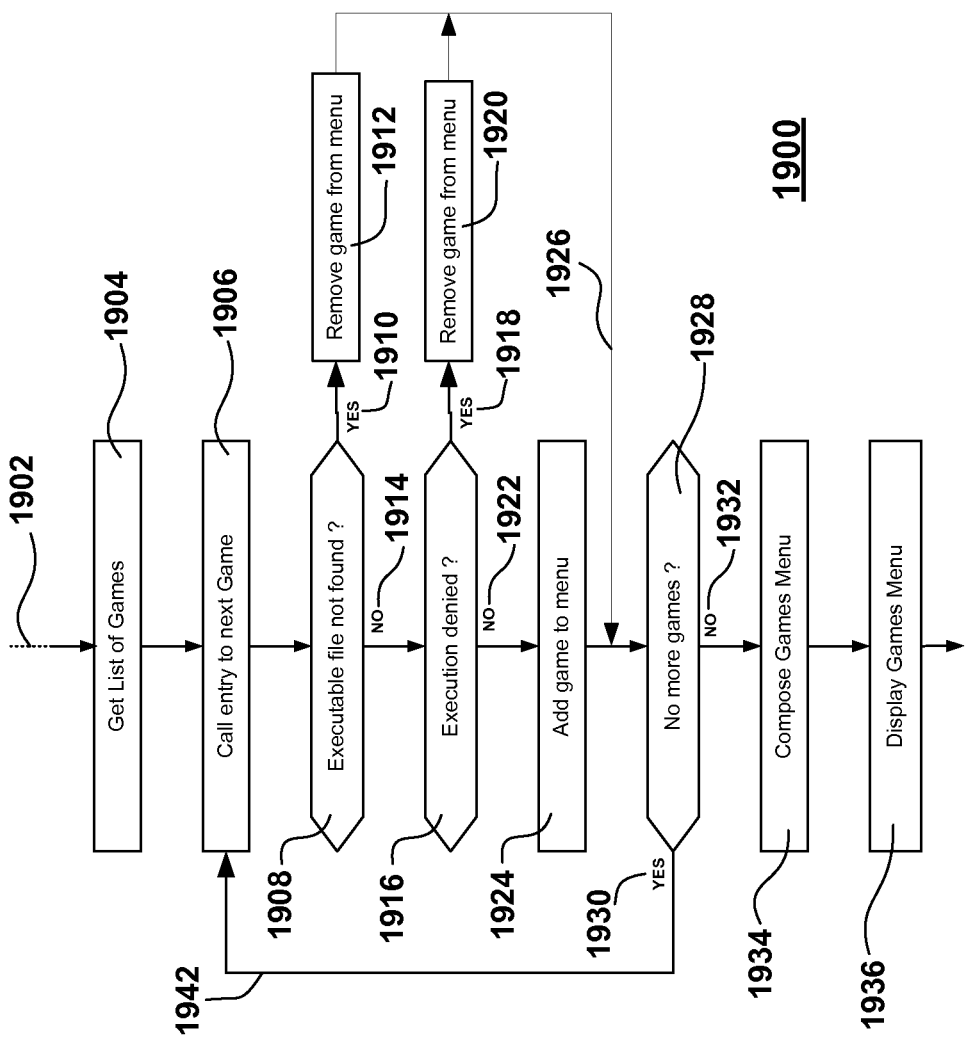
FIG. 19 illustrates the method to generate dynamically the menu list of authorized game made available to the player on each gaming terminal, according to an embodiment of the present invention.

Once the change in policy is enforced at 1744, the gaming terminal may reboot as shown at 1748 or exit and re-enter the gaming application, which would dynamically recreate the menu list of games 1727 to be made available to the next player, as detailed at FIG. 19.

A similar method relying on explicit WMI calls and administrative templates (*.adm) may be applied to obtain the same result in gaming environments whereby the domain controller active directory is not available such is the case with gaming terminals connected in WAN (Wide Area Network) whereby the network bandwidth is limited or the network availability is poor.

An alternative method relying on SMS (System Management Server) code download instead of SIPs (Software Installation Policy) for installing software components and software MSI packages may be used. However, the executable software components remains under SRP (Software Restriction Policy) in accordance with the unique PKI certificate generated for each component as described in the invention.

Figure 18:
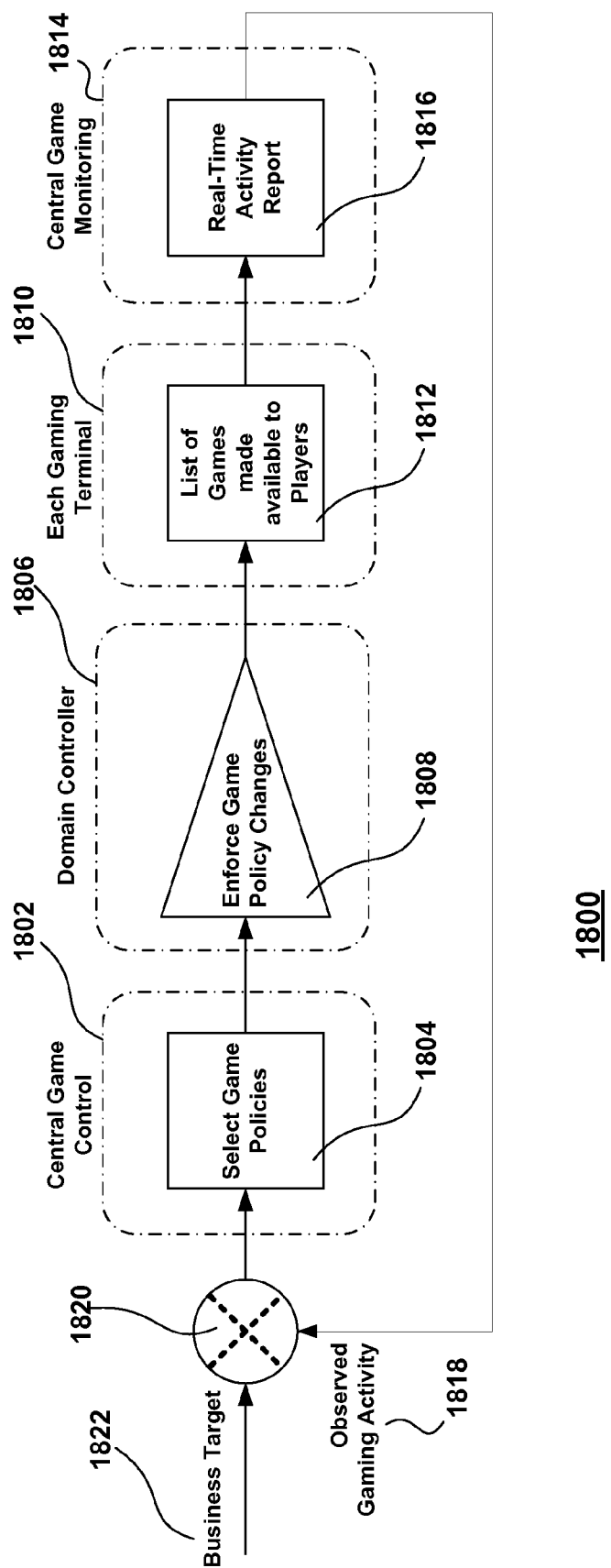
FIG. 18 illustrates the method to enforce a selected policy as the result of observing the gaming activity, according to an embodiment of the present invention.

FIG. 18 shows a close-loop enforcement of a policy, according to an embodiment of the present invention. FIG. 18 at 1800 illustrates a method to enforce a selected policy as the result of observing the gaming activity. The method is directly derived from FIG. 17 whereby the policy change 1716 takes place at 1804 and is selected from a choice of pre-configured policies, for example in a look-up manner, whereby a policy would result in making available to the players a menu of games 1812 (1727 in FIG. 17) to provoke a given gaming activity change which may be monitored in real-time at 1816. The observed activity 1818 may then be compared 1820 to predetermined businesses objectives 1822 and a correction or modification may be applied by selecting a new policy that would change the list of games available on a selected aggregate of gaming terminals 1810. For example, due to a long queue of people who want to play the Infinity game, a greater number of banks of gaming terminals may be configured to make the Infinity game available to players on these terminals. Another reason for applying a new policy might be if a particular area of the casino floor is heavily populated with players while another area is empty. Suppressing some popular games in a highly frequented area and adding them to the less frequently area may help spread the player distribution within the casino or gaming area more evenly. Yet another reason for applying a new policy could be if the gaming activity is low, then games with a higher RTP (return to player), let us say 98% instead of 95%, may be activated in some areas to boost activity.

The process may involve several subsystems as illustrated in FIG. 18: the central game control 1802 wherein policies are selected, the domain controller 1806 that enables enforcement of the policies 1808, a selection set of gaming terminals 1810 wherein each gaming terminal enforces the policies and make the selected games available to the player 1812, a central game monitoring system 1814 that produces activity reports in real time 1816.

The process shown at 1820 of comparing the observed activity 1818 and the targeted activity 1822 and then selecting a change in game policies 1804 may be carried out by the floor manager or the floor director, or alternatively by a knowledge base process. In both cases, a close-loop enforcement of policies (relying on the unique PKI certificate SRP associated to each executable authorized and certified software component) is achieved resulting in the dynamic configuration of the gaming system, either for LAN configurations (such as casino floors) or WAN configuration (such as video lottery terminals distributed across a large geographic area).

FIG. 19 at 1900 illustrates a method to generate dynamically the menu list of authorized games made available to the player on each gaming terminal, according to an embodiment of the present invention. The dynamic configuration of a large gaming system whereby authorized games made available to players on selected group of gaming terminals using software restrictions policies at the central system may result is hundreds of different game menus. Reliance on SRPs for preventing non-authorized software components to execute is entirely based on a sound and demonstrable trusted base; therefore the gaming system is trusted. Getting the list of authorized games to each gaming terminal would require configurations files to be sent from the central system to each of the gaming terminal; however, this would be illegal because the change in the list of games may affect the game outcome. This is clearly understandable when considering changing a game; let us say Infinity__95 with a RTP or 95% with Infinity__98 with a RTP of 98% at 10:00 PM, then back at 8:00 AM, and this each day except during the weekend, or at other times as a result of the closed loop process described at FIG. 18. Game regulators mandate that the process to manage this type of change be certified with secure means of the same order as when installing/downloading software components using a unique PKI method.

Embodiments of the present invention, therefore, provide secure means to update a list of authorized games to be offered to the player. The menu of authorized games offered to the player may be dynamically generated by each terminal without requiring the central system to dispatch the list of authorized games or having each terminal fetch the list of authorized games from the central system (both are illegal without extreme precaution of the same order as the installing/downloading of software components using a unique PKI method because they may affect the game outcome); this is achieved by having each terminal checking the certificate Software Restriction Policies enforced on the games (a unique PKI certificate being generated for each of the executable game components in accordance with the methods detailed in this document).

As illustrated in FIG. 19 at 1900, each terminal when executing the gaming application 1902 gets a list of the file names for the games available at 1904 from a trusted configuration file (an updated trusted configuration file may have been downloaded in a certified code signed MSI package with the last game download) and a menu is initially compiled for this list. Attempts to execute each of the game entry module of the games contained in the list 1906 are made. If the game entry module is not found at 1910, the software components do not exist on the gaming terminal and the game is removed from the menu 1912, whereupon the process iterates to next game, as suggested at 1926 1928. If the execution of the game entry module is denied at 1916, 1918 because the Software Restriction Policy is preventing this game to execute, the game is removed from the menu as shown at 1920 and the process iterates to next game, as shown at 1926 1928. If the execution of the game entry module is successful at 1922, then the game is authorized and may be added to the games menu offered to the player. The process iterates through other games in the list, as shown at 1928, 1930, 1942, 1906, if any. Once the iteration is completed at 1932, the games menu may be composed at 1934 and the menu is displayed to the player at 1936.

FIG. 20 shows a companion Hello component, according to another aspect of the present invention. Reference numeral 2000 in FIG. 20 illustrates a method to generate a code signed companion software component. Each game comprises an aggregate of executable and non-executable software components, usually comprising files such as *.exe, *.dll, *.dat, *.xml. In general, all the software components are dependent of one component named the main program or the game entry. Starting the execution of the main game component is a lengthy process, as a large number of dependent executable components and graphics need to be verified (SRP verification) and started. Currently, there is no API available in the Windows operating system client computer for verifying the status of a Software Restriction Policy enforcement on a given software component applicable to that client computer.

Another embodiment of the present invention, therefore, provides a method to quickly verify the policy enforcement on a game without starting the entire game, in order to generate the list of available games to be made available to the player in a menu. For each game, a very short companion .dll file may be created having, for example, only one line of code <<Return "HELLO">> which would return the exemplary "HELLO" string when called. Assuming "Infinity.dll" 2010 is the main game component file name 2002 (or friendly name), then the companion file may be named "Infinity.Hello.dll" 2018. Preferably, the companion's 2018 source code would have in its assembly information a part number 2004 as shown at 2020 and a version number 2006 as shown at 2022 that is identical to the main component 2010 part number 2012 and a version number 2014, but this is not mandatory. In addition, assuming the PKI certificate's subject name 2008 associated to the Infinity.dll is "GDS.exe.0099-0001-00 [1.0.101.0] Infinity.dll" 2016, which is used for the code signing of the Infinity.dll, we may proceed with the code signing of Infinity.Hello.dll with the same 2026, 2028 "GDS.exe.0099-0001-00[1.0.101.0] Infinity.dll" certificate, as shown at 2024.

It is to be noted that code signing two distinct software executables with the same certificate is a deviation from the method taught earlier in this document. However, the fact that the role of the companion file is very well defined, as having for example only one line of code <<Return "HELLO">> which would return the "HELLO" string when called, this does not present an issue with the regulators or the certification lab.

Figure 21:
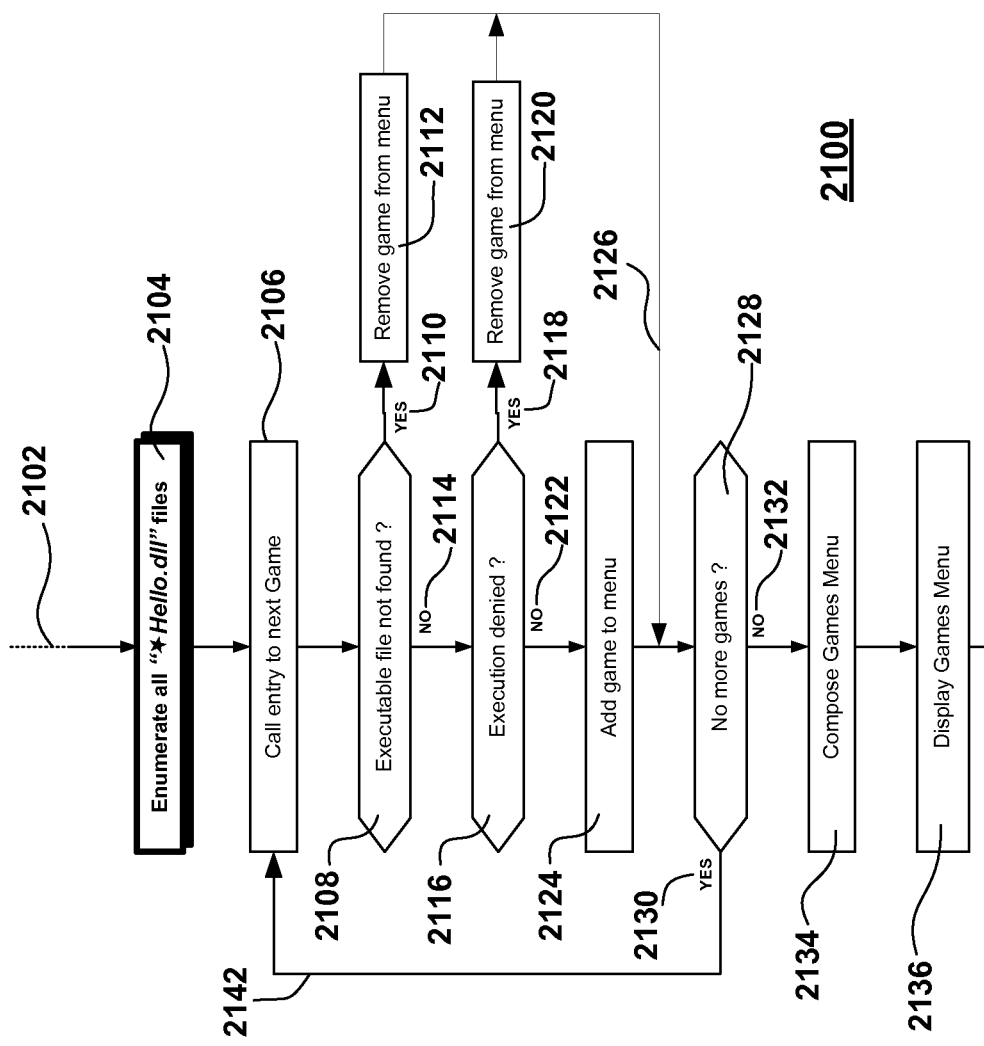
FIG. 21 illustrates the method to quickly and dynamically generate the list of games installed on each gaming terminal using the companion software component, according to an embodiment of the present invention.

FIG. 21 shows steps that may be carried out to search for games on each gaming terminal, according to yet another embodiment of the present invention. Reference numeral 2100 in FIG. 21 illustrates a method to quickly generate dynamically the list of games installed on each gaming terminal using the companion software component described above. The process of dynamically generating the game selection menu may be optimized in many ways in order to reduce the overhead of starting the execution of a game to check if it is authorized. However, if the aim is to sense for the enforced SRP or SIP applied to the game or detect local availability of the game software components, then such optimizations (among other possible variations) should be considered to be within the scope of the invention as defined by the claims hereunder. According to an embodiment of the present invention, a method is presented herewith to quickly generate the list of available games to be made available to the player in a menu without transfer of a file from the server. Reference 2100 is identical to reference 1900 in FIG. 19 except for the first process 2104 whereby a file search process is performed for finding (or enumerating) file names with the "*Hello.dll" string, the "*" symbol being the standard wild character used in string searches. A list of the games installed on each gaming terminal may be quickly and dynamically generated by calling the companion software component of the game main component instead of calling the main component itself. The companion component may be as detailed at FIG. 20 or may be a similar construct.

The embodiments of the present invention described herein are also applicable to any of the subsystems available in a network connected gaming system that require preventing non-authorized software components to execute or affect game outcome, such as the gaming terminals, the game management system (CMS or MCS) that monitor and control whole or part of the estate of gaming machines, the progressive jackpot systems, the bonussing systems as well as game payment verification systems such as IGT EasyPay and Cyberview PVU (Payment Verification Unit) and PVS (Payment Verification System). Gaming subsystems are tested against gaming standards such as those produced by GLI (Game Laboratory International); the game standards are mandated by game regulators in accordance with local regulation and laws. The network-connected subsystems may be located within the premises accommodating the estate of gaming machines (connection via a LAN) or outside of the premises (connection via a WAN).

The methods described in the document rely on software installation policies and Software Restriction Policies which may be configured (a) via the domain controller active directory, as this is advantageously the case whenever the network connection is a LAN, and which may also be configured (b) to each of the local computers via WMI services (Windows Management Instrumentation) or administrative templates (.adm files) in order to configure and enforce local group policies when a domain controller is not available as this is the case whenever the network connection is a WAN. Microsoft SMS (Systems Management Server) may be used as an alternative to using software installation policies.

The methods described in the document leverage on software installation policies and/or software restriction policies technology implemented in Microsoft Windows operating system. Whenever similar technology is implemented in other operating systems such as Linux, Unix, Windows CE and QNX, it is considered as part of the invention herein.

In another embodiment of the invention, it order to make game regulators more at ease with the huge shift in paradigm from prehensile physically secured ROM based gaming machines (whereby access to the ROM is via multiple layers of keys locks and tamper detectors), to a totally virtual or volatile fashion of downloading game code via a network, it may be advantageous to perform download of the game code when the gaming machine is not operational. Consequently, the network downloading of game code from a central repository may not interfere with the games. This is accomplish by terminating all gaming software in order to transform the gaming machine into a generic PC, then transferring the game software under the control of the operating system using pervasive network code download available in most information technology networked environments. An "Out-of-service" message may be displayed on the screen to indicate that the machine is no longer playable, thus is no longer a gaming machine. Once the game code is downloaded by the generic PC, the game code is verified for trustworthiness and is executed, thus transforming the generic PC back into a gaming machine.

Figure 22A:
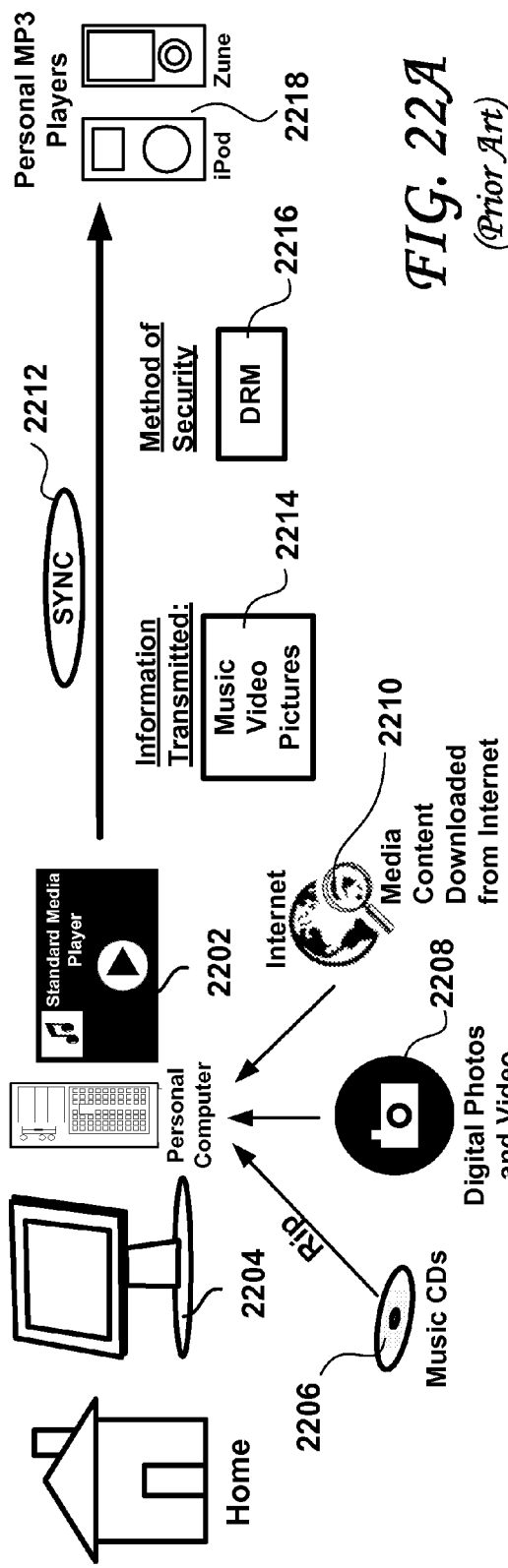
FIG. 22A shows conventional standard Media Players allow consumers to transfer media from a variety of sources to personal media devices, such as Apple's iPod® or Microsoft's Zune®, for example.

Prior art FIG. 22A depicts how conventional consumer media players allow individuals to transfer media content from a variety of sources to personal media devices like Apple's Ipod® or Microsoft's Zune® or other digital media players. Individuals typically use media player software 2202 on their personal computer 2204 to store, manage and retrieve media content. Users may listen to the audio media on large speakers and may view the video media on a large display attached to their PC, or alternatively on a network-connected Microsoft XBOX® gaming console having "media extender" capability. The main sources of input into such media players are music CDs 2206, digital photos and video 2208, and media content downloaded from the Internet 2210 which are "ripped" or downloaded into the PC. The library of media stored on the PC may be very large and span hundreds of gigabytes. A selected portion of the media library may then be distributed to docked mobile personal media devices 2218 like Apple's iPod® and Microsoft's Zune® via a "sync" or synchronization 2212. Thereafter, when the device is undocked and transported, the individual may listen and view the media on the road. During a sync operation, media content may also be transmitted from an individual's personal media device back to the PC media player, provided that the individual owns rights to any copyrighted material. At home, the most common media transmitted during a sync operation are music, digital photos, and video 2214. DRM or Digital Rights Management technology 2216 may be used to verify that a user has rights to view or access copyrighted media. It should also be noted that, after receiving synched content, personal media devices 2218 act as smart clients, able to perform their full function (in this case, allowing users to view picture and video and listen to music) while disconnected from their parent computer 2204 or device. DRM is enforced subsequent to media synching and device undocking.

Figure 22B:
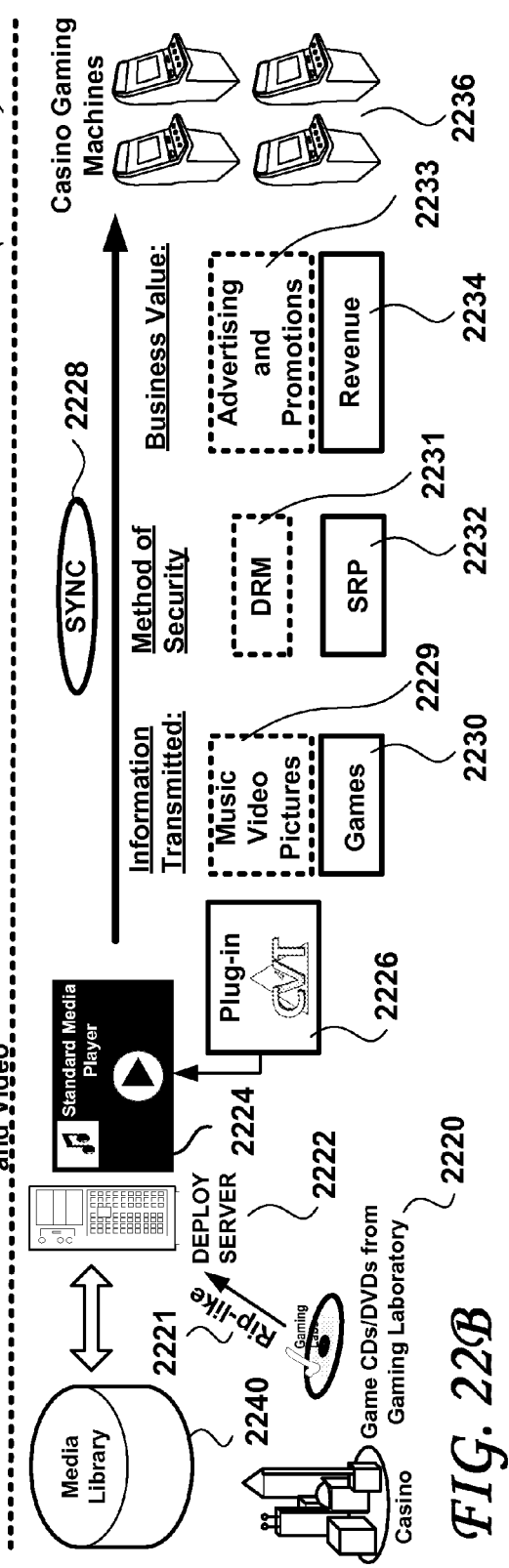
FIG. 22B shows a method for controlling media content for network connected gaming machines, according to an embodiment of the present invention and illustrates how gaming plug-in allows existing consumer media players to advantageously be used within a casino environment to allow operators to manage casino media in a more familiar, user-friendly manner than had previously been available.

FIG. 22B illustrates an embodiment of the present invention and how plug-in technology may allow existing consumer media players to be advantageously used within a casino environment to allow operators to manage casino media in a more familiar, user-friendly and agile manner than has previously been available. A plug-in is generally a software interface capability implemented by a supplier of a popular software product for its product to allow independent developers to enhance, restrict or add features via a simple-to-install "pluggable" software. The plug-in may be implemented using an API (application programming interface) detailed in a document explaining how to hook up to the popular product or using a SDK (Software Developer's Kit).

According to an embodiment of the invention, plug-in 2226 adds a set of functionalities to a PC media player for uploading, storing, managing, retrieving, playing and dispatching regulatory certified game content. According to embodiments of the present invention, the set of functionalities may be operable via controls that are consistent with conventional media players and that are rapidly and intuitively understood by those already acquainted with the operation of standard media players. The regulated game content 2220 may be added to the media library 2240 via a Rip-like operation 2221 and may be identified in the media browser by a graphic media icon representative of the game.

Casino operators may make use of the media player paradigm by "ripping" or loading certified games (typically stored in CD or DVD format) 2220 onto a media library 2240 within or accessible to a gaming deploy server 2222 via a casino media player interface 2224, which may be a standard media player that has been configured with a customized plug-in 2226 according to an embodiment of the present invention. It is to be noted that the certified games may be stored on data carriers other than CD-ROMs or DVD-ROMs, and that embodiments of the present invention are not limited to the manner in which certified games are provided to the casino operator. Game content may then be "pushed", transmitted or otherwise made available to gaming machines 2236, via the familiar "sync" paradigm 2228 (for example) used at home, though in this environment the sync is one-way, as no content need be transmitted from the gaming machines back to the Casino Media Player or game servers. In the casino environment, music, video, and pictures 2229 may be distributed to gaming machines 2236 for advertising, promotions, and/or entertainment purposes, for example. Player help functionality and/or player tutorials may also be distributed to the gaming machines 2236 in this manner. In addition, game content 2230 may be distributed to gaming machines via this paradigm. Because the Casino Media Player-plug-in 2226 combination according to embodiments of the present inventions will allow game operators to manage game information and distribute game content together with related advertising and promotions media 2233 in a more intuitive, user-friendly manner than had previously been available, this tool may help operators to manage their gaming floor in a more agile fashion, thereby potentially increasing the revenue 2234 to the casino. In the casino game environment, DRM technology 2231 may be used to verify that a user has rights to view or access copyrighted music, pictures and video (promotional or entertainment), while "Software Restriction Policy" (hereafter SRP) 2232 may be used to ensure that only authorized regulated games may be transmitted to gaming machines and executed on the casino floor in accordance with local regulation and internal control procedures. Indeed, preventing execution of non-authorized games and/or content may be enforced in the gaming machine through software restriction policy (SRP) much like digital rights management (DRM) prevents listening to or viewing illegal media files. The casino media player plug-in software (or an integrated casino media player having the plug-in functionalities natively integrated therein), according to embodiments of the present invention, may bind all the security data found on the CD/DVD-ROM (received from the certification laboratory) to the "virtualized-CD" (i.e., ripped to the deploy server and represented by an icon) now entered in the media library. Such security data may include the software restriction directive derived during the certification process. When selected for immediate play on a gaming machine via the casino media player, the software restriction policies may be enforced by the gaming machine. When selected for download to selected gaming machines via the casino media player "sync-like" command, the code of the regulated game may be downloaded (or pushed) to the remote gaming machines via the network and the software restriction policies may be enforced in each of the selected gaming machines to which the regulated game(s) has been downloaded (or pushed). After receiving synched content, the depicted gaming machines 2236 may act as smart clients, able to offer full gaming capability to players even when disconnected from their gaming network.

Figure 23:
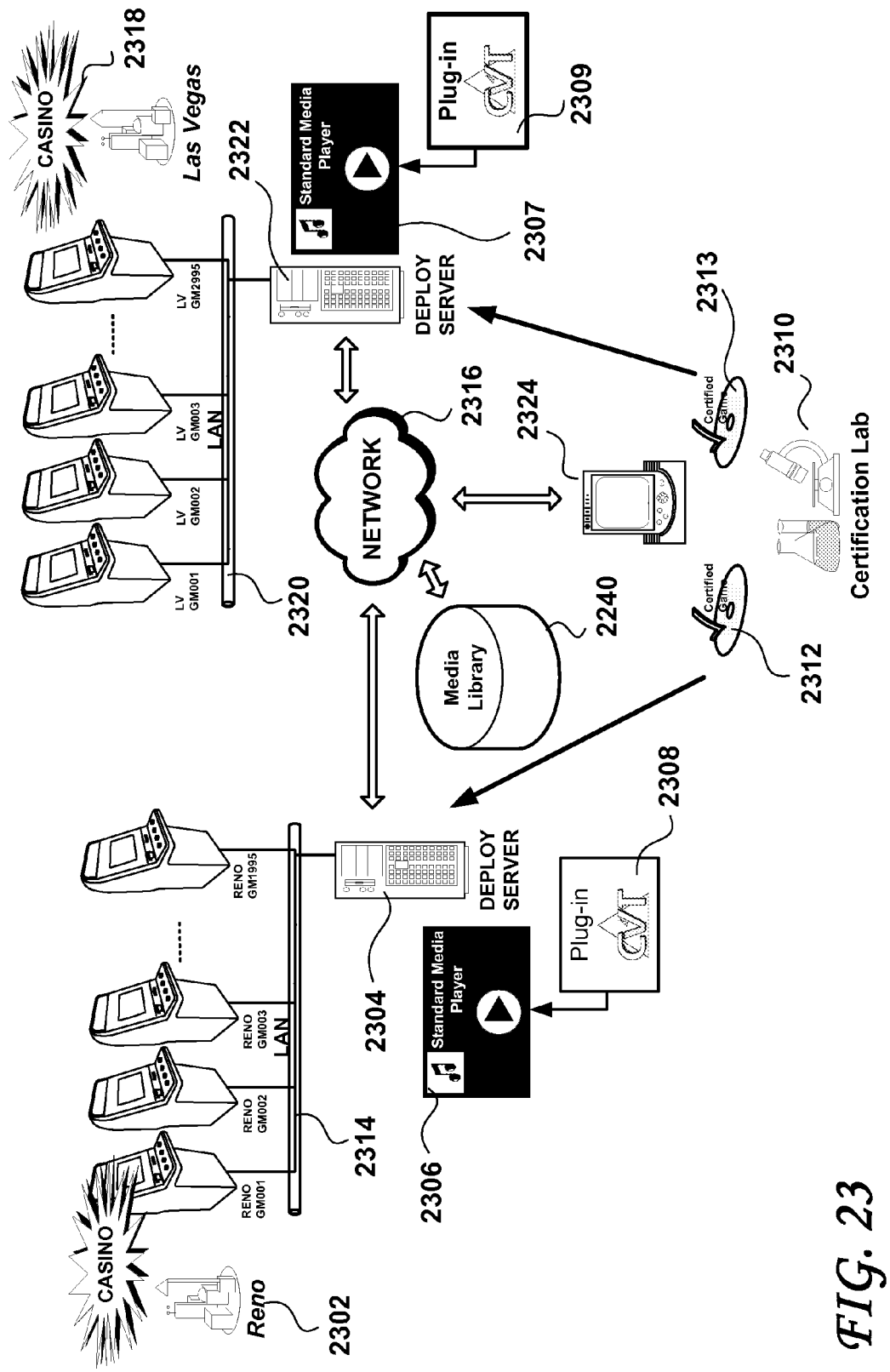
FIG. 23 shows aspects of methods and systems for managing games and deploying games to gaming machines across multiple gaming locations, according to further embodiments of the present inventions

FIG. 23 shows aspects of methods and systems for managing games and deploying games to gaming machines across multiple gaming locations, according to further embodiments of the present inventions. FIG. 23 shows two casinos; one in Reno as shown at 2302 and another in Las Vegas, as shown at 2318. Each of these casinos may include a plurality of gaming machines (Reno GM001, . . . , Reno GM1995 and LVGM001, . . . , LVGM2995). Each of the gaming machines may be coupled to a Local Area Network (LAN), as shown at 2314 and 2320, in the same manner as described above relative to FIG. 10. A deployment server may be coupled to each of the LANs 2314, 2320. The deployment servers 2304, 2322 may be configured to receive one or more gaming lab certified games in their media library 2240 over the network. Thereafter, the deployment servers 2304, 2322 may push (or download) the games to the gaming machines coupled to their respective LANs. Alternatively, the gaming machines may pull the games stored in the deployment servers 2304, 2322, via an alternative download method. Alternatively still, the gaming machines and the deployment servers may be configured in a client-server configuration.

Reference numeral 2312 shows games that have been certified by the relevant gaming certification lab, as described herein above. FIG. 23 shows these games as being stored on CD-ROMs or DVD-ROMs that contain the certified authorized software components, although the present embodiments are not limited by the medium on which the authorized game software components are stored. Rather than loading such physical media manually or loading them in a game jukebox, embodiments of the present invention provide for ripping the certified game components onto a persistent storage such as, for example, a hard disk or other mass storage device. The hard drive or other mass storage device (which need not be co-located with the gaming machines) is preferably in a secured locked cabinet and/or is otherwise secured and access controlled. The disk drive may advantageously be configured, for example, as a Redundant Array of Inexpensive Disks (RAID), for security, redundancy and robustness.

Thereafter, each of the certified games whose CD-ROM or DVD-ROMs have been ripped onto the deploy server hard disk may thereafter be represented to the gaming operator as an icon or other user-selectable representation. Indeed, embodiments of the present inventions call for the certified games or certified game components (and other non certified and non-regulated media content, such as music, graphics, photos, video, player help files, player tutorials etc.) to be accessible by the gaming operator from an integrated and intelligent framework that allows the gaming operator to classify, search, select and push certified games to selected gaming machines over a network. Such integrated and intelligent framework may be implemented as a, for example, Microsoft Windows game management application on a personal computing device 2324 or server or may be implemented as a game management application on a portable device, such as a portable media device using available Application Program Interfaces (APIs) for such devices. The certified games may appear on the game management application as icons and/or as text-based entries, for example.

Preferably, the certified games or game components may include or may refer to game metadata that provide useful information such as the name of the game, a brief description of the game, the game type (e.g., fruit game, scripted game, racing game, 5-reel game, card game, etc.), gaming lab certification information and version number, for example. The metadata associated with the game may structured, for example, in a manner similar to the ID3 tags of digital music. According to embodiments of the present invention, the game management application may read such game metadata (or tags) to enable the application's search, classification and other management functions. The metadata may be stored together with the game or in a separate library of, e.g., binary files. Metadata may also be stored in a library of XML files, which the present game management application may access to derive, for example, game and usage information such as, for example, game play count, last game play date, game play duration and/or other types information. Such information encoded in the XML library file for each game may be accessed by the preset game management application to its enable the search, classification, categorization and scheduling functionalities, to be described hereunder. As shown in FIG. 22, the game management application may run on a personal computer 2324 (either mobile or desktop), that is coupled in a secure manner to a network 2316 (including, for example, the Internet).

Figure 24:
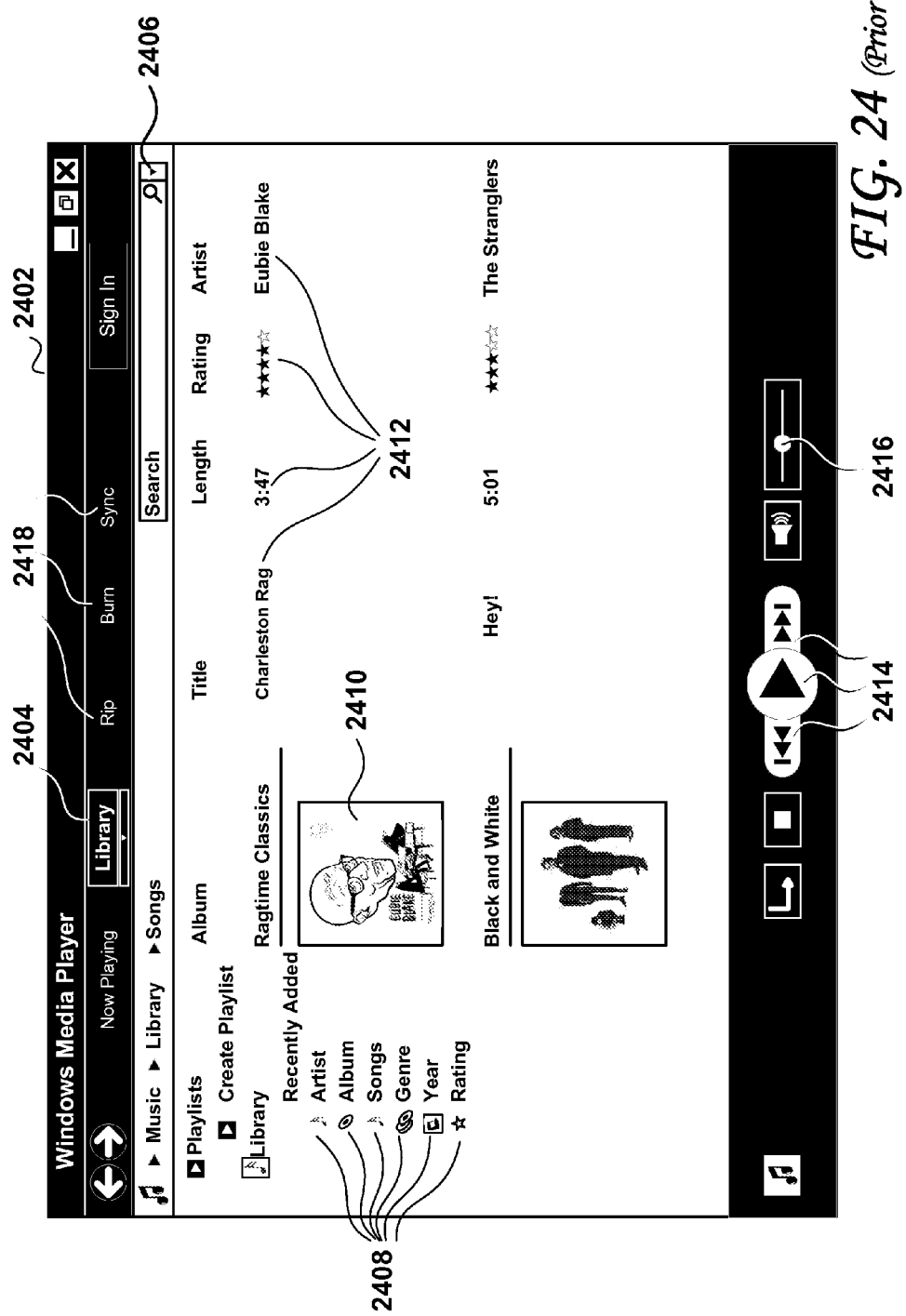
FIG. 24 depicts a popular consumer Media Player created by Microsoft.

FIG. 24 shows a popular and conventional consumer media player created by Microsoft. Such media players 2402 represent powerful, user-friendly tools for managing and enjoying media. The depicted Microsoft Media Player 11 is accessing a music library 2404, although photo and video libraries are also widely managed through such tools. Media Players may have a number of features to assist users in managing and accessing media, including a search bar 2406 for accessing media via user-input search terms and criteria menus 2408 which allow users to sort their media using key metadata including but not limited to: genre, date created, creator's name and user-rating.

The interfaces on such media players are typically clean and easy to use. In the depicted Microsoft Media Player 11, the cover of each music album 2410 is displayed prominently, as well as information about each artist's name, a current song title, a song length, and a user rating, as collectively shown at 2412. Buttons for playing and toggling between songs 2414 and for adjusting the music's volume 2416 are clearly displayed on the device. Buttons 2418 on the device also make uploading ("Rip"), downloading ("Sync"), and duplicating ("Burn") media a simple, straight-forward task.

Figure 25:
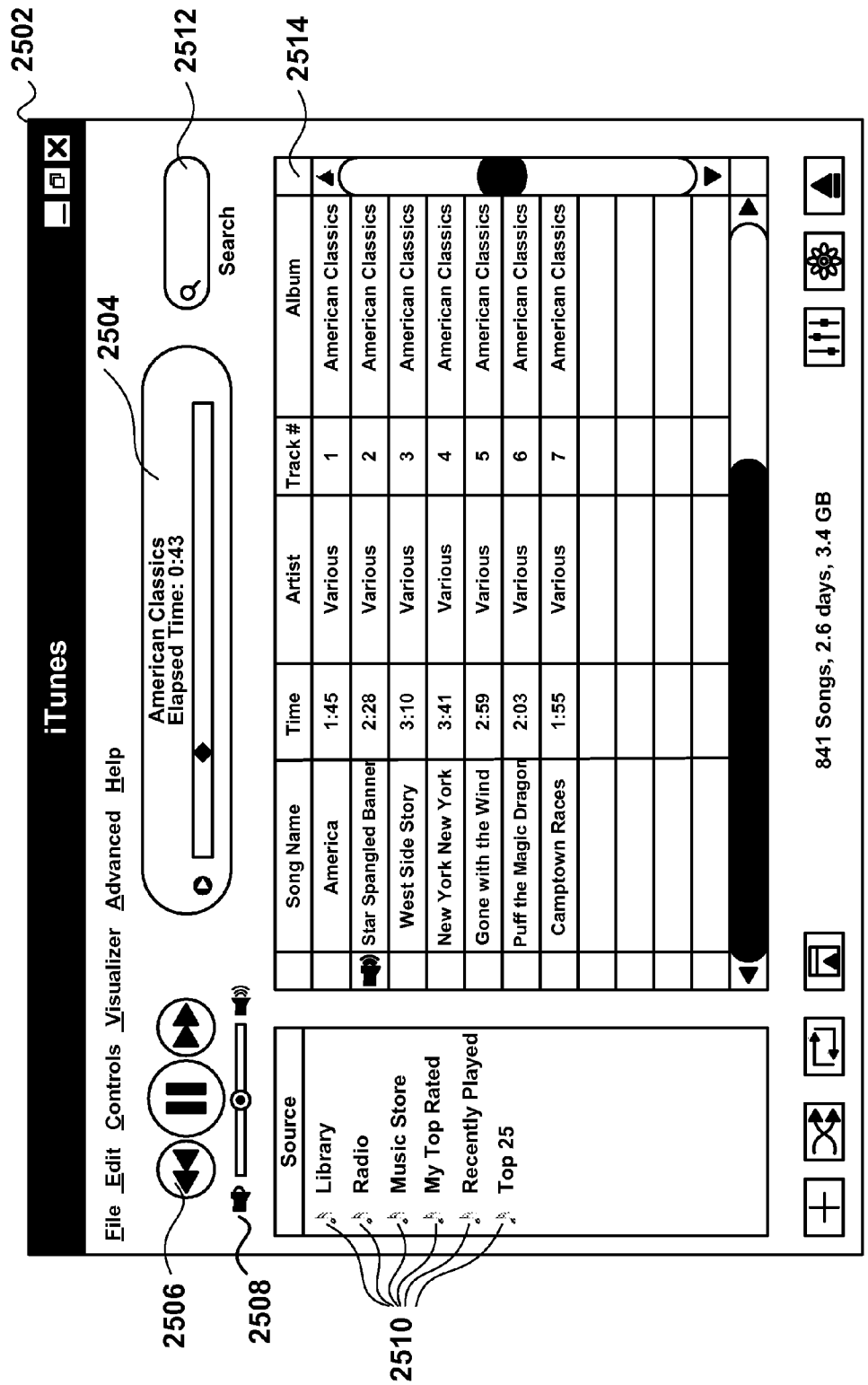
FIG. 25 depicts the popular iTunes Media Player created by Apple Computing.

FIG. 25 shows the popular and conventional iTunes Media Player created by Apple Computing. Apple's iTunes 2502 features a more visually busy appearance style than Microsoft's Media Player 11, but the two devices perform very similar functions. Like Media Player 11, iTunes allows the user to access media via a search window 2512 and via criteria menus 2510. Like Media Player 11, iTunes has large, user-friendly controls for playing and switching between songs 2506 and adjusting volume 2508.

The differences between iTunes and Media Player 11 are almost wholly cosmetic. iTunes displays the current media being played as well as that media's progress at the top center of the application, as shown at 2504. Other searchable media are included at the center of the device in a large grid 2514 configuration, where information like media name, media's creator, and media length is displayed. Although iTunes as of this writing has not yet released an API (application programming interface) for independent developers to offer plug-ins, this feature is a trend and may well be offered at some stage in the future. Both Microsoft's Media Player and Apple's iTunes are suitable candidates (although not the only candidates) for accepting plug-in according to embodiments of the present invention, to enable casino owners and operators to manage and deploy games on their estates of gaming machines.

Another popular media player and candidate for a plug-in according to an embodiment of the present invention is Winamp media player, which offers a free SDK (Software Development Kit) to access, enhance and add new Winamp's functionalities.

Figure 26:
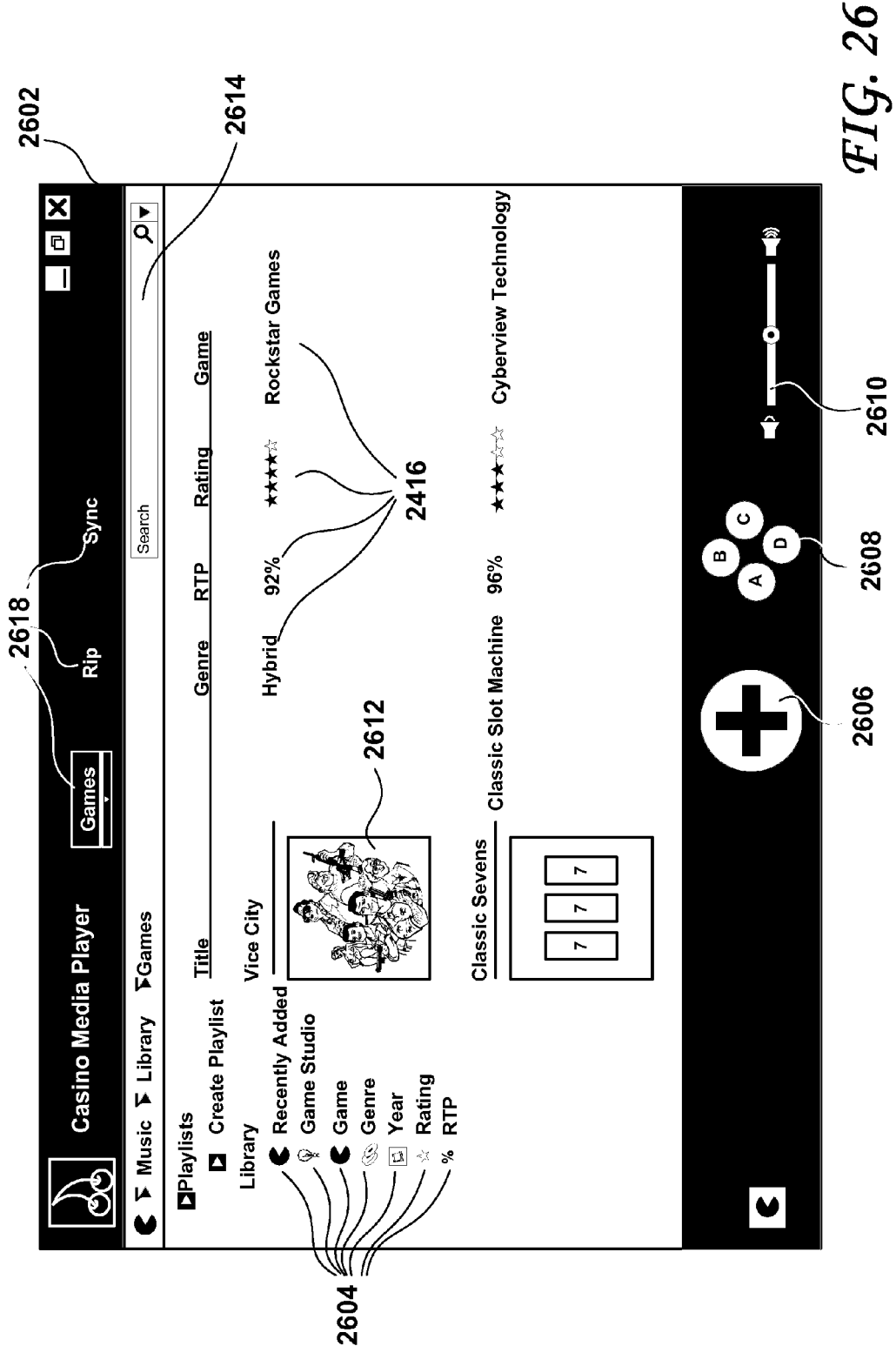
FIG. 26 shows the manner in which a popular media player (in this case, Microsoft's Media Player 11) may be updated for use within a casino by making use of a customized plug-in according to an embodiment of the present invention.

FIG. 26 demonstrates how a popular media player (in this case, Microsoft's Media Player 11) may be configured for use within a casino by making use of a customized plug-in according to an embodiment of the present invention. Because the requirements for managing and executing electronic games are in some ways similar to the requirements for managing and running digital content like music and pictures, existing media players that provide a plug-in capability via an API (application programming interface) may be configured, according to embodiments of the present invention for use within a casino gaming environment. A specialized plug-in may transform a device such as Microsoft's Media Player 11, iTune or WinAmp into a Casino Media Player, as shown at 2602 in FIG. 26. Alternatively, proprietary software emulating a media player look-and-feel (or aspects thereof) may be independently developed by a game supplier, and in such case, the game plug-in is replaced by a built-in service.

The Casino Media Player 2602 may include criteria attributes 2604 that allow operators to sort lab-certified games based on key game metadata such as genre, game studio, year created, popularity and RTP (Return to Player). Casino Media Players such as shown at 2602 may also feature a search window 2614 to enable users to locate games based on free-form search criteria by typing letters, words, phrases, questions and/or wildcard characters, for example. Casino Media Players 2602 may prominently feature game artwork 2612 (or a representative game icon) and game information 2616 in a format that may be similar to the format in which conventional media player may display music artwork and information. Gaming controls 2606 and gaming buttons 2608 may appear within such devices in the space normally reserved for music controls. Volume adjustment controls 2610 may be used to configure the volume attribute of some pre-selected games or media assets for controlling volume in the associated gaming machine; or volume adjustment controls 2610 may be deactivated. Controls for the management of downloads and uploads may also be used unchanged as shown at 2618, although existing controls for duplicating or "burning" media may be disabled. Some other standard controls of the media player may be deactivated by the plug-in depending of the context of the operation being selected, for example the "Burn" service to write a CD-ROM may be disallowed when a game is selected.

Figure 27:
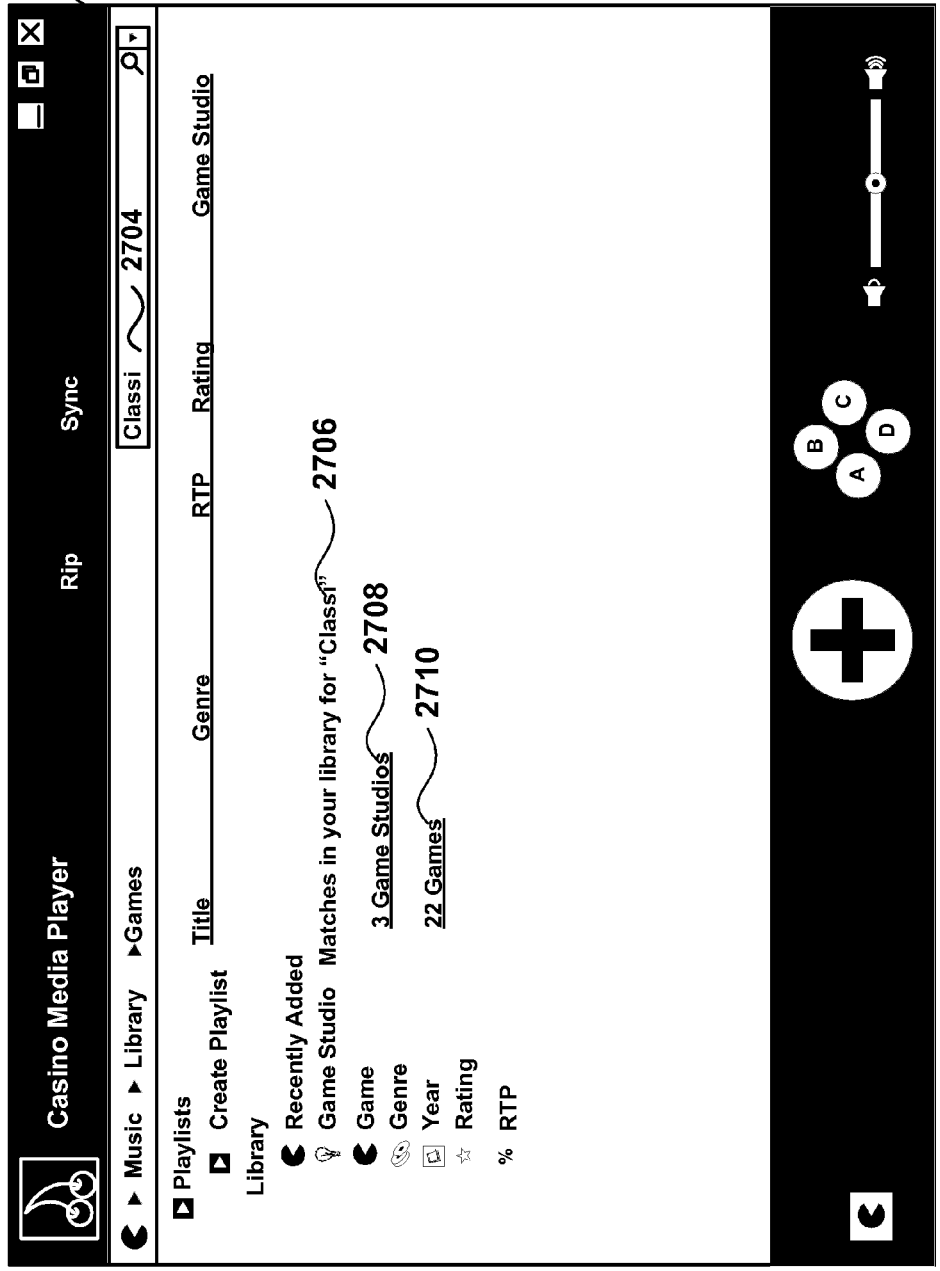
FIG. 27 shows an "enhanced search" feature that allows casino operators to locate available games, media, and promotions in a more user friendly fashion, according to an embodiment of the present invention.

FIG. 27 demonstrates how the "enhanced search" or "accelerated search" feature used within Microsoft's popular Media Player 11 (and more generally within Windows Vista) may allow casino operators to quickly locate available games, media, and promotions in a user friendly fashion, once the Media Player has been configured for casino use via a customized plug-in according to embodiments of the present invention. Leveraging Microsoft Media Player 11's "enhanced search" accelerated search (e.g., indexing) technology, Casino Media Players 2702 may make a casino operator's game searches more powerful, by dynamically limiting or expanding a search pool with each new search term the user inputs. For example, the user in FIG. 27 has input the letters: "classi" into the search window 2704. As each letter is input, the search pool shrinks by ruling out games that do not meet all search criteria. For instance, after the initial letter "c" has been input, all games that include a "c" in their title (including games like "Catepillar," Baccarat," or "Crazy Eights") or any of their metadata attributes would remain in the search pool. However, when the search term grows to "classi," as is depicted in FIG. 27, only games with names or metadata attributes including that full search string (like "Classic Sevens," "Classic Reel Madness," or "The Classical Music Challenge") would remain in the search pool. At the time of the search in FIG. 27, the number of matches for the search terms "classi" 2706 have been limited to games from 3 different game studios 2708 encompassing 22 total gaming titles, as shown at 2710. Search criteria may be entered in free-form by typing letters, words, phrases, questions and wild characters. Each group of selected games resulting from the search may subsequently be viewed by clicking on the list 2708 or on the list 2710. Alternatively, the search pool may be shown in icon view as each letter is being typed in the enhanced search area.

Figure 28:
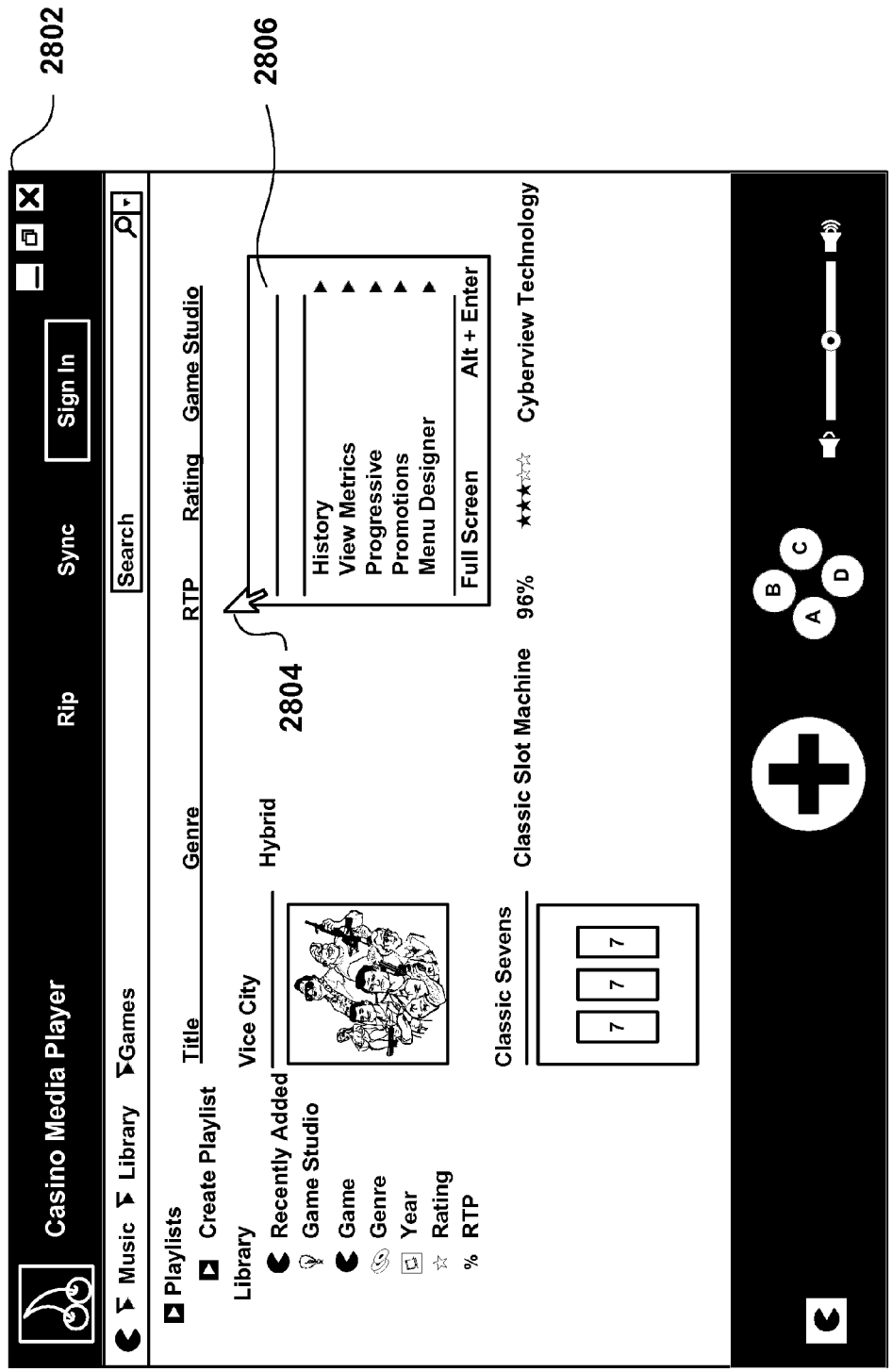
FIG. 28 demonstrates how casino operators may gain quick access to a number of important features including game scheduling, marketing, and game configuration, via right-clicking within a media player coupled to a casino plug-in according to an embodiment of the present invention.

FIG. 28 demonstrates how casino operators may gain quick access to a number of features including gaming machines selecting, game scheduling, marketing, and game configuration, via right-clicking within a selected zone in media player configured with a customized casino plug-in, according to an embodiment of the present invention. The Casino Media Player 2802 may be configured to allow users to accomplish a number of powerful tasks with relatively few keystrokes. By simply right-clicking (for example) within the application window 2804, a user opens a window containing a menu of context-specific command options 2806. For instance, by clicking 2804 within a space related to a game icon or game title, a player (if authorized) may be offered a list of generic commands like History, View Metrics, Menu Designer, Promotions, or Progressive. By clicking on another selected zone related to a game title, the user may see an alternate menu with options like Scheduler or Floor plan, allowing the user to schedule the specific game title he or she has clicked on and/or dictate on which gaming machines that game will appear on the physical gaming floor.

Figure 29:
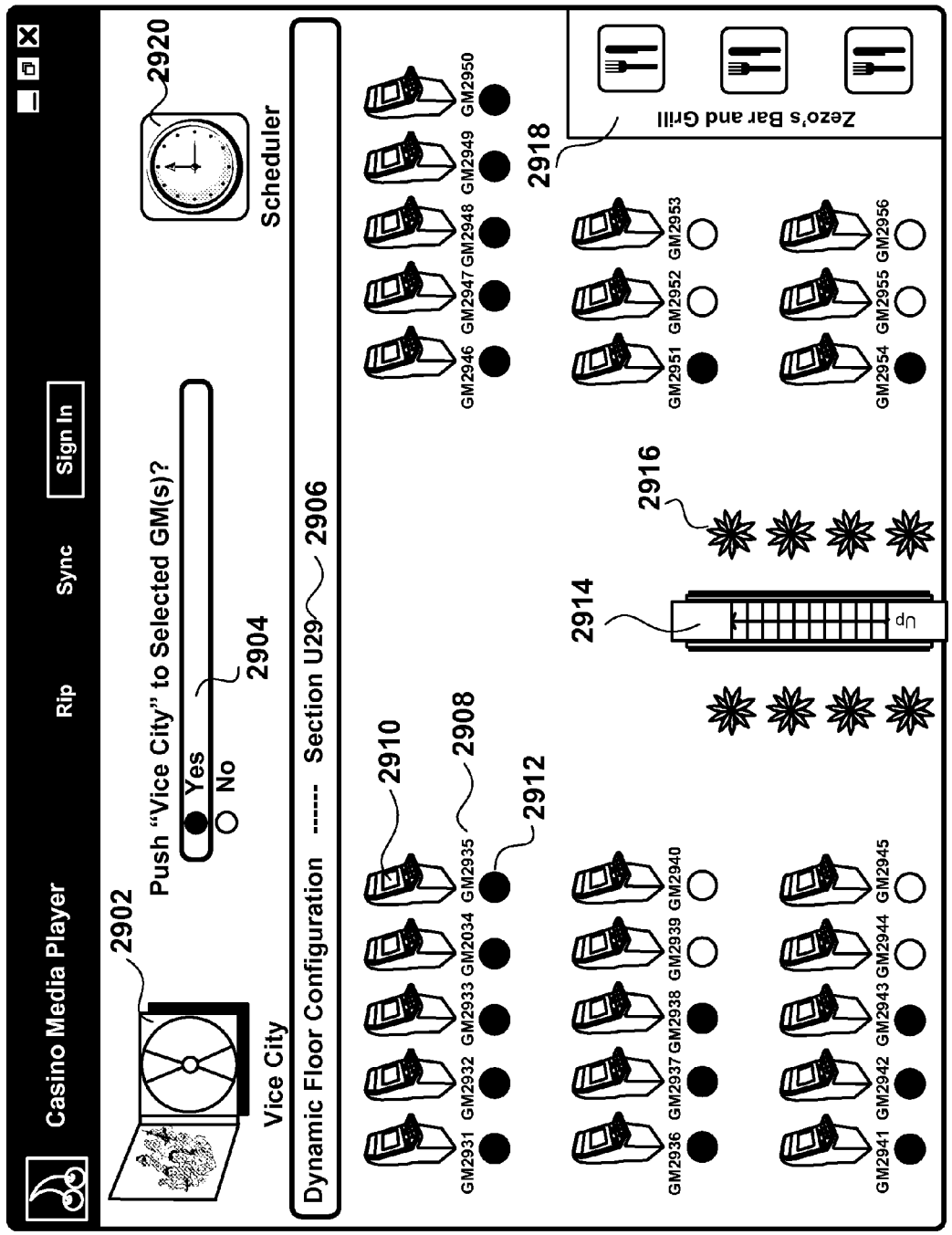
FIG. 29 shows a further view of an exemplary dynamic game management console according to an embodiment of the present invention, showing the manner in which a selected game may be synched or pushed to a specific gaming machine or machines and rendered active for a period of the operator's choosing.

FIG. 29 shows a further view of a Casino Media Player according to an embodiment of the present invention, demonstrating the manner in which a selected game may be synched or pushed to a specific gaming machine or machines and rendered active for a period of the operator's choosing. By selecting a particular game (possibly via right-clicking on its icon and then activating the "Floor Plan" option), an operator may view a virtual representation of the casino's floor plan and may then selectively "push" or download that game onto one or more gaming machines. According to an embodiment of the present invention, only those gaming machines that support the execution of the selected game or games will show up as virtual representations on the rendered casino's floor plan. Therefore, the casino operator's view of the casino's floor plan need not be cluttered with virtual representations of gaming machines that do not support the selected media content (e.g., games and/or other rich content).

For example, in FIG. 29, the game "Vice City" 2902 has been selected by the operator (and/or other user of the Casino Media Player) and is ready to be pushed (or otherwise transferred or made available) to gaming machines of the user's choosing, as shown at 2904. The process of pushing games onto gaming machines may be done one section of the floor at a time 2906 as is depicted in FIG. 29 where the section being updated is labeled "U29," or it may be done individually be gaming machine or globally, for example.

According to other embodiments of the present inventions, each gaming machine on the casino floor may have a serial number 2908 (or other unique identifier) associated or assigned therewith, a machine icon 2910, and an activation push-button 2912. Users may activate the push-buttons for gaming machines onto which they wish to push a particular gaming title and not activate the push-buttons for gaming machines onto which they do not wish to push a particular gaming title. Pushed game titles may be simultaneously or subsequently made available to the players via a menu displayed on the gaming machine, in accordance with applicable regulations and internal procedures.

Physical landmarks of the casino floor such as stairs, escalators 2914, elevators, plants 2916, fountains, and bars and/or restaurants 2918 may be displayed to help orient users. A "Scheduler" icon button 2920 may allow users to open a scheduler configuration window (not shown) in order to set a specific time range for each game's availability on each game on the casino floor.

Figure 30:
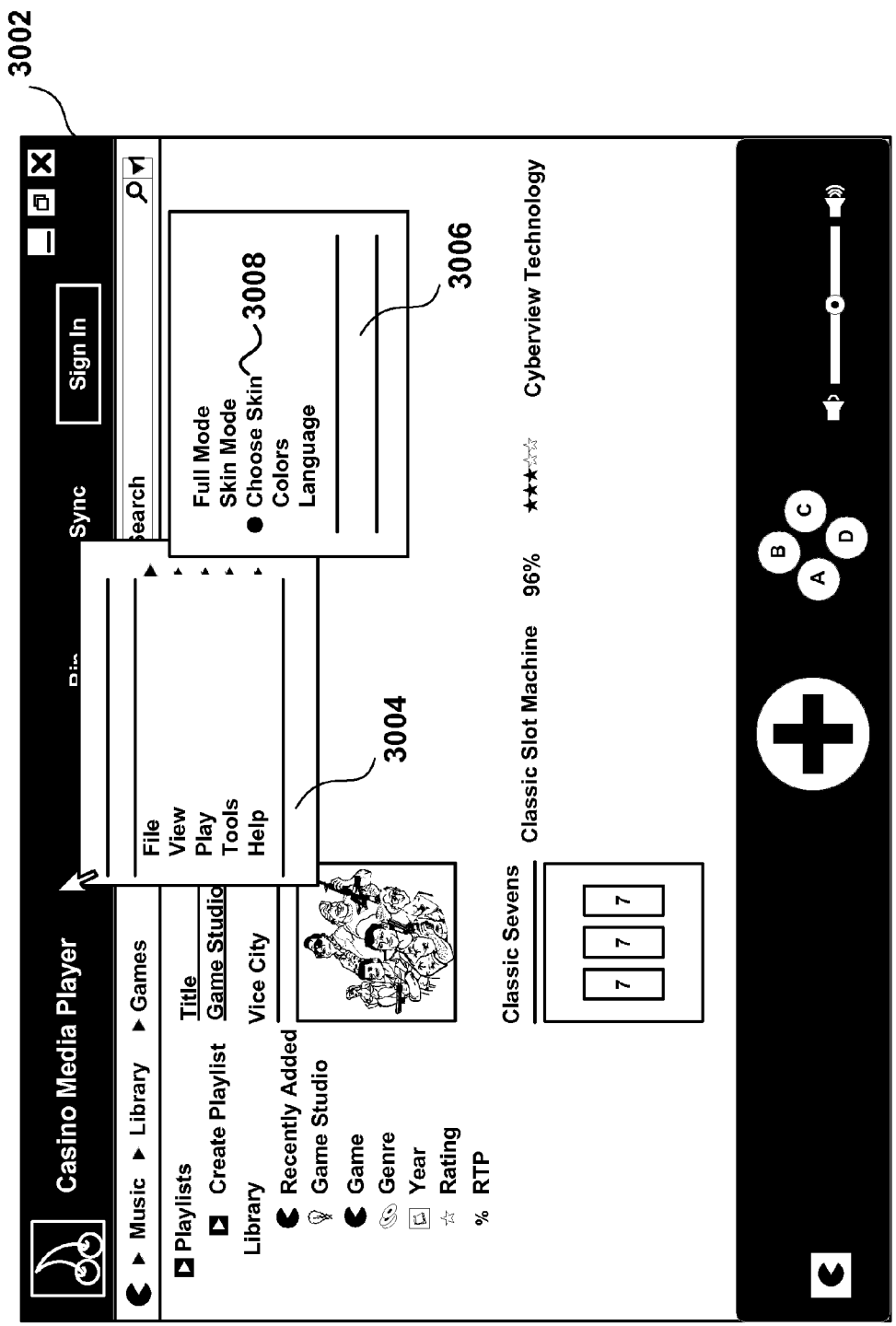
FIG. 30 demonstrates how a casino media player's appearance may be customizable, allowing casino operators or players to select from a number of skins.

FIG. 30 demonstrates how a Casino Media Player's appearance may be customizable, allowing casino operators or players to select from a number of media player skins, according to still further embodiments of the present invention. The Casino Media Player 3002 allows users (e.g., casino operators) more flexibility in using and manipulating their media. Users of the present Casino Media Player may access a menu of potential media player skins via a variety of command sequences such as activating a dropdown menu or right-clicking within the tool's header 3004. Skin menus 3006 and sub-menus may be made available, allowing users to manipulate the appearance style of the media player as well as choose from a list of potential pre-created appearance styles or skins 3008.

The Media Player plug-in 2226, according to embodiments of the present invention, may be configured to dynamically control the casino floor through the aforementioned Active Directory organization units (OUs) and associated policies (SIPs, SRPs) via an ubiquitous media player graphical user interface. The media player plug-in may, according to an embodiment of the present invention, implement its software functions using an application interface to the Active Directory named ADSI—Active Directory Service Interface, which is at the core of Microsoft Windows server. Embodiments of the present invention, however, are not limited to implementations using a Microsoft operating system. Indeed, functions may be implemented via similar services and associated application interface for other operating systems having centrally federated distributed policies such as, for example, Linux configured with Fedora capability.

Embodiments of the present invention are related to the use of one or more computer systems that may be configured as mobile computing device, laptop or desktop computer or gaming machines to control media content for network connected gaming machines. According to one embodiment, the computer-implemented methods for controlling media content for gaming machines may be provided by one or more computer systems in response to processor(s) executing sequences of instructions contained in memory. Such instructions may be read into memory from a computer-readable medium, such as a data storage device. Execution of the sequences of instructions contained in the memory may cause the processor(s) to perform the steps and have the functionality described herein. In alternative embodiments, hard-wired circuitry may be used in place of or in combination with software instructions to implement the claimed embodiments of the present inventions. Within the context of this document, a 'computer-readable medium' may be or include any means that can contain, store, communicate, propagate or transport a program or application that implements an embodiment of the present invention for use by or in connection with a computerized system, apparatus, or device. Indeed, the computer readable medium may be or include (but is not limited to), for example, an electronic, magnetic, optical, electromagnetic, infrared, or semi-conductor system, apparatus, device, or propagation medium. More specific examples (a non-exhaustive list) of computer-readable media may include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (such as a CD or DVD-ROM, for example) or other data carriers.

In a preferred embodiment of the invention, an operator standing near a bank of gaming machines observing players' activity (there may be no player activity at all) and holding a wirelessly connected handheld PC or Ultra-compact PC may enter an identifier of the bank (either via manual entry or other wireless identifying means such as RFID, laser/CCD barcode scan and 2D barcode scanner using miniature camera as found on mobile phones). Subsequent to entering the bank ID (or other identifier for a selected group of gaming machines), the Casino Media Player according to an embodiment of the present invention may automatically narrow the range of capabilities accordingly, such that for example only the games activated on these gaming machines belonging to the entered bank ID may be displayed on the operator's screen and that only the games available in the server library (and not yet downloaded or activated on these gaming machines) that may execute of the model of these gaming machine may be shown for operator selection. Conveniently and discreetly using the friendly Casino Media Player interface, the operator may reconfigure the parameters of the bank of gaming machines for optimal activity within the allowed regulatory space, for example by refactoring the selection menu order and the promotional activity (video and sound).

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. For example, proprietary software emulating a media player look-and-feel may be entirely developed by a game supplier, and in such case, the game plug-in may be implemented as a built-in function or service. However, a plug-in strategy may be desirable so as to be able to benefit from advances made in the future releases of the host media player (e.g. WMP 12, WMP 14, etc. . . . ). Those of skill in this art may also recognize that embodiments of the present invention may be adapted to manage media content for non-regulating gaming devices, such as gaming consoles. According to such embodiments, the media content may include games that have not been (and need not be) certified by any certification laboratory. Other variations will no doubt occur to those of skill in this art. Thus, the present invention should be limited only by the claims as set forth below.

What is claimed is:

1. A method for managing network connected gaming machines comprising:
   providing a software media player application configured to store, manage, transfer and play audio-video media content stored in a media library and to transfer audio-video media content to personal audio-visual media player devices;
   providing a plug-in for the media player application, the plug-in being configured to enable the provided media player application to become a media player application that is configured to transfer audio-video media content from the media library and code of a regulated game and security data bound thereto to selected network connected gaming machines via a one-way sync command;
   enabling the provided media player application with the provided plug-in;
   selecting audio-video media content from the media library and code of the regulated game using the plug-in enabled media player application;
   selecting at least one of a plurality of network connected gaming machines using the plug-in enabled media player application; and
   transferring the selected audio-video media content from the media library to the selected gaming machines and transferring the code of the regulated game and security data bound thereto to the selected gaming machines using the plug-in enabled media player application.

2. The method of claim 1, wherein the plug-in is further configured to enable the provided media player application to control the audio-video media content when the transferred selected audio-video media content is loaded on the selected gaming machines.

3. The method of claim 1, wherein the media player application is a consumer media player application and wherein the plug-in has been developed by a developer that is different from a developer of the consumer media player application.

4. The method of claim 1, further comprising providing at least one of an Application Programming Interface (API) and a software Developer's Kit (SDK).

5. The method of claim 4, further comprising developing the provided plug-in using at least one of the Application Programming Interface (API) and the software Developer's Kit (SDK).

6. The method of claim 1, wherein the provided media player application and provided plug-in have been developed by the same supplier.

7. The method of claim 1, wherein the provided plug-in is further configured to enable the provided media player application to control an availability of the transferred audio-video media content on the selected gaming machines.

8. The method of claim 7, wherein controlling the availability includes accessing a scheduler software module using the plug-in enabled media player application.

9. The method of claim 7, wherein controlling the availability includes accessing a menu designer software module using the plug-in enabled media player application.

10. The method of claim 7, wherein controlling the availability includes accessing a floor plan editor software module using the plug-in enabled media player application.

11. The method of claim 10, wherein the floor plan editor software module provides a graphical representation of a plurality of gaming machines and their physical distribution within at least one gaming establishment or a portion thereof.

12. The method of claim 10, further comprising accepting an identification of a group of gaming machines and wherein, subsequent to accepting an identification of the group of gaming machines, the floor plan editor software module narrows those gaming machines that may be controlled via the floor plan editor to only the gaming machines in the identified group.

13. The method of claim 10, wherein the floor plan editor software module is configured (a) to allow free-text selection acceleration entry and (b) to narrow the selection of gaming machines subsequent to receiving each character according to indexed identifiers of individual or groups of gaming machines, and (c) to control the selected gaming machines.

14. The method of claim 1, wherein the selected audio-video media content includes digital rights management functionality.

15. The method of claim 1, further comprising authorizing installation of transferred audio-video media content on the selected gaming machines by software restriction policy (SRP).

16. The method of claim 1, further comprising authorizing playback of the transferred audio-video media content on the selected gaming machines by software restriction policy (SRP).

17. The method of claim 1, wherein the audio-video media content includes metadata to define at least one of producer studio, media name, media genre, media year, and media rating of the selected audio-video media content.

18. The method of claim 17, wherein selecting audio-video media content from the media library includes selecting the audio-video media content based upon the meta data of the media content.

19. The method of claim 1, wherein the media library is stored on a deployment server coupled to the network and the media player is executed on an authorized computer device coupled to the network.

20. The method of claim 19, further comprising adding audio-video media content to the media library.

21. The method of claim 1, wherein selecting the audio-video media content includes using free-text entry selection acceleration to enable rapid selection of audio-video media content according to related indexed embedded information and metadata, the selection being narrowed as each character is typed-in.

22. The method of claim 1, wherein the media player application is configured to execute on a mobile device coupled to the network and wherein at least the selecting and transferring steps are carried out from the mobile device.

23. The method of claim 1, further comprising accepting an identification of a group of gaming machines and wherein selecting audio-video media content includes selecting audio-video media content from a set of audio-video content from the media library that has been narrowed according to capabilities of constituent gaming machines of the identified group of gaming machines.

24. The method of claim 1, wherein selecting at least one of a plurality of network connected gaming machines includes selecting at least one network connected gaming machine using a floor plan editor software module that provides a graphical representation of a plurality of gaming machines and their physical distribution within a gaming establishment.

25. A method for controlling regulatory certified game content for network connected gaming machines comprising:
   providing a software media player application configured to manage, store, transfer and play audio-video media content stored in a media library and to transfer audio-video media content to personal audio-visual media player devices;
   providing a plug-in for the provided media player application, the plug-in being configured to transform the provided media player into a media player application that is configured to select regulatory certified game content from the media library and transfer regulatory certified game content from the media library to selected gaming machines;

enabling the provided media player application with the provided plug-in;

selecting regulatory certified game content from the media library using the plug-in enabled media player application, and transferring the selected regulatory certified game content and security data bound thereto to one or more network connected gaming machines using the plug-in enabled media player application.

26. The method of claim 25, wherein the plug-in is further configured to enable the provided media player application to control the regulatory certified game content when the transferred selected regulatory certified game content is active on a network connected gaming machine.

27. The method of claim 25, wherein the media player application is a consumer media player application and wherein the plug-in has been developed by a developer that is different from a developer of the consumer media player application.

28. The method of claim 25, further comprising providing at least one of an Application Programming Interface (API) and a software Developer's Kit (SDK).

29. The method of claim 28, further comprising developing the provided plug-in using at least one of the Application Programming Interface (API) and the software Developer's Kit (SDK).

30. The method of claim 25, wherein the provided media player application and the provided plug-in have been developed by the same supplier.

31. The method of claim 25, wherein the provided plug-in is further configured to enable the provided media player application to control an availability of the transferred regulatory certified game content on the selected gaming machines.

32. The method of claim 31, wherein controlling the availability includes accessing a scheduler software module using the plug-in enabled media player application.

33. The method of claim 31, wherein controlling the availability includes accessing a menu designer software module using the plug-in enabled media player application.

34. The method of claim 31, wherein controlling the availability includes accessing a floor plan editor software module using the plug-in enabled media player application.

35. The method of claim 34, wherein the floor plan editor software module provides a graphical representation of a plurality of gaming machines and their physical distribution within at least one gaming establishment or a portion thereof.

36. The method of claim 34, further comprising accepting an identification of a group of gaming machines and wherein subsequent to accepting an identification of the group of gaming machines, the floor plan editor software module narrows those gaming machines that may be controlled via the floor plan editor to only the gaming machines in the identified group.

37. The method of claim 34, wherein the floor plan editor software module is configured (a) to allow free-text selection acceleration entry and (b) to narrow the selection of gaming machines subsequent to receiving each character according to indexed identifiers of individual or groups of gaming machines, and (c) to control the selected gaming machines.

38. The method of claim 25, further comprising authorizing installation of transferred regulatory certified game content on the selected gaming machines by software restriction policy (SRP).

39. The method of claim 25, further comprising authorizing execution of the transferred regulatory certified game content on the selected gaming machines by software restriction policy (SRP).

40. The method of claim 25, wherein the regulatory certified game content includes metadata to define at least one of game studio, game name, game genre, game year, game rating and return to player (RTP) of the selected media content.

41. The method of claim 40, wherein selecting regulatory certified game content from the media library includes selecting the regulatory certified game content based upon the metadata of the game content.

42. The method of claim 25, wherein the media player application is configured to execute on a mobile device coupled to the network.

43. The method of claim 25, wherein the media library is stored on a deployment server coupled to the network and the media player application is executed on an authorized computer device coupled to the network.

44. The method of claim 43, further comprising adding audio video media content to the media library.

45. The method of claim 43, further comprising adding regulatory certified game content to the media library.

46. The method of claim 25, further comprising selecting audio-video media content, and wherein selecting the audio-video media content includes using a free-text entry selection acceleration to enable rapid selection of audio-video media content according to related indexed embedded information and metadata, the selection being narrowed as each character is typed-in.

47. The method of claim 25, wherein selecting the regulatory certified game content includes using a free-text entry selection acceleration to enable rapid selection of regulatory certified game content according to related indexed embedded information and metadata, the selection being narrowed as each character is being typed-in.

48. The method of claim 25, further comprising accepting an identification of a group of gaming machines and wherein selecting regulatory certified game content includes selecting regulatory certified game content from a set of regulatory certified game content from the media library that has been narrowed according to capabilities of constituent gaming machines of the identified group of gaming machines.

49. The method of claim 25, wherein transferring the selected regulatory certified game content and security data bound thereto includes selecting at least one network connected gaming machine using a floor plan editor software module that provides a graphical representation of a plurality of gaming machines and their physical distribution within a gaming establishment.

* * * * *